US012810783B2

(12) United States Patent
Kim

(10) Patent No.: US 12,810,783 B2
(45) Date of Patent: Nov. 24, 2026

(54) DISPLAY DEVICE AND DRIVING METHOD

(71) Applicant: LG Display Co., Ltd., Seoul (KR)

(72) Inventor: Youngjin Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/193,650

(22) Filed: Apr. 29, 2025

(65) Prior Publication Data

US 2026/0134820 A1 May 14, 2026

(30) Foreign Application Priority Data

Nov. 11, 2024 (KR) ........................ 10-2024-0159550

(51) Int. Cl.
*G09G 3/32* (2016.01)

(52) U.S. Cl.
CPC ....... *G09G 3/32* (2013.01); *G09G 2300/0426* (2013.01); *G09G 2300/0819* (2013.01); *G09G 2310/08* (2013.01); *G09G 2320/0233* (2013.01)

(58) Field of Classification Search
CPC ............. G09G 3/32; G09G 2300/0426; G09G 2300/0819; G09G 2310/08; G09G 2320/0233; G09G 2300/0861; G09G 2310/0251; G09G 3/3266; G09G 3/3233; G09G 2310/0202; G09G 2310/0248; G09G 2310/061
See application file for complete search history.

(56) References Cited

U.S. PATENT DOCUMENTS

| | | | | |
|---|---|---|---|---|
| 8,558,755 B2 * | 10/2013 | Kharrati | G06F 3/1446 | 345/82 |
| 8,928,562 B2 * | 1/2015 | Gates | G09G 3/3453 | 345/60 |
| 9,881,565 B2 * | 1/2018 | Bishop | G09G 3/2092 | |
| 10,997,899 B1 * | 5/2021 | Bae | G09G 3/2092 | |
| 11,263,963 B2 * | 3/2022 | Shaeffer | G09G 3/2003 | |
| 2007/0085779 A1 * | 4/2007 | Smith | G09G 3/3216 | 345/76 |
| 2010/0207848 A1 * | 8/2010 | Cok | G09G 3/3208 | 345/76 |
| 2014/0132165 A1 * | 5/2014 | Lin | H05B 45/44 | 315/192 |

(Continued)

FOREIGN PATENT DOCUMENTS

KR 10-2024-0011114 A 1/2024

*Primary Examiner* — Jose R Soto Lopez
(74) *Attorney, Agent, or Firm* — Birch, Stewart, Kolasch & Birch, LLP

(57) ABSTRACT

Discussed is a display device including a substrate having a display area, and a unit driving area disposed in a matrix form in the display area. The unit driving area includes a light-emitting element having a first electrode, a second electrode, a column driver for driving a column line connected to the first electrode, and a row driver for driving a row line connected to the second electrode. The column driver can be connected to a plurality of column lines connected in common to the first electrode of each of the light-emitting elements in the same column. The row driver can be connected to a plurality of row lines and connected in common to the second electrode of each of the light-emitting elements in the same row, thereby reducing a change amount of the voltage of the reset node and improving a vertical line based on a driving driver.

20 Claims, 26 Drawing Sheets

(56) References Cited

U.S. PATENT DOCUMENTS

| | | | | |
|---|---|---|---|---|
| 2018/0090048 | A1* | 3/2018 | Tang | G09G 3/2018 |
| 2020/0090574 | A1* | 3/2020 | Sakariya | G09G 3/2088 |
| 2020/0349885 | A1* | 11/2020 | Hsieh | G06F 3/1446 |
| 2021/0118353 | A1* | 4/2021 | Sakariya | G09G 3/2018 |
| 2021/0225223 | A1* | 7/2021 | Bi | G09G 3/3216 |
| 2021/0225293 | A1* | 7/2021 | Wang | G09G 3/3233 |
| 2022/0415246 | A1* | 12/2022 | Huang | G09G 3/3275 |
| 2023/0316963 | A1* | 10/2023 | Bi | G09G 3/006 345/214 |
| 2023/0360593 | A1* | 11/2023 | Huitema | G09G 3/2003 |
| 2024/0054936 | A1* | 2/2024 | Azizi | G09G 3/2014 |
| 2024/0062721 | A1* | 2/2024 | Liu | G09G 3/3225 |
| 2025/0022997 | A1* | 1/2025 | Lee | G09G 3/32 |
| 2025/0095605 | A1* | 3/2025 | Posat | G09G 5/003 |

* cited by examiner

DISPLAY DEVICE AND DRIVING METHOD

CROSS-REFERENCE TO RELATED APPLICATION

Pursuant to 35 U.S.C. § 119(a), this application claims priority to Korean Patent Application No. 10-2024-0159550, filed on Nov. 11, 2024 in the Korean Intellectual Property Office, the entire contents of which are hereby expressly incorporated by reference into the present application.

BACKGROUND

Technical Field

The present disclosure relate to a display device and a driving method.

Discussion of the Related Art

Display devices are applied to various electronic devices such as TVs, mobile phones, notebooks, tablets, etc. Display devices include organic light-emitting diode (OLED) displays that emit light by itself, etc., and liquid crystal display (LCD) devices that require a separate light source, etc.

Recently, display devices including a light emitting diode (LED) are attracting attention as next-generation display devices. Since an LED is formed of an inorganic material rather than an organic material, the display devices including the LED have a faster turn-on speed, better luminous efficiency, and higher luminance images than LCD devices or OLED display devices.

SUMMARY OF THE DISCLOSURE

Aspects and implementations of the present disclosure are directed to providing a display device in which it is possible to improve a vertical line based on a driving driver by increasing a voltage of a reset node to a predetermined voltage regardless of differential driving of the driving drivers.

Aspects and implementations of the present disclosure are also directed to providing a display device in which it is possible to improve a vertical line based on a driving driver by reducing a change amount of a voltage of a reset node due to parasitic capacitance during differential driving of the driving drivers.

Aspects and implementations of the present disclosure are also directed to providing a display device in which, by reducing a change amount of a voltage of a reset node, it is possible to improve a vertical line based on a driving driver, which is caused by coupling between a gate voltage of a driving transistor and the voltage of the reset node.

Aspects and implementations of the present disclosure are also directed to providing a display device in which, by delaying an on timing of a second light-emitting control transistor after an on timing of a first light-emitting control transistor and applying the delayed on timing of the second light-emitting control transistor to exclude a coupling effect due to a voltage of a reset node, it is possible to improve a vertical line based on a driving driver, which is caused by coupling between a gate voltage of a driving transistor and the voltage of the reset node.

According to aspects and implementations of the present disclosure, there is provided a display device including a substrate including a display area, and a unit driving area disposed in a matrix form in the display area, wherein the unit driving area includes a light-emitting element including a first electrode and a second electrode, a column driver configured to drive a column line connected to the first electrode, and a row driver configured to drive a row line connected to the second electrode, the column driver is connected to a plurality of column lines and connected in common to the first electrode of each of light-emitting elements in the same column, and the row driver is connected to a plurality of row lines and connected in common to the second electrode of each of light-emitting elements in the same row.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
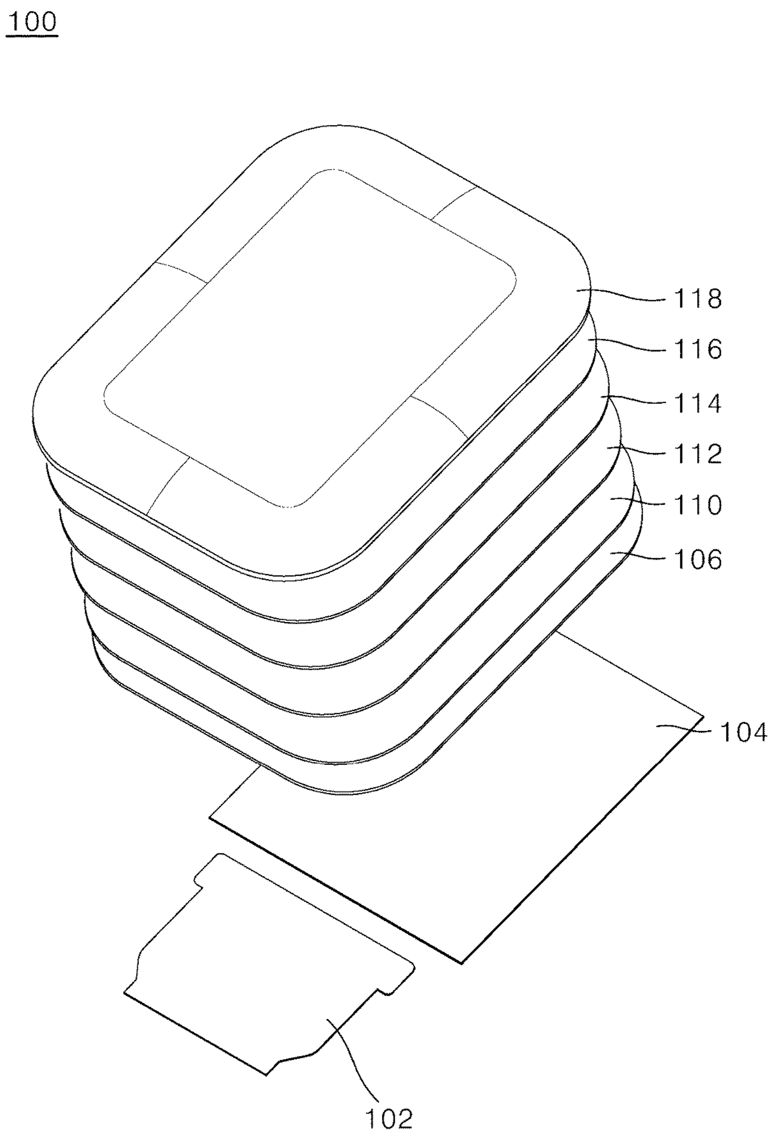
FIG. 1 illustrates a display device according to aspects and implementations of the present disclosure.

Hereinafter, various aspects and implementations of the present disclosure will be described in detail with reference to example drawings. In adding reference numerals to components in each drawing, the same components can have the same reference numerals as much as possible even when they are shown in different drawings. In addition, in the description of the present disclosure, when it is determined that a detailed description of a related known configuration or function can obscure the gist of the present disclosure, detailed description thereof can be omitted. When terms "comprise," "have," "consist of," and the like described in the present disclosure are used, other parts can be added unless "only" is used. When a component is expressed in the singular, it can include a case where the component is provided as a plurality of components unless specifically stated otherwise.

In addition, in the description of the components of the present disclosure, terms such as first, second, A, B, (a), and (b) can be used. These terms are only for the purpose of distinguishing one component from another component, and the nature, sequence, order, or the like of the corresponding component is not limited by these terms.

In the description of the positional relationship of components, when two or more components are described as being "connected," "coupled," or "joined," it should be understood that the two or more components are directly "connected," "coupled," or "joined," but two or more components can be "connected," "coupled," or "joined" with other components "interposed" therebetween. Here, other components can be included in one or more of the two or more components that are "connected," "coupled," or "joined."

In the description of the temporal flow relationship related to components, operation methods, manufacturing methods, and the like, for example, the temporal sequence relationship or the flow sequence relationship, such as "after," "subsequent to," "then," or "before," it can also include a non-continuous case unless "immediately" or "directly" is used.

Meanwhile, in case that numerical values of components or the corresponding information (e.g., a level) are described, even when there is no separate explicit description, the numerical values or the corresponding information can be construed as including a range of error that can occur due to various factors (e.g., process factors, an internal or external impact, and noise). Further, the term "can" fully encompasses all the meanings and coverages of the term "may" and vice versa.

Hereinafter, various aspects and implementations of the present disclosure will be described in detail with reference to the accompanying drawings. All the components of each display device according to all embodiments of the present disclosure are operatively coupled and configured.

Figure 2:
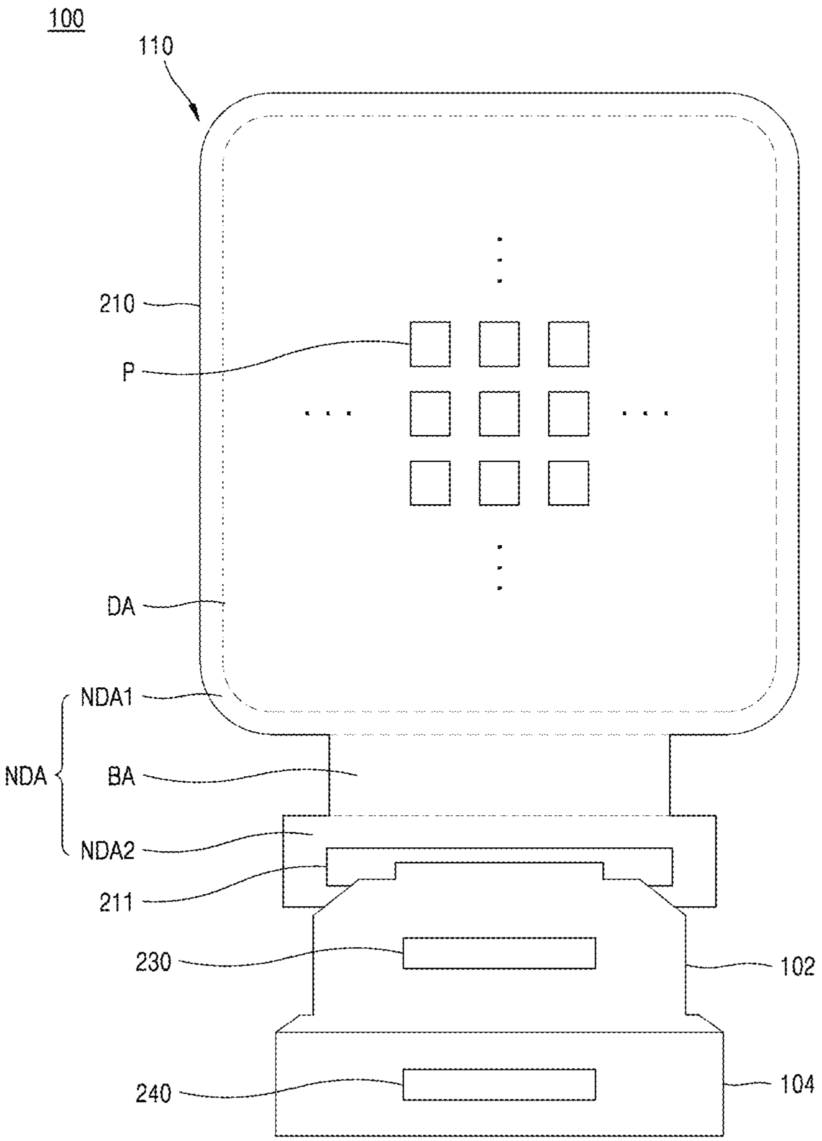
FIG. 2 is a plan view of the display device according to the aspects and implementations of the present disclosure.

FIG. 1 illustrates a display device 100 according to aspects and implementations of the present disclosure, and FIG. 2 is a plan view of the display device 100 according to the aspects and implementations of the present disclosure.

Referring to FIG. 1, the display device 100 according to the aspects and implementations of the present disclosure can include a display panel 110, a cover member 118 disposed on the display panel 110, a flexible printed circuit 102 connected to the display panel 110, a printed circuit board 104 connected to the flexible printed circuit 102, etc. The display device 100 according to the aspects and implementations of the present disclosure can further include a support substrate 106 disposed under the display panel 110 to support a lower portion of the display panel 110, a polarizing layer 114 disposed on the display panel 110, a first adhesive layer 112 disposed between the display panel 110 and the polarizing layer 114, and a second adhesive layer 116 disposed between the polarizing layer 114 and the cover member 118.

The display panel 110 can include a substrate 210. The substrate 210 can be a member on which various components, such as a plurality of metal layers and a plurality of insulation material layers, are formed. The substrate 210 can be formed of an insulation material. For example, the substrate 210 can be formed of glass, a resin, etc. In addition, the substrate 210 can be formed of a flexible material. For example, the substrate 210 can be formed of a flexible plastic material, such as polyimide (PI). However, the aspects and implementations of the present disclosure are not limited thereto.

The display panel 110 can implement information, video, and/or image provided to a user. For example, the display panel 110 can include a display area DA and a non-display area NDA. For example, the substrate 210 can include the display area DA and the non-display area NDA. The descriptions of the display area DA and the non-display area NDA are not limited to only the substrate 210, but the descriptions can be given throughout the display device 100.

The display area DA can be an area on which an image is displayed. The display area DA can include a plurality of pixels P. Each of the plurality of pixels P can be formed of a plurality of sub-pixels. At least one light-emitting element can be disposed in each of the plurality of sub-pixels. The light-emitting element can be configured differently according to the type of the display device 100. For example, when the display device 100 is an inorganic light-emitting display device, the light-emitting element is a light-emitting element based on an inorganic material and can be a light-emitting diode (LED), a micro LED, or a mini LED, but the aspects and implementations of the present disclosure are not limited thereto.

The non-display area NDA can be an area in which an image is not displayed. Various lines, circuits, etc. for driving the plurality of pixels P of the display area DA can be disposed in the non-display area NDA. For example, in the non-display area NDA, various driving circuits and various lines can be disposed, and a pad part 211 to which an integrated circuit, a printed circuit, etc. are connected can be disposed, but the aspects and implementations of the present disclosure are not limited thereto.

For example, the driving circuit can include a data driving circuit and/or a gate driving circuit, but the aspects and implementations of the present disclosure are not limited thereto. Lines to which control signals for controlling driving circuits are supplied can be disposed on the substrate 210. For example, the control signals can include various timing signals including a clock signal, an input data enable signal, and synchronization signals, but the aspects and implementations of the present disclosure are not limited thereto. The control signals can be supplied to the substrate 210 from the outside of the substrate 210 through the pad part 211. For example, circuit components, such as a flexible printed circuit 102 and a printed circuit board 104, can be connected to the pad part 211.

According to the present disclosure, the non-display area NDA can include a first non-display area NDA1, a bending area BA, and a second non-display area NDA2. For example, the first non-display area NDA1 can be an area that surrounds at least a part of the display area DA. The bending area BA can be an area extending from at least one of a plurality of sides of the first non-display area NDA1 and can be a bendable area. The second non-display area NDA2 can be an area extending from the bending area BA and can have the pad part 211. For example, the bending area BA can be bent, and the remaining area of the substrate 210 not including the bending area BA can be flat. In this case, as the bending area BA is bent, the second non-display area NDA2 can be located on a rear surface of the display area DA. However, the aspects and implementations of the present disclosure are not limited thereto.

The display area DA of the substrate 210 or the display device 100 can be configured in various shapes according to the design of the display device 100. For example, the display area DA can be formed in a rectangular shape with four rounded corners, but the aspects and implementations of the present disclosure are not limited thereto. As another example, the display area DA can be formed in a rectangular shape with four right-angled corners, a circular shape, etc., but the aspects and implementations of the present disclosure are not limited thereto.

According to the aspects and implementations of the present disclosure, a width of the second non-display area NDA2 in which the pad part 211 is disposed can be greater than a width of the bending area BA. In addition, a width of the display area DA can be greater than a width of the bending area BA. In the drawings, the width of the bending area BA is illustrated as being narrower than widths of other areas of the substrate 210, but the shape of the substrate 210 including the bending area BA is an example, and the aspects and implementations of the present disclosure are not limited thereto.

Referring to FIGS. 1 and 2, the flexible printed circuit 102 and the printed circuit board 104 can be disposed under the display panel 110. The flexible printed circuit 102 and the printed circuit board 104 can be disposed at one edge of the display panel 110, but the aspects and implementations of the present disclosure are not limited thereto. One side of the flexible printed circuit 102 can be connected to the display panel 110, and the other side can be connected to the printed circuit board 104, but the aspects and implementations of the present disclosure are not limited thereto. The flexible printed circuit 102 can be a flexible film, but the aspects and implementations of the present disclosure are not limited thereto.

The pad part 211 disposed in the second non-display area NDA2 can include a plurality of pads, and a driving component including one or more flexible printed circuits 102 and the printed circuit board 104 can be attached or bonded. The plurality of pads included in the pad part 211 can be electrically connected to one or more flexible printed circuits 102 and can transmit various signals (or power) from the printed circuit board 104 and the one or more flexible printed circuits 102 to a driving circuit (e.g., a driver DRV of FIG. 3, etc.) disposed in the display area DA.

The flexible printed circuit 102 can be a film in which various components are disposed on a flexible base film. For example, a first circuit component 230, such as a gate driving integrated circuit and/or a data driving integrated circuit, can be disposed on the one or more flexible printed circuits 102, but the aspects and implementations of the present disclosure are not limited thereto. The first circuit component 230 can be a component for processing data and driving signals for displaying an image. The first circuit component 230 can be disposed in a manner of a chip on glass (COG), a chip on film (COF), a tape carrier package (TCP), etc. according to a mounting method, but the aspects and implementations of the present disclosure are not limited thereto. The flexible printed circuit 102 can be attached or bonded on a plurality of pads through a conductive adhesive layer, but the aspects and implementations of the present disclosure are not limited thereto.

The printed circuit board 104 can be a component that is electrically connected to the flexible printed circuit 102 and supplies a signal to the first circuit component 230. The printed circuit board 104 can be disposed at one side of the flexible printed circuit 102 and electrically connected to the flexible printed circuit 102. Various components for supplying various signals to the first circuit component 230 can be disposed on the printed circuit board 104. For example, various second circuit components 240, such as a timing controller, a power supply unit, a memory, a processor, etc., can be disposed on the printed circuit board 104. For example, the second circuit component 240 disposed on the printed circuit board 104 can include a timing controller and/or a power management integrated circuit (PMIC), but the aspects and implementations of the present disclosure are not limited thereto.

The printed circuit board 104 can include at least one hole, but the aspects and implementations of the present disclosure are not limited thereto. An internal component for detecting ambient light, temperature, etc. that can be provided to a plurality of sensors can be disposed in an area corresponding to the at least one hole. For example, the internal component can include an ambient light sensor (ALS), a temperature sensor, etc., but the aspects and implementations of the present disclosure are not limited thereto. For example, the hole can be a transmissive hole, etc., but the aspects and implementations of the present disclosure are not limited thereto.

Referring to FIG. 1, the polarizing layer 114 can be disposed on the display panel 110 and can prevent or reduce light emitted from an external light source from entering the display panel 110 and affecting a light-emitting element, etc.

The cover member 118 can be a member that is disposed on the polarizing layer 114 and protects the display panel 110.

The second adhesive layer 116 can be disposed between the polarizing layer 114 and the cover member 118. The second adhesive layer 116 can attach the cover member 118 to the display panel 110 or the polarizing layer 114.

The first adhesive layer 112 can be disposed between the display panel 110 and the polarizing layer 114. The first adhesive layer 112 can attach the polarizing layer 114 to the display panel 110. The first adhesive layer 112 can be omitted.

Each of the first adhesive layer 112 and the second adhesive layer 116 can include an optically clear adhesive (OCA), an optically clear resin (OCR), a pressure sensitive adhesive (PSA), etc., but the aspects and implementations of the present disclosure are not limited thereto.

The support substrate 106 can be disposed between the display panel 110 and the printed circuit board 104 to reinforce the rigidity of the display panel 110. The support substrate 106 can be a backplate, but the aspects and implementations of the present disclosure are not limited thereto.

Figure 3:
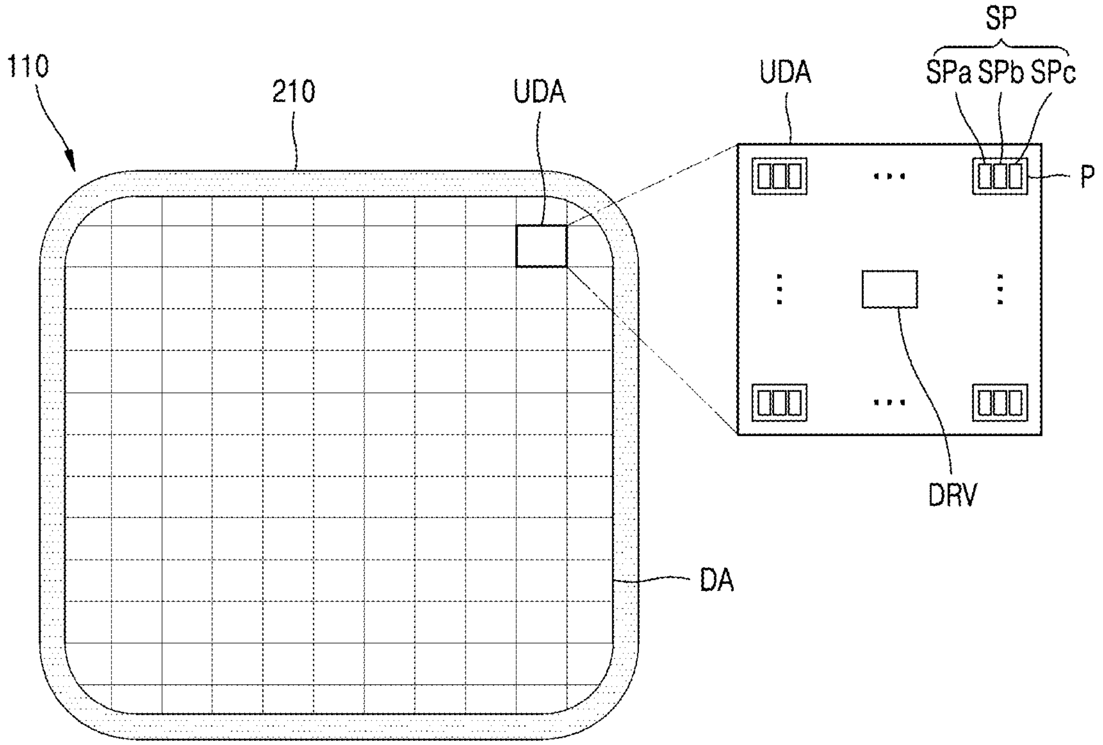
FIG. 3 is a plan view of a display panel according to the aspects and implementations of the present disclosure.
Figure 4:
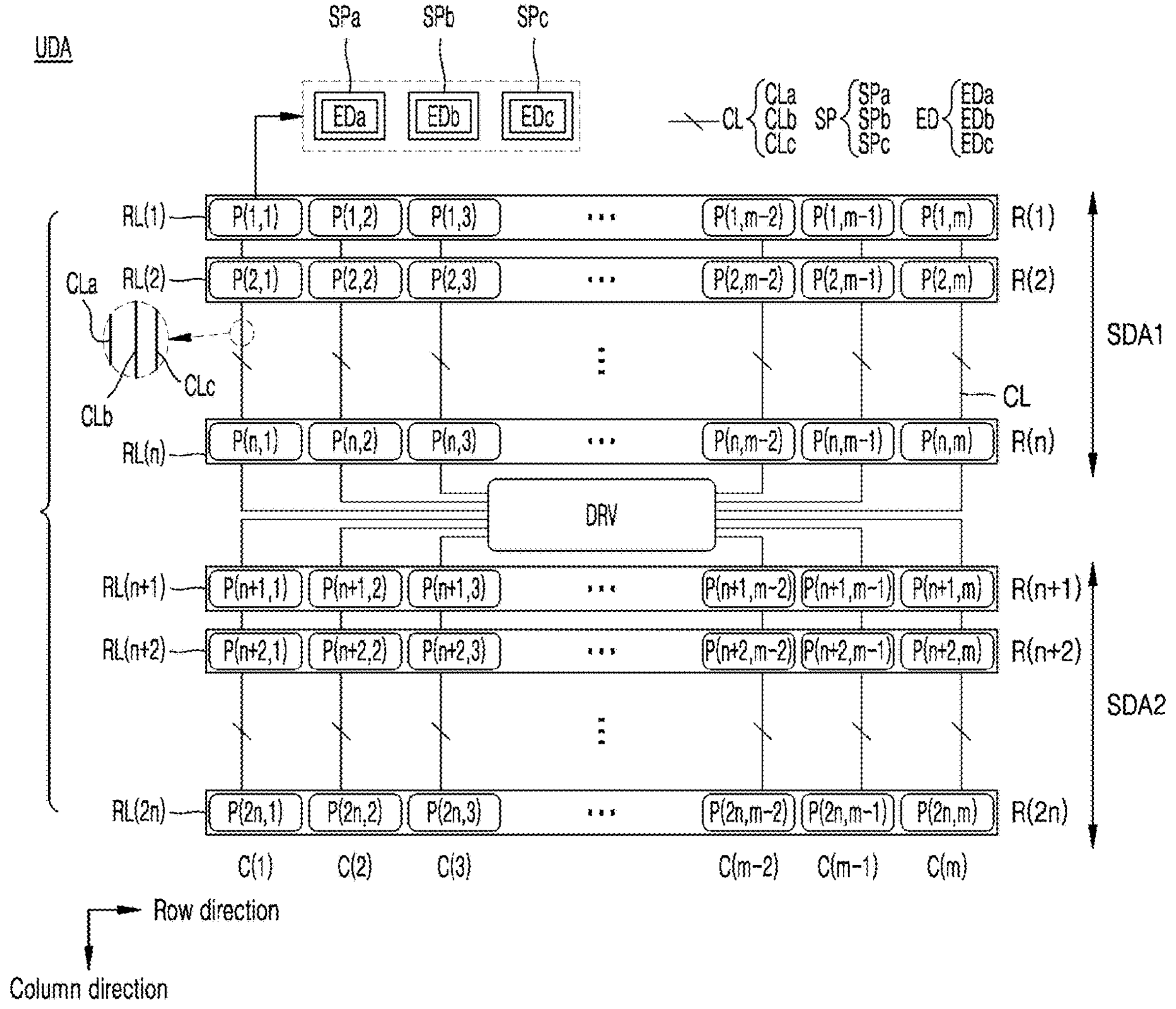
FIG. 4 is a plan view of a unit driving area of the display panel according to the aspects and implementations of the present disclosure.

FIG. 3 is a plan view of the display panel 110 according to the aspects and implementations of the present disclosure, and FIG. 4 is a plan view of a unit driving area UDA of the display panel 110 according to the aspects and implementations of the present disclosure.

Referring to FIG. 3, the display area DA of the display panel 110 according to the aspects and implementations of the present disclosure can include a plurality of unit driving areas UDA.

The display panel 110 according to the aspects and implementations of the present disclosure can include a driver DRV disposed in each of the plurality of unit driving areas UDA. For example, the driver DRV can be a driving chip manufactured using a process of manufacturing a metal-oxide-silicon field effect transistor (MOSFET) on a semiconductor substrate, but the aspects and implementations of the present disclosure are not limited thereto.

Each of the plurality of unit driving areas UDA can be a driving area driven by one driver DRV. For example, the plurality of unit driving areas UDA can be independent driving areas driven by different drivers DRV.

The display panel 110 according to the aspects and implementations of the present disclosure can include the substrate 210 including the display area DA and the plurality of pixels P disposed in a matrix form in the display area DA.

The plurality of pixels P can be disposed in each of the plurality of unit driving areas UDA. Each of the plurality of pixels P can include a plurality of sub-pixels SP. Each of the plurality of sub-pixels SP can include at least one light-emitting element.

For example, the plurality of sub-pixels SP can include a first sub-pixel SPa, a second sub-pixel SPb, and a third sub-pixel SPc, but are not limited thereto. The first sub-pixel SPa can include a first light-emitting element that emits first color light, the second sub-pixel SPb can include a second light-emitting element that emits second color light, and the third sub-pixel SPc can include a third light-emitting element that emits third color light. For example, the first color light, the second color light, and the third color light can be red light, green light, and blue light, but are not limited thereto.

Referring to FIG. 4, the display panel 110 according to the aspects and implementations of the present disclosure can include a plurality of light-emitting elements ED. Each of the plurality of sub-pixels SP can include the light-emitting element ED.

For example, the first sub-pixel SPa can include a first light-emitting element EDa, the second sub-pixel SPb can include a second light-emitting element EDb, and the third sub-pixel SPc can include a third light-emitting element EDc.

The display panel 110 according to the aspects and implementations of the present disclosure can include a plurality of row lines RL and a plurality of column lines CL.

Each of the plurality of row lines RL can be disposed to extend in a row direction. The plurality of row lines RL can be electrically connected to a first electrode of each of the plurality of light-emitting elements ED.

Each of the plurality of column lines CL can be disposed to extend in a column direction. The plurality of column lines CL can be electrically connected to a second electrode of each of the plurality of light-emitting elements ED.

For example, the first electrode of each of the plurality of light-emitting elements ED can be an anode electrode, and the second electrode of each of the plurality of light-emitting elements ED can be a cathode electrode. As another example, the first electrode of each of the plurality of light-emitting elements ED can be a cathode electrode, and the second electrode of each of the plurality of light-emitting elements ED can be an anode electrode.

Each of the plurality of row lines RL can be electrically connected to the second electrode of each of the plurality of light-emitting elements ED. For example, the second electrode of each of the plurality of light-emitting elements ED can be connected in common to one row line RL.

Each of the plurality of column lines CL can be electrically connected to the first electrode of each of the plurality of light-emitting elements ED. For example, the first electrode of each of the plurality of light-emitting elements ED can be connected in common to one column line CL.

A line width of each of the plurality of row lines RL can be greater than a line width of each of the plurality of column lines CL.

The display panel 110 according to the aspects and implementations of the present disclosure can include a plurality of light-emitting elements DRV. The plurality of drivers DRV can drive the plurality of light-emitting elements ED, the plurality of column lines CL, and the plurality of row lines RL.

The plurality of drivers DRV can be embedded in the display panel 110. The plurality of drivers DRV can be disposed in the display area DA and can be disposed on the substrate 210. A plurality of drivers DRV can be disposed to correspond to the plurality of unit driving areas UDA. For example, a single driver DRV can be disposed in a single unit driving area UDA.

Each of the plurality of drivers DRV can drive the plurality of row lines RL and the plurality of column lines CL that are disposed in a corresponding unit driving area UDA among the plurality of unit driving areas UDA, thereby emitting light to the plurality of light-emitting elements ED disposed in the corresponding unit driving area UDA.

The plurality of drivers DRV can be disposed in the display area DA and located closer to the substrate 210 than the plurality of light-emitting elements ED.

For example, the plurality of row lines RL can be sequentially driven. As another example, the plurality of row lines RL can be simultaneously driven. For still another example, two or more of the plurality of row lines RL can be simultaneously driven.

For example, during any one display driving period, at least one of the plurality of row lines RL disposed in the unit driving area UDA can be driven, and the remaining row lines RL may not be driven.

According to the aspects and implementations of the present disclosure, a voltage applied to the row line RL can be referred to as a low-potential voltage, and the low-potential voltage can also be referred to as a row line voltage or a cathode voltage. The low-potential voltage can have various voltage values according to a driving type or driving state. For example, the low-potential voltage can include a first low-potential voltage, a second low-potential voltage, and a third low-potential voltage.

When the row line RL is driven, it can mean that the first low-potential voltage is supplied to the row line RL. When the row line RL is not driven, it can mean that the second low-potential voltage higher than the first low-potential voltage is supplied to the row line RL. Accordingly, the light-emitting elements ED overlapping the row line RL being driven can emit light, and the light-emitting elements ED overlapping the row line RL not being driven may not emit light.

For example, any first row line RL among the plurality of row lines RL can receive the first low-potential voltage during a first period and the second low-potential voltage higher than the first low-potential voltage during a second period different from the first period. Accordingly, the light-emitting elements ED overlapping the first row line RL can emit light during the first period and may not emit light during the second period different from the first period. For example, the first period and the second period can be included in one display driving period. As another example, the first period and the second period can be included in different display driving periods.

A structure of a single unit driving area UDA will be described in more detail with reference to FIG. 4.

As an example, the single unit driving area UDA can be divided into a first sub-driving area SDA1 and a second sub-driving area SDA2. As another example, one unit driving area UDA can be divided into three or more sub-driving areas. As still another example, the one unit driving area UDA may not be divided into two or more sub-driving areas.

The one unit driving area UDA can include one driver DRV and (2n×m) pixels P(1, 1), . . . , P(1, m), P(2, 1), . . . , P(2, m), . . . , P(2n, 1), . . . , and P(2n, m) driven by one driver DRV. Here, n and m are real numbers, e.g., integers.

In accordance with the aspects and implementations of the present disclosure, n denotes a sequence number of a row, the number of rows in each of the first sub-driving area SDA1 and the second sub-driving area SDA2, the number of row lines RL in each of the first sub-driving area SDA1 and the second sub-driving area SDA2, or the number of pixel rows in each of the first sub-driving area SDA1 and the second sub-driving area SDA2. Further, m denotes a sequence number of a column, the number of columns in each of the first sub-driving area SDA1 and the second sub-driving area SDA2, the number of column lines CL in each of the first sub-driving area SDA1 and the second sub-driving area SDA2, or the number of pixel columns in each of the first sub-driving area SDA1 and the second sub-driving area SDA2.

In accordance with the aspects and implementations of the present disclosure, n can be a natural number greater than or equal to 1, and m can be a natural number greater than or equal to 1.

The (2n×m) pixels P(1, 1), . . . , P(1, m), P(2, 1), . . . , P(2, m), . . . , P(2n, 1), . . . , and P(2n, m) can be arranged in 2n rows R(1), . . . , and R(2n) and m columns C(1), . . . , and C(m).

Among the (2n×m) pixels P(1, 1), . . . , P(1, m), P(2, 1), . . . , P(2, m), . . . , P(2n, 1), . . . , and P(2n, m), (n×m) pixels P(1, 1), . . . , P(1, m), P(2, 1), . . . , P(2, m), . . . , P(n, 1), . . . , and P(n, m) arranged in first to $n^{th}$ rows R(1), . . . , and R(n) can be disposed in the first sub-driving area SDA1.

Among the (2n×m) pixels P(1, 1), . . . , P(1, m), P(2, 1), . . . , P(2, m), . . . , P(2n, 1), . . . , and P(2n, m), (n×m) pixels P(n+1, 1), . . . , P(n+1, m), P(n+2, 1), . . . , P(n+2, m), . . . , P(2n, 1), . . . , and P(2n, m) arranged in $(n+1)^{th}$ to $2n^{th}$ rows R(n+1), . . . , and R(2n) can be disposed in the second sub-driving area SDA2.

The one unit driving area UDA can include 2n row lines RL(1), . . . , and RL(2n) to drive the (2n×m) pixels P(1, 1), . . . , P(1, m), P(2, 1), . . . , P(2, m), . . . , P(2n, 1), . . . , and P(2n, m).

Among the 2n row lines RL(1), . . . , and RL(2n), the first to nth row lines RL(1), . . . , and RL(n) can be disposed in the first sub-driving area SDA1. Among the 2n row lines RL(1), . . . , and RL(2n), $(n+1)^{th}$ to $2n^{th}$ row lines RL(n+1), . . . , and RL(2n) can be disposed in the second sub-driving area SDA2.

Each of the 2n rows RL(1), . . . , and RL(2n) can overlap m pixels. For example, the first row line RL(1) can overlap m pixels P(1, 1), . . . , and P(1, m) arranged in the first row R(1). The $n^{th}$ row line RL(n) can overlap m pixels P(n, 1), . . . , and P(n, m) arranged in the nth row R(n). The $(n+1)^{th}$ row line RL(n+1) can overlap m pixels P(n+1, 1), . . . , and P(n+1, m) arranged in the $(n+1)^{th}$ row R(n+1). The $2n^{th}$ row line RL(2n) overlap m pixels P(2n, 1), . . . , and P(2n, m) arranged in the $2n^{th}$ row R(2n).

For example, the first row line RL(1) can be connected to k sub-pixels SPa, SPb, and SPc) included in each of m pixels P(1, 1), . . . , and P(1, m) arranged in the first row R(1). More specifically, the first row line RL(1) can be connected to second electrodes of k light-emitting elements EDa, EDb, and EDc included in each of the m pixels P(1, 1), . . . , and P(1, m)) arranged in the first row R(1).

For example, the $n^{th}$ row line Rl(n) can be connected to the k sub-pixels SPa, SPb, and SPc included in each of the m pixels P(n, 1), . . . , and P(n, m) arranged in the $n^{th}$ row R(n). More specifically, the $n^{th}$ row line RL(n) can be connected to second electrodes of the k light-emitting elements EDa, EDb, and EDc included in each of the m pixels P(n, 1), . . . , and P(n, m) arranged in the $n^{th}$ row R(n).

For example, the $(n+1)^{th}$ row line RL(n+1) can be connected to the k sub-pixels SPa, SPb, and SPc included in each of m pixels P(n+1, 1), . . . , and P(n+1, m) arranged in the $(n+1)^{th}$ row R(n+1). More specifically, the $(n+1)^{th}$ row line Rl(n+1) can be connected to the second electrodes of the k light-emitting elements EDa, EDb, and EDc included in each of the m pixels P(n+1, 1), . . . , and P(n+1, m) arranged in the $(n+1)^{th}$ row R(n+1).

For example, the $2n^{th}$ row line RL(2n) can be connected to the k sub-pixels SPa, SPb, and SPc included in each of the m pixels P(2n, 1), . . . , and P(2n, m) arranged in the $2n^{th}$ row R(2n). More specifically, the $2n^{th}$ row line RL(2n) can be connected to the second electrodes of the k light-emitting elements EDa, EDb, and EDc included in each of the m pixels P(2n, 1), . . . , and P(2n, m) arranged in the $2n^{th}$ row R(2n).

The one unit driving area UDA can include (m×k×2) column lines CL to drive the (2n×m) pixels P(1, 1), . . . , P(1, m), P(2, 1), . . . , P(2, m), . . . , P(2n, 1), . . . , and P(2n, m).

Figure 5:
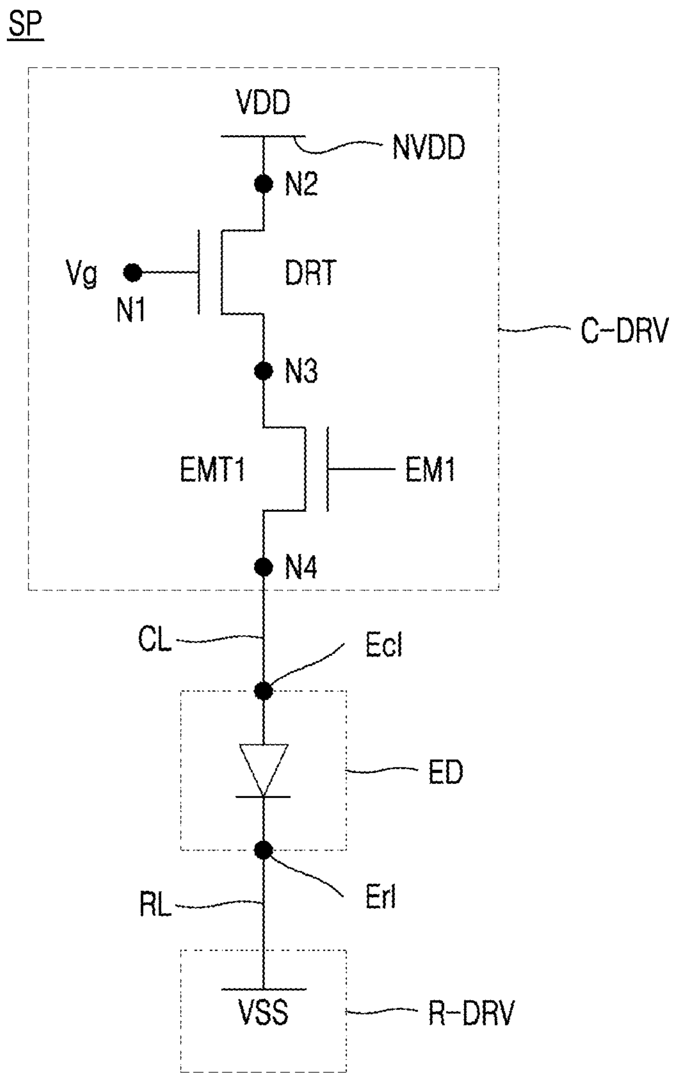
FIG. 5 illustrates a sub-pixel of the display panel according to the aspects and implementations of the present disclosure.

Here, k denotes the number of sub-pixels SP included in one pixel P. In the example of FIG. 5, k is 3. For example, the one pixel P can include three sub-pixels SPa, SPb, and SPc.

The first sub-driving area SDA1 can include (m×k) column lines CL to drive the (n×m) pixels P(1, 1), . . . , P(1, m), . . . , P(n, 1), . . . , and P(n, m) arranged in the first sub-driving area SDA1. In the example of FIG. 5, since k is 3, the first sub-driving area SDA1 can include 3m column lines CL.

In the first sub-driving area SDA1, k column lines CLa, CLb, and CLc can be disposed in each of the m columns C(1), . . . , and C(m). In the example of FIG. 5, since k is 3, in the first sub-driving area SDA1, each of the m columns C(1), . . . , and C(m) can include the three column lines CLa, CLb, and CLc.

In each of the m columns C(1), . . . , and C(m), each of the k column lines CL can be connected in common to n pixels arranged in the corresponding column. In each of the m columns C(1), . . . , and C(m), each of the k column lines CL can be connected in common to first electrodes of n light-emitting elements ED arranged in the corresponding column. In the example of FIG. 5, since k is 3, in each of the m columns C(1), . . . , and C(m), the three column lines CLa, CLb, and CLc can be connected to the first electrodes of 3n light-emitting elements ED included in n pixels arranged in the corresponding column. For example, in each of the m columns C(1), . . . , and C(m), a first column line CLa can be connected in common to the first electrodes of n first light-emitting elements EDa arranged in the corresponding column. In each of the m columns C(1), . . . , and C(m), a second column line CLb can be connected in common to the first electrodes of n second light-emitting elements EDb arranged in the corresponding column. In each of the m columns C(1), . . . , and C(m), a third column line CLc can be connected in common to the first electrodes of the n third light-emitting elements EDc arranged in the corresponding column.

The second sub-driving area SDA2 can include (m×k) column lines CL to drive (n×m) pixels P(n+1, 1), . . . , P(n+1, m), . . . , P(2n, 1), . . . , and P(2n, m) arranged in the second sub-driving area SDA2. In the example of FIG. 5, since k is 3, the second sub-driving area SDA2 can include 3m column lines CL.

In the second sub-driving area SDA2, k column lines CL can be disposed in each of the m columns C(1), . . . , and C(m). In the example of FIG. 5, since k is 3, in the first sub-driving area SDA1, each of the m columns C(1), . . . , and C(m) can include the three column lines CLa, CLb, and CLc.

In each of the m columns C(1), . . . , and C(m), each of the k column lines CL can be connected in common to n pixels arranged in the corresponding column. In each of the m columns C(1), . . . , and C(m), each of the k column lines CL can be connected in common to first electrodes of n light-emitting elements ED arranged in the corresponding column. In the example of FIG. 5, since k is 3, in each of the m columns C(1), . . . , and C(m), the three column lines CLa, CLb, and CLc can be connected to the first electrodes of 3n light-emitting elements ED included in n pixels arranged in the corresponding column. For example, in each of the m columns C(1), . . . , and C(m), a first column line CLa can be connected in common to the first electrodes of n first light-emitting elements EDa arranged in the corresponding column. In each of the m columns C(1), . . . , and C(m), a second column line CLb can be connected in common to the first electrodes of n second light-emitting elements EDb arranged in the corresponding column. In each of the m columns C(1), . . . , and C(m), the third column line CLc can be connected in common to the first electrodes of n third light-emitting elements ED3 arranged in the corresponding column.

FIG. 5 illustrates the sub-pixel SP of the display panel 110 according to the aspects and implementations of the present disclosure.

Referring to FIG. 5, the sub-pixel SP according to the aspects and implementations of the present disclosure can include the light-emitting element ED including a first electrode Ecl and a second electrode Erl, a column driver C-DRV for driving the column line CL electrically connected to the first electrode Ecl of the light-emitting element ED, and a row driver R-DRV for driving the row line RL electrically connected to the second electrode Erl of the light-emitting element ED.

The light-emitting element ED can include the first electrode Ecl and the second electrode Erl. The first electrode Ecl can be electrically connected to the column line CL, and the second electrode Erl can be electrically connected to the row line RL. For example, the first electrode Ecl can be an anode electrode, and the second electrode Erl can be a cathode electrode. As another example, the first electrode Ecl can be a cathode electrode, and the second electrode Erl can be an anode electrode.

In the unit driving area UDA, the column driver C-DRV can be connected to a plurality of column lines CL and can drive a plurality of column lines CL. Each of the plurality of column lines CL can be connected in common to the first electrode Ecl of each of the plurality of light-emitting elements ED included in the plurality of sub-pixels SP arranged in the corresponding column.

In the unit driving area UDA, the row driver R-DRV can be connected to the plurality of row lines RL and can drive the plurality of row lines RL. Each of the plurality of row lines RL can be connected in common to the second electrodes Erl of each of the plurality of light-emitting elements ED included in the plurality of sub-pixels SP arranged in the corresponding row.

The column driver C-DRV can include a first node N1, a second node N2, a third node N3, and a fourth node N4. The column driver C-DRV can include a driving transistor DRT and a first light-emitting control transistor EMT1.

The first node N1 can be a node to which a voltage Vg for controlling the on-off of the driving transistor DRT is applied. The second node N2 can be a node electrically connected to a high-potential voltage node NVDD to which a high-potential voltage VDD is applied. The third node N3 can be a node to which the driving transistor DRT and the first light-emitting control transistor EMT1 are connected. The fourth node N4 can be a node to which the first light-emitting control transistor EMT1 and the light-emitting element ED are electrically connected and a node to which the column line CL is electrically connected. Here, a source electrode or drain electrode of the first light-emitting control transistor EMT1 and the first electrode Ecl of the light-emitting element ED can be connected in common to the column line CL.

The driving transistor DRT can serve to supply a driving current for allowing the light-emitting element ED to emit light, can be connected between the second node N2 and the third node N3, and can control the connection between the second node N2 and the third node N3 according to the voltage of the first node N1.

A gate electrode of the driving transistor DRT can be electrically connected to the first node N1, and the gate voltage Vg can be applied. The drain electrode or source electrode of the driving transistor DRT can be electrically connected to the second node N2. The source electrode or drain electrode of the driving transistor DRT can be electrically connected to the third node N3.

The first light-emitting control transistor EMT1 can control whether to connect a path along which the driving current flows and control whether to allow the light-emitting element ED to emit light.

When the driving transistor DRT and the first light-emitting control transistor EMT1 are turned on between the high potential voltage VDD and the low potential voltage VSS, the driving current can be supplied to the light-emitting element ED through the driving transistor DRT and the first light-emitting control transistor EMT1. Accordingly, the light-emitting element ED can emit light.

The first light-emitting control transistor EMT1 can be connected between the third node N3 and the fourth node N4 and can control the connection between the third node N3 and the fourth node N4 according to the first light-emitting control signal EM1. The first light-emitting control signal EM1 can be applied to a gate electrode of the first light-emitting control transistor EMT1. The drain electrode or source electrode of the first light-emitting control transistor EMT1 can be electrically connected to the third node N3. The source electrode or drain electrode of the first light-emitting control transistor EMT1 can be electrically connected to the fourth node N4.

The first light-emitting control signal EM1 can be a pulse width modulation (PWM) signal that varies every predefined time (e.g., each frame or each sub-frame included in one frame), but the aspects and implementations of the present disclosure are not limited thereto.

The first light-emitting control signal EM1 can be generated by the driver DRV or supplied to the driver DRV from a driving-related circuit, such as a timing controller.

The row driver R-DRV can drive at least one row line RL by supplying the low-potential voltage VSS to the at least one row line RL.

The row driver R-DRV can perform display-on driving or display-off driving for one row line RL.

The row driver R-DRV can supply a low-potential voltage for display-on driving to one row line RL to perform display-on driving for one row line RL. The row driver R-DRV can supply a low-potential voltage for display-off driving to one row line RL to perform display-off driving for one row line RL.

The low-potential voltage for display-on driving and the low-potential voltage for display-off driving can be different. For example, the low-potential voltage for display-on driving can be lower than the low-potential voltage for display-off driving. In accordance with the aspects and implementations of the present disclosure, the "low-potential voltage for display-on driving" is also referred to as the "first low-potential voltage," and the "low-potential voltage for display-off driving" is also referred to as the "second low-potential voltage."

The column driver C-DRV can further include at least one switching element and/or at least one transistor in addition to the driving transistor DRT and the first light-emitting control transistor EMT1. Each of the transistors included in the column driver C-DRV can be an n-type transistor or a p-type transistor.

The column driver C-DRV can further include at least one capacitor.

The column driver C-DRV can further include at least one circuit element. For example, the at least one circuit element can include a power output buffer.

The row driver R-DRV can include at least one switching element and/or at least one transistor. Each of the transistors included in the row driver R-DRV can be an n-type transistor or a p-type transistor.

The row driver R-DRV can further include at least one circuit element. For example, the at least one circuit element can include the power output buffer.

The column driver C-DRV and the row driver R-DRV can be internal circuits included in the driver DRV. As another example, the column driver C-DRV and the row driver R-DRV can be circuits that are not be included in the driver DRV and are formed on the substrate 210 of the display panel 110.

Figure 6:
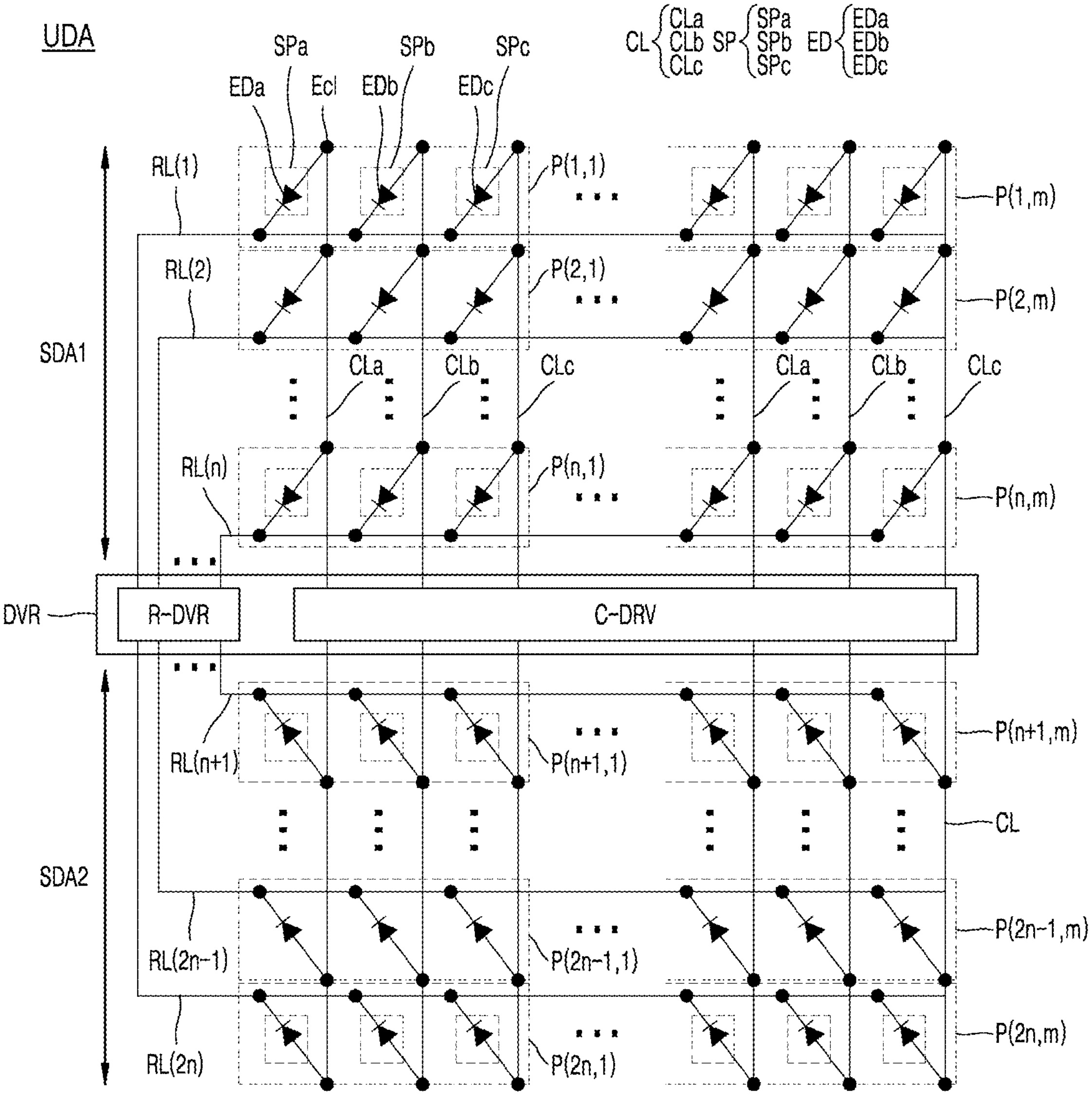
FIG. 6 is an equivalent circuit diagram illustrating the unit driving area of the display panel according to the aspects and implementations of the present disclosure.

FIG. 6 is an equivalent circuit diagram illustrating the unit driving area UDA of the display panel 110 according to the aspects and implementations of the present disclosure. The following description will be given with reference to FIGS. 4 and 5 together.

Referring to FIG. 6, each of the plurality of unit driving areas UDA can correspond to one of the plurality of drivers DRV. For example, one of the plurality of drivers DRV can be disposed in each of the plurality of unit driving areas UDA.

Referring to FIG. 6, each of the plurality of unit driving areas UDA can include two or more row lines RL(1) to RL(2n) among all row lines RL disposed on the display panel 110 and two or more column lines CL among all column lines CL disposed on the display panel 110.

Each of the plurality of unit driving areas UDA can include the first sub-driving area SDA1 and the second sub-driving area SDA2. Some of the two or more row lines RL(1) to RL(2n) can be disposed in the first sub-driving area SDA1, and the remaining ones can be disposed in the second sub-driving area SDA2. Some of the two or more column lines CL can be disposed in the first sub-driving area SDA1, and the remaining ones can be disposed in the second sub-driving area SDA2.

Each of the plurality of unit driving areas UDA can include the plurality of pixels P(1, 1), . . . , P(1, m), P(2, 1), . . . , P(2, m), . . . , P(2n, 1), . . . , and P(2n, m) arranged in a matrix form.

Each of the plurality of pixels P(1, 1), . . . , P(1, m), P(2, 1), . . . , P(2, m), . . . , P(2n, 1), . . . , and P(2n, m) can include k sub-pixels SPa, SPb, and SPc. The k sub-pixels SPa, SPb, and SPc can include k light-emitting elements EDa, EDb, and EDc.

Some of the plurality of pixels P(1, 1), . . . , P(1, m), P(2, 1), . . . , P(2, m), . . . , P(2n, 1), . . . , and P(2n, m) can be disposed in the first sub-driving area SDA1, and the remaining ones can be disposed in the second sub-driving area SDA2.

Here, k denotes the number of sub-pixels included in one pixel. In the example of FIG. 6, k is 3. For example, one pixel can include the three sub-pixels SPa, SPb, and SPc. According to the example in which k is 3, the structure of the unit driving area UDA will be exemplarily described.

The unit driving area UDA can include (2n×m) pixels P(1, 1), . . . , P(1, m), P(2, 1), . . . , P(2, m), . . . , P(2n, 1), . . . , and P(2n, m). The (2n×m) pixels P(1, 1), . . . , P(1, m), P(2, 1), . . . , P(2, m), . . . , P(2n, 1), . . . , and P(2n, m) can be arranged in 2n rows and m columns.

Each of the (2n×m) pixels P(1, 1), . . . , P(1, m), P(2, 1), . . . , P(2, m), . . . , P(2n, 1), . . . , and P(2n, m) can include the three sub-pixels SPa, SPb, and SPc.

The three sub-pixels SPa, SPb, and SPc can include the first sub-pixel SPa including the first light-emitting element EDa, the second sub-pixel SPb including the second light-emitting element EDb, and the third sub-pixel SPc including the third light-emitting element EDc.

The (n×m) pixels P(1, 1), . . . , P(1, m), . . . , P(n, 1), . . . , and P(n, m) that are half of the (2n×m) pixels P(1, 1), . . . , P(1, m), P(2, 1), . . . , P(2, m), . . . , P(2n, 1), . . . , and P(2n, m) can be disposed in the first sub-driving area SDA1.

The (n×m) pixels P(n+1, 1), . . . , P(n+1, m), . . . , P(2n, 1), . . . , and P(2n, m) that are the remaining half of the (2n×m) pixels P(1, 1), . . . , P(1, m), P(2, 1), . . . , P(2, m), . . . , P(2n, 1), . . . , and P(2n, m) can be disposed in the second sub-driving area SDA2.

The unit driving area UDA can include 2n row lines RL(1) to RL(2n) and (m×3×2) column lines CL.

Here, n row lines RL(1) to RL(n) that are half of the 2n row lines RL(1) to RL(2n) can be disposed in the first sub-driving area SDA1, and n row lines RL(n+1) to RL(2n) that are the remaining half of the 2n row lines RL(1) to RL(2n) can be disposed in the second sub-driving area SDA2.

The n row lines RL(1) to RL(n) disposed in the first sub-driving area SDA1 can correspond to the (n×m) pixels P(1, 1), . . . , P(1, m), . . . , P(n, 1), . . . , and P(n, m) disposed in the first sub-driving area SDA1 based on a row (a pixel row).

For example, the first row line RL(1) disposed in the first row (the first pixel row) among the n row lines RL(1) to RL(n) disposed in the first sub-driving area SDA1 can correspond to the m pixels P(1, 1), . . . , and P(1, m) included in the first pixel row. The first row line RL(1) can be electrically connected to all of the second electrodes Erl of each of 3m light-emitting elements ED included in the first pixel row.

As another example, the second row line RL(2) disposed in a second row (a second pixel row) among the n row lines RL(1) to RL(n) disposed in the first sub-driving area SDA1 can correspond to m pixels P(2, 1), . . . , and P(2, m) included in the second pixel row. The second row line RL(2) can be electrically connected to all of the second electrodes Erl of 3m light-emitting elements ED included in the second pixel row.

As another example, the $n^{th}$ row line RL(n) disposed in the $n^{th}$ row (the $n^{th}$ pixel row) among the n row lines RL(1) to RL(n) disposed in the first sub-driving area SDA1 can correspond to the m pixels P(n, 1), . . . , and P(n, m) included in the $n^{th}$ pixel row. The $n^{th}$ row line RL(n) can be electrically connected to all of the second electrodes Erl of the 3m light-emitting elements ED included in the $n^{th}$ pixel row.

The n rows RL(n+1) to RL(2n) disposed in the second sub-driving area SDA2 can correspond to the (n×m) pixels P(n+1, 1), . . . , P(n+1, m), . . . , P(2n, 1), . . . , and P(2n, m) disposed in the second sub-driving area SDA2 based on a row (a pixel row).

For example, the $(n+1)^{th}$ row line disposed in the $(n+1)^{th}$ row (the $(n+1)^{th}$ pixel row) among the n row lines RL(n+1) to RL(2n) disposed in the second sub-driving area SDA2 can correspond to the m pixels P(n+1, 1), . . . , and P(n+1, m) included in the $(n+1)^{th}$ pixel row. The $(n+1)^{th}$ row line RL(n+1) can be electrically connected to all of the second electrodes Erl of the 3m light-emitting elements ED included in the $(n+1)^{th}$ pixel row.

As another example, a $(2n-1)^{th}$ row line RL(2n−1) disposed in a $(2n-1)^{th}$ row (a $(2n-1)^{th}$ pixel row) among the n row lines RL(n+1) to RL(2n) disposed in the second sub-driving area SDA2 can correspond to the m pixels P(2n−1, 1), . . . , and P(2n−1, m) included in the $(2n-1)^{th}$ pixel row. The $(2n-1)^{th}$ row line RL(2n−1) can be electrically connected to all of the second electrodes Erl of the 3m light-emitting elements ED included in the $(2n-1)^{th}$ pixel row.

As another example, the $2n^{th}$ row line RL(2n) disposed in the $2n^{th}$ row (the $2n^{th}$ pixel row) among the n row lines RL(n+1) to RL(2n) disposed in the second sub-driving area SDA2 can correspond to the m pixels P(2n, 1), . . . , and P(2n, m) included in the $2n^{th}$ pixel row. The $2n^{th}$ row line RL(2n) can be electrically connected to all of the second electrodes Erl of the 3m light-emitting elements ED included in the $2n^{th}$ pixel row.

Further, 3m column lines CL that are half of the (m×3×2) column lines CL can be disposed in the first sub-driving area SDA1, and 3m column lines CL that are remaining half of the (m×3×2) column lines CL can be disposed in the second sub-driving area SDA2.

The 3m column lines CL disposed in the first sub-driving area SDA1 can correspond to the (n×m) pixels P(1, 1), . . . , P(1, m), . . . , P(n, 1), . . . , and P(n, m) disposed in the first sub-driving area SDA1 based on a column (a pixel column).

For example, three first column lines CLa, CLb, and Clc disposed in a first column (a first pixel column) among the 3m column lines CL disposed in the first sub-driving area SDA1 can correspond to n pixels P(1, 1), P(2, 1), . . . , and P(n, 1) disposed in the first pixel column.

In the first sub-driving area SDA1, three first column lines CLa, CLb, and CLc disposed in the first pixel column can be connected to the three sub-pixels SPa, SPb, and SPc included in each of the n pixels P(1, 1), P(2, 1), . . . , and P(n, 1) arranged in the first pixel column.

In the first sub-driving area SDA1, the three first column lines CLa, CLb, and CLc disposed in the first pixel column can be electrically connected to all of the first electrodes Ecl of three light-emitting elements EDa, EDb, and EDc included in each of the n pixels P(1, 1), P(2, 1), . . . , and P(n, 1) arranged in the first pixel column.

For example, three $m^{th}$ column lines CLa, CLb, and CLc disposed in the $m^{th}$ column (the $m^{th}$ pixel column) among the 3m column lines CL disposed in the first sub-driving area SDA1 can correspond to n pixels P(1, m), P(2, m), . . . , and P(n, m) arranged in the $m^{th}$ pixel column.

In the first sub-driving area SDA1, the three $m^{th}$ column lines CLa, CLb, and CLc disposed in the $m^{th}$ pixel column can be connected to the three sub-pixels SPa, SPb, and SPc included in each of the n pixels P(1, m), P(2, m), . . . , and P(n, m) arranged in the $m^{th}$ pixel column.

In the first sub-driving area SDA1, the three $m^{th}$ column lines CLa, CLb, and CLc disposed in the $m^{th}$ pixel column can be electrically connected to all of the first electrodes Ecl of the three light-emitting elements EDa, EDb, and EDc included in each of the n pixels P(1, m), P(2, m), . . . , and P(n, m) arranged in the $m^{th}$ pixel column.

Here, 3m column lines CL disposed in the second sub-driving area SDA2 can correspond to (n×m) pixels P(n+1, 1), . . . , P(n+1, m), . . . , P(2n, 1), . . . , and P(2n, m) disposed in the second sub-driving area SDA2 based on a column (a pixel column).

For example, three first column lines CLa, CLb, and CLc disposed in a first column (a first pixel column) among the 3m column lines CL disposed in the second sub-driving area SDA2 can correspond to n pixels P(n+1, 1), . . . , P(2n−1, 1), and P(2n, 1) arranged in the first pixel column.

In the second sub-driving area SDA2, the three first column lines CLa, CLb, and CLc disposed in the first pixel column can be connected to three sub-pixels SPa, SPb, and SPc included in each of n pixels P(n+1, 1), . . . , P(2n−1, 1), and P(2n, 1) arranged in the first pixel column.

In the second sub-driving area SDA2, the three first column lines CLa, CLb, and CLc disposed in the first pixel column can be electrically connected to all of the first electrodes Ecl of the three light-emitting elements EDa, EDb, and EDc included in each of the n pixels P(n+1, 1), . . . , P(2n−1, 1), and P(2n, 1) arranged in the first pixel column.

For example, three $m^{th}$ column lines CLa, CLb, and CLc disposed in an $m^{th}$ column (an $m^{th}$ pixel column) among the 3m column lines CL disposed in the second sub-driving area SDA2 can correspond to n pixels P(n+1, m), . . . , P(2n−1, m), and P(2n, m) arranged in the $m^{th}$ pixel column.

In the second sub-driving area SDA2, the three $m^{th}$ column lines CLa, CLb, and CLc disposed in the $m^{th}$ pixel column can be connected to three sub-pixels SPa, SPb, and SPc included in each of the n pixels P(n+1, m), . . . , P(2n−1, m), and P(2n, m) disposed in the $m^{th}$ pixel column.

In the second sub-driving area SDA2, the three $m^{th}$ column lines CLa, CLb, and CLc disposed in the $m^{th}$ pixel column can be electrically connected to all of the first electrodes Ecl of the three light-emitting elements EDa, EDb, and EDc included in each of the n pixels P(n+1, m), . . . , P(2n−1, m), and P(2n, m) arranged in the m-th pixel column.

Two or more row lines RL(1) to RL(2n) disposed in the unit driving area UDA can be electrically connected to the row driver R-DRV included in the driver DRV of the unit driving area UDA. The two or more column lines CL disposed in the unit driving area UDA can be electrically connected to the column driver C-DRV included in the driver DRV of the unit driving area UDA.

The driver DRV can be disposed between the first sub-driving area SDA1 and the second sub-driving area SDA2.

Figure 7:
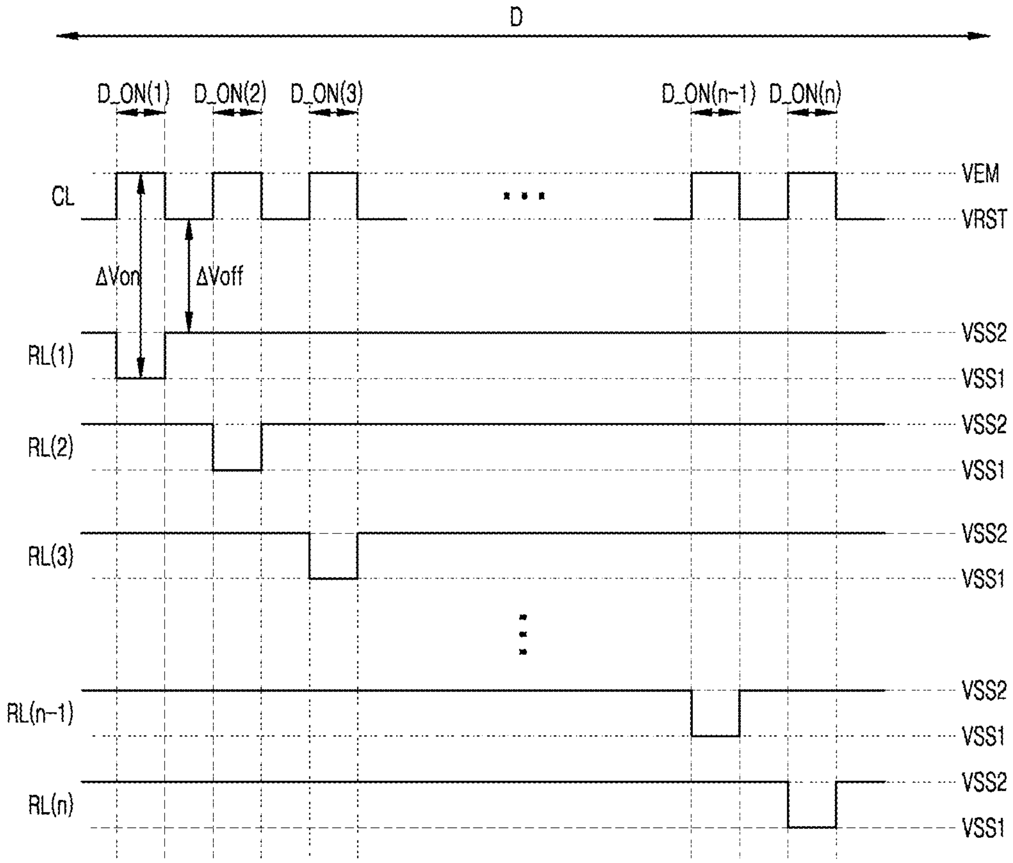
FIG. 7 illustrates a driving timing diagram for n row lines and 1 column lines that are included in a first sub-driving area of the display panel according to the aspects and implementations of the present disclosure.

FIG. 7 illustrates a driving timing diagram for n row lines RL(1) and one column line CL that are included in the first sub-driving area SDA1 of the display panel 110 according to the implementation of the present disclosure. However, the following description will be given with reference to FIG. 6 together.

Referring to FIGS. 6 and 7, the row driver R-DRV of the driver DRV can drive the n row lines RL(1) to RL(n) disposed in the first sub-driving area SDA1.

The driving for each of the n row lines RL(1) to RL(n) disposed in the first sub-driving area SDA1 can include display-on driving for allowing the light-emitting elements ED arranged in each of the n row lines RL(1) to RL(n) to emit light and display-off driving for allowing the light-emitting elements ED arranged in each of the n row lines RL(1) to RL(n) not to emit light.

With respect to a driving sequence for each of the n row lines RL(1) to RL(n) disposed in the first sub-driving area SDA1, the following methods can be given as examples.

For example, the display-on driving for each of the plurality of row lines RL can be sequentially performed. As another example, the display-on driving for each of the plurality of row lines RL can be simultaneously performed. As still another example, the display-on driving for each of two or more row lines RL among the plurality of row lines RL can be simultaneously performed. Hereinafter, for convenience of description, a case in which display-on driving for each of the plurality of row lines RL is sequentially performed will be described as an example. However, the aspects and implementations of the present disclosure are not limited thereto.

The row driver R-DRV of the driver DRV can drive the n row lines RL(1) to RL(n) disposed in the first sub-driving area SDA1. For example, display-on driving periods D_ON(1) to D_ON(n) for n row lines RL(1) to RL(n) disposed in the first sub-driving area SDA1 can be sequential.

Based on one of the n row lines RL(1) to RL(n) disposed in the first sub-driving area SDA1, during a display driving period D, the display-on driving period D_ON(1) for the corresponding row line RL can be present at least once. In the display driving period D, all remaining times excluding the display-on driving period D_ON(1) for the corresponding row line RL can be a display-off driving period.

Referring to FIG. 7, during any one display driving period D, among the n row lines RL(1) to RL(n) disposed in the unit driving area UDA, the display-on driving can be performed on at least one row line RL, and the display-off driving can be performed on the remaining row lines RL instead of the display-on driving.

For example, during any one display driving period D, among the n row lines RL(1) to RL(n) disposed in the unit driving area UDA, the display-on driving can be performed on the first row line RL(1), and the display-off driving can be performed on the second to $n^{th}$ row lines RL(2) to RL(n) instead of the display-on driving.

As another example, during any one display driving period D, among the n row lines RL(1) to RL(n) disposed in the unit driving area UDA, the display-on driving can be performed on the second row line RL(2), and the display-off driving can be performed on the first row line RL(1) and the third to $n^{th}$ row lines RL(3) to RL(n) instead of the display-on driving.

As still another example, during any one display driving period D, among the n row lines RL(1) to RL(n) disposed in the unit driving area UDA, the display-on driving can be performed on the third row line RL(3), and the display-off driving can be performed on the first and second row lines RL(1) and RL(2) and the fourth to nth row lines RL(4) to RL(n) instead of the display-on driving.

As yet another example, during any one display driving period D, among the n row lines RL(1) to RL(n) disposed in the unit driving area UDA, the display-on driving can be performed on the $(n-1)^{th}$ row line RL(n−1), and the display-off driving can be performed on the first to $(n-2)^{th}$ row lines RL(1) to RL(n−2) and the $n^{th}$ row line RL(n) instead of the display-on driving.

As yet another example, during any one display driving period D, among the n row lines RL(1) to RL(n) disposed in the unit driving area UDA, the display-on driving can be performed on the $n^{th}$ row line RL(n), and the display-off driving can be performed on the first to $(n-1)^{th}$ row lines RL(1) to RL(n−1) instead of the display-on driving.

When the display-on driving is performed on any row line RL among the n row lines RL(1) to RL(n) disposed in the unit driving area UDA, it can mean that a first low-potential voltage VSS1 of a predefined level is supplied to the corresponding row line RL. When the display-on driving is performed on any row line RL, the light-emitting elements ED arranged to correspond to the corresponding row line RL can emit light.

When the display-off driving is performed on any row line RL among the n row lines RL(1) to RL(n) disposed in the unit driving area UDA instead of the display-on driving, it can mean that a second low-potential voltage VSS2 of a predefined level is supplied to the corresponding row line RL. When the display-off driving is performed on any row line RL, the light-emitting elements ED arranged to correspond to the corresponding row line RL may not emit light.

The first low-potential voltage VSS1 can be the low-potential voltage VSS for display-on driving, and the second low-potential voltage VSS2 can be the low-potential voltage VSS for display-off driving. The second low potential voltage VSS2 can be set to be higher than the first low potential voltage VSS1.

Any one row line RL among the n row lines RL(1) to RL(n) disposed in the unit driving area UDA can receive the first low-potential voltage VSS1 during a first period and receive the second low-potential voltage VSS2 higher than the first low-potential voltage VSS1 during a second period different from the first period. For example, the first period and the second period can be included in one display driving period D. As another example, the first period and the second period can be included in different display driving periods D.

For example, the first row line RL(1) among the n row lines RL(1) to RL(n) disposed in the unit driving area UDA can receive the first low-potential voltage VSS1 during the first display-on driving period D_ON(1) and receive the second low-potential voltage VSS2 higher than the first low-potential voltage VSS1 during the second display-on driving period D_ON(2) to D_ON(n) different from the first display-on driving period D_ON(1).

For example, during the first display-on driving period D_ON(1), the first row line RL(1) can receive the first low-potential voltage VSS1, and the second to $n^{th}$ row lines RL(2) to RL(n) can receive the second low-potential voltage VSS2. During the second display-on driving period D_ON (2), the second row line RL(2) can receive the first low-potential voltage VSS1, and the first row line RL(1) and the third to $n^{th}$ row lines RL(3) to RL(n) can receive the second low-potential voltage VSS2.

For example, during the first display-on driving period D_ON(1), a plurality of light-emitting elements ED that overlap the first row line RL(1) and are arranged in the first row can emit light, and a plurality of light-emitting elements ED that overlap the second to $n^{th}$ row lines RL(2) to RL(n) and are arranged in the second to $n^{th}$ rows may not emit light. During the second display-on driving period D_ON(2), a plurality of light-emitting elements ED that overlap the second row line RL(1) and are arranged in the second row line RL(1) can emit light, and a plurality of light-emitting elements ED that overlap the third to $n^{th}$ row lines RL(3) to RL(n) and are arranged in the first row and the third to $n^{th}$ rows may not emit light.

For example, the first display-on driving period D_ON(1) and the second display-on driving period D_ON(2) to D_ON (n) can be included in one display driving period D. As another example, the first display-on driving period D_ON (1) and the second display-on driving period D_ON(2) to D_ON(n) can be included in different display driving periods D.

Here, (m×k) column lines CL can be disposed in the unit driving area UDA. In the unit driving area UDA, the (m×k) column lines CL can intersect with the n row lines RL(1) to RL(n). The column line CL illustrated in FIG. 7 can be one of (m×k) column lines CL.

During the display driving period D, a display voltage VEM required to allow the corresponding light-emitting element ED to emit light in synchronization with the display-on driving period D_ON(1) to D_ON(n) of each of the n row lines RL(1) to RL(n). Here, the display voltage VEM is also referred to as a light-emitting driving voltage.

In the display driving period D, during all of the remaining times excluding the display-on driving period D_ON(1) ~D_ON(n) of each of the n row lines RL(1) to RL(n), a reset voltage VRST can be applied to each of the (m×k) column lines CL intersecting the n row lines RL(1) to RL(n).

The display voltage VEM can be a constant voltage or a voltage that varies according to an image signal. The reset voltage VRST can be a voltage lower than the display voltage VEM and a constant voltage or a variable voltage.

In the display driving period D, during the display-on driving period D_ON(1) to D_ON(n) of each of the n row lines RL(1) to RL(n), a voltage difference (VEM−VSS1) between the display voltage VEM applied to the corresponding column line CL and the first low-potential voltage VSS1 applied to the corresponding row line RL can be a display-on voltage ΔVon.

The light-emitting element ED can be connected between the corresponding column line CL and the corresponding row line RL. The display voltage VEM and the first low-potential voltage VSS1 can be applied to each of the first electrode Ecl and the second electrode Erl of the light-emitting element ED.

The display-on voltage ΔVon can be a voltage difference between the first electrode Ecl and the second electrode Erl of the corresponding light-emitting element ED and can be a voltage capable of emitting light. For example, the display-on voltage ΔVon can be higher than or equal to a threshold voltage, which is a unique characteristic of the corresponding light-emitting element ED.

In the display driving period D, during all of the remaining times excluding the display-on driving period D_ON(1) to D_ON(n) of each of the n row lines RL(1) to RL(n), a voltage difference (VRST−VSS2) between the reset voltage VRST applied to the corresponding column line CL and the second low-potential voltage VSS2 applied to the corresponding row line RL can be a display-off voltage ΔVoff.

The light-emitting element ED can be connected between the corresponding column line CL and the corresponding row line RL. The reset voltage VRST and the second low-potential voltage VSS2 can be applied to each of the first electrode Ecl and the second electrode Erl of the light-emitting element ED.

The display-off voltage ΔVoff can be a voltage difference between the first electrode Ecl and the second electrode Erl of the corresponding light-emitting element ED and can be a voltage that cannot allow the corresponding light emitting element to emit light. For example, the display-off voltage ΔVoff can be lower than the threshold voltage, which is a unique characteristic of the corresponding light-emitting element ED. For example, the display-on voltage ΔVon can be higher than or equal to the display-off voltage ΔVoff.

Hereinafter, a circuit for driving n light-emitting elements ED(1) to ED(n) connected to one column line CL in the display panel 110 according to the aspects and implementations of the present disclosure will be described in more detail.

Figure 8:
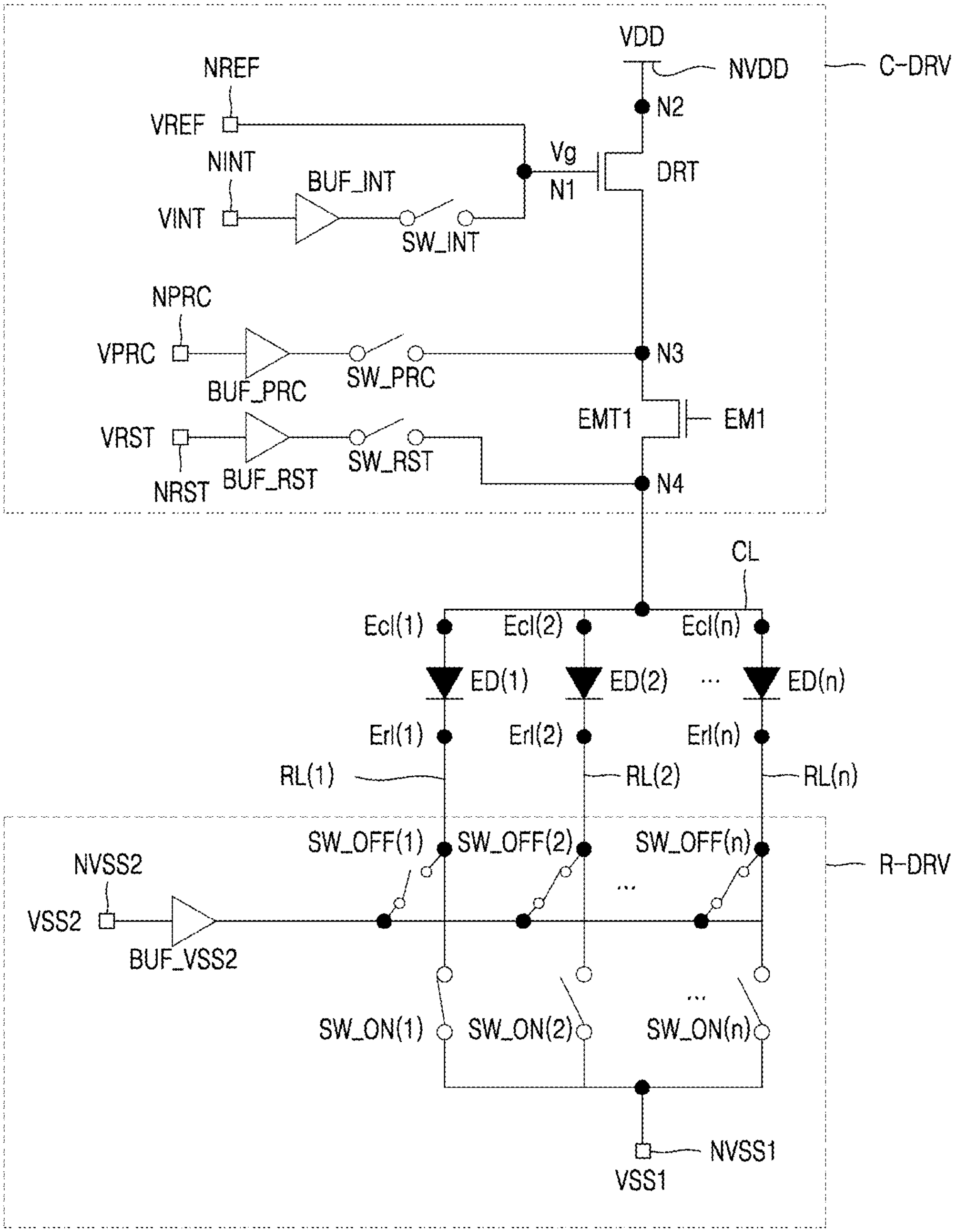
FIG. 8 illustrates a circuit for driving n light-emitting elements connected to one column line included in the first sub-driving area of the display panel according to the aspects and implementations of the present disclosure.

FIG. 8 illustrates a circuit for driving the n light-emitting elements ED(1) to ED(n) connected to one column line CL included in the first sub-driving area SDA1 of the display panel 110 according to the aspects and implementations of the present disclosure. The following description will be given with reference to FIGS. 4 and 6 together.

Referring to FIG. 8, the n light-emitting elements ED(1) to ED(n) connected to the one column line CL can be arranged in the same column. The n light-emitting elements ED(1) to ED(n) arranged in the same column can be connected to the one column line CL. The n light-emitting elements ED(1) to ED(n) connected to the one column line CL can be disposed in one of the first sub-driving area SDA1 and the second sub-driving area SDA2 that are included in the unit driving area UDA.

The n light-emitting elements ED(1) to ED(n) connected to the one column line CL can be light-emitting elements that emit light of the same color. The n light-emitting elements ED(1) to ED(n) arranged in the same column can be light-emitting elements that emit light of the same color.

For example, the n light-emitting elements ED(1) to ED(n) arranged in the same column can sequentially emit light. As another example, the n light-emitting elements ED(1) to ED(n) arranged in the same column can simultaneously emit light. As still another example, two or more of the n light-emitting elements ED(1) to ED(n) arranged in the same column can simultaneously emit light.

The n light-emitting elements ED(1) to ED(n) arranged in the same column can include first electrodes Ecl(1) to Ecl(n) and second electrodes Erl(1) to Erl(n).

All of the first electrodes Ecl(1) to Ecl(n) of the n light-emitting elements ED(1) to ED(n) arranged in the same column can be connected to one column line CL. The second electrodes Erl(1) to Erl(n) of the n light-emitting elements ED(1) to ED(n) arranged in the same column can be connected to the n row lines RL(1) to RL(n), respectively.

Further, a circuit for driving the n light-emitting elements ED(1) to ED(n) arranged in the same column can include the column driver C-DRV and the row driver R-DRV.

The column driver C-DRV can be configured to drive the column line CL connected to all of the first electrodes Ecl(1) to Ecl(n) of the n light-emitting elements ED(1) to ED(n) arranged in the same column.

The row driver R-DRV can be configured to drive the n row lines RL(1) to RL(n) that are respectively connected to the second electrodes Erl(1) to Erl(n) of the n light-emitting elements ED(1) to ED(n) arranged in the same column.

The column driver C-DRV can include first to fourth nodes N1 to N4 and include the driving transistor DRT and the first light-emitting control transistor EMT1.

The first node N1 can be a node to which the voltage Vg for controlling the on-off of the driving transistor DRT is applied. The second node N2 can be a node electrically connected to the high-potential voltage node NVDD to which the high-potential voltage VDD is applied. The third node N3 can be a node to which the driving transistor DRT and the first light-emitting control transistor EMT1 are connected. The fourth node N4 can be a node to which the first light-emitting control transistor EMT1 and the n light-emitting elements ED(1) to ED(n) are electrically connected and a node to which the column line CL is electrically connected. Here, the source electrode or drain electrode of the first light-emitting control transistor EMT1 and the first electrodes Ecl(1) to Ecl(n) of the n light-emitting elements ED(1) to ED(n) can be connected in common to the column line CL.

The driving transistor DRT can serve to supply a driving current for allowing the n light-emitting elements ED1 to ED(n) to emit light, can be connected between the second node N2 and the third node N3, and can control the connection between the second node N2 and the third node N3 according to the voltage of the first node N1.

The gate electrode of the driving transistor DRT can be electrically connected to the first node N1, and the gate voltage Vg can be applied. The drain electrode or source electrode of the driving transistor DRT can be electrically connected to the second node N2. The source electrode or drain electrode of the driving transistor DRT can be electrically connected to the third node N3.

The first light-emitting control transistor EMT1 can control whether to connect a path along which the driving current flows and control whether to allow the light-emitting element ED to emit light.

The first light-emitting control transistor EMT1 can be connected between the third node N3 and the fourth node N4 and can control the connection between the third node N3 and the fourth node N4 according to the first light-emitting control signal EM1. The first light-emitting control signal EM1 can be applied to a gate electrode of the first light-emitting control transistor EMT1. The drain electrode or source electrode of the first light-emitting control transistor EMT1 can be electrically connected to the third node N3. The source electrode or drain electrode of the first light-emitting control transistor EMT1 can be electrically connected to the fourth node N4.

The first light-emitting control signal EM1 can be a PWM signal that varies every predefined time (e.g., each frame or each sub-frame included in one frame), but the aspects and implementations of the present disclosure are not limited thereto.

The first light-emitting control signal EM1 can be generated by the driver DRV or supplied to the driver DRV from a driving-related circuit, such as a timing controller.

The column driver C-DRV can further include a reference voltage node NREF electrically connected to the first node N1. A reference voltage VREF can be applied to the reference voltage node NREF. Here, the reference voltage VREF can be the gate voltage Vg of the driving transistor DRT.

For example, the reference voltage VREF can always have a constant voltage value.

As another example, the reference voltage VREF can have a different voltage value according to the color light emitted from the light-emitting element ED on which the display-on driving is performed. For example, the reference voltage VREF applied to the first node N1 during a driving period for allowing the light-emitting element EDa that emits light of a first color to emit light, the reference voltage VREF applied to the first node N1 during a driving period for allowing the light-emitting element EDb that emits light of a second color to emit light, and the reference voltage VREF applied to the first node N1 during a driving period for allowing the light-emitting element EDc that emits light of a third color to emit light can have different voltage values.

The column driver C-DRV can further include an initialization voltage node NINT electrically connected to the first node N1 through an initialization switch SW_INT. An initialization voltage VINT can be applied to the initialization voltage node NINT. Here, the initialization voltage VINT can be the gate voltage Vg of the driving transistor DRT.

The column driver C-DRV can further include an initialization buffer BUF_INT connected between the initialization switch SW_INT and the initialization voltage node NINT. The initialization buffer BUF_INT can amplify the initialization voltage VINT applied to the initialization voltage node NINT and supply the amplified initialization voltage VINT to the first node N1.

The column driver C-DRV can further include a pre-charge voltage node NPRC electrically connected to the third node N3 through a pre-charge switch SW_PRC. A pre-charge voltage VPRC can be applied to the pre-charge voltage node NPRC.

The column driver C-DRV can further include a pre-charge buffer BUF_PRC connected between the pre-charge switch SW_PRC and the pre-charge voltage node NPRC. The pre-charge buffer BUF_PRC can amplify the pre-charge voltage VPRC applied to the pre-charge voltage node NPRC and supply the amplified pre-charge voltage VPRC to the third node N3.

The column driver C-DRV can further include a reset voltage node NRST electrically connected to the fourth node N4 through a reset switch SW_RST. The reset voltage VRST can be applied to the reset voltage node NRST.

The column driver C-DRV can further include the reset buffer BUF_RST connected between the reset switch SW_RST and the reset voltage node NRST. The reset buffer BUF_RST can amplify the reset voltage VRST applied to the reset voltage node NRST and supply the amplified reset voltage VRST to the fourth node N4. Here, the fourth node N4 can be electrically connected to the corresponding column line CL.

The row driver R-DRV can be configured to drive the n row lines RL(1) to RL(n) respectively connected to second electrodes Erl(1) to Erl(n) of the n light-emitting elements ED(1) to ED(n) arranged in the same column.

The row driver R-DRV can include n display-on switches SW_ON(1) to SW_ON(n) electrically connecting the n row lines RL(1) to RL(n) to a first low-potential voltage node NVSS1, respectively. The first low-potential voltage VSS1 can be applied to the first low-potential voltage node NVSS1.

A turn-on timing of each of the n display-on switches SW_ON(1) to SW_ON(n) can be different. Accordingly, the display-on driving can be performed sequentially on the n row lines RL(1) to RL(n).

The row driver R-DRV can include n display-off switches SW_OFF(1) to SW_OFF(n) that electrically connect the n row lines RL(1) to RL(n) to a second low-potential voltage node NVSS2 to which the second low-potential voltage VSS2 is applied, respectively. The second low-potential voltage VSS2 can be higher than the first low-potential voltage VSS1. The row driver R-DRV can further include a second low-potential buffer BUF_VSS2 connected between the n display-off switches SW_OFF(1) to SW_OFF(n) and the second low-potential voltage node NVSS2.

A turn-on timing of each of the n display-off switches SW_OFF(1) to SW_OFF(n) can be different. Accordingly, the display-off driving can be performed on the n display-off switches SW_OFF(1) to SW_OFF(n) at different timings.

The row driver R-DRV can perform the display-on driving on the first row line RL(1) among the n row lines RL(1) to RL(n) and perform the display-off driving on the second to nth row lines RL(2) to RL(n).

To this end, a first display-on switch SW_ON(1) among the n display-on switches SW_ON(1) to SW_ON(n) can be turned on, and second to $n^{th}$ display-on switches SW_ON(2) to SW_ON(n) can be turned off. In addition, a first display-off switch SW_OFF(1) among the n display-off switches SW_OFF(1) to SW_OFF(n) can be turned off, and second to $n^{th}$ display-off switches SW_OFF(2) to SW_OFF(n) can be turned on.

Accordingly, among the n row lines RL(1) to RL(n), the first low-potential voltage VSS1 can be applied to the first row line RL(1), and the second low-potential voltage VSS2 can be applied to the second to $n^{th}$ row lines RL(2) to RL(n). Here, the first low-potential voltage VSS1 can have a lower voltage value than the second low-potential voltage VSS2.

Each of all of the transistors DRT and EM1 included in the column driver C-DRV can be an n-type transistor or a p-type transistor. The switches SW_ON(1) to SW_ON(n) and SW_OFF(1) to SW_OFF(n) included in the row driver R-DRV can be implemented as an n-type transistor or a p-type transistor. The column driver C-DRV can further include at least one capacitor.

Meanwhile, the different circuit structures of the column driver C-DRV and the row driver R-DRV are exemplarily described with reference to FIGS. 9A and 9B.

Figure 9A:
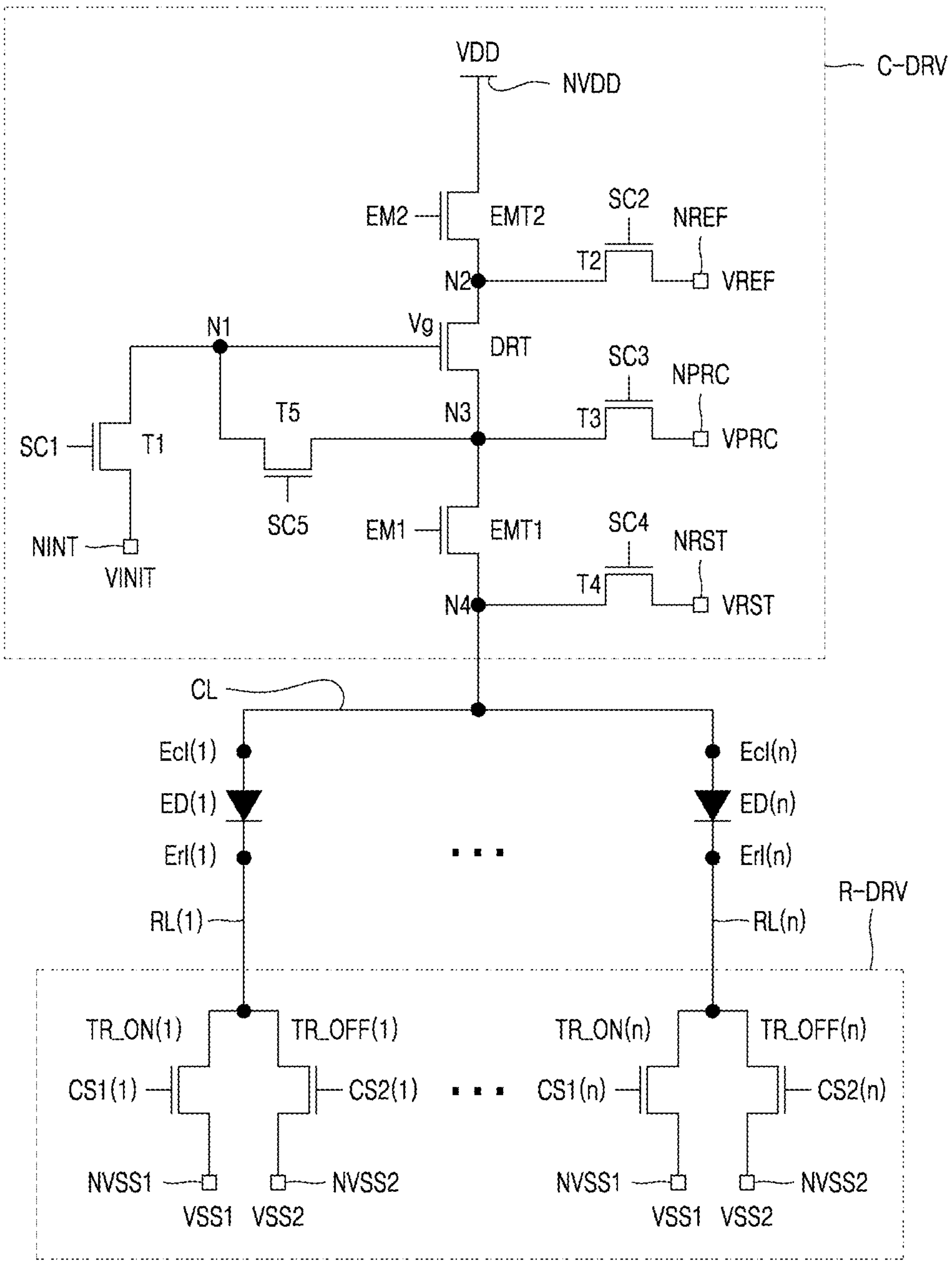
FIG. 9A illustrates a circuit for driving n light-emitting elements connected to one column line included in a first sub-driving area of a display panel according to another implementation of the present disclosure.

FIG. 9A illustrates another circuit for driving the n light-emitting elements ED(1) to ED(n) connected to one column line CL included in the first sub-driving area SDA1 of the display panel 110 according to another implementation of the present disclosure. In the following description, the description of the same content as that of the circuit of FIG. 8 can be omitted.

Referring to FIG. 9A, the n light-emitting elements ED(1) to ED(n) connected to the one column line CL can be arranged in the same column. The n light-emitting elements ED(1) to ED(n) arranged in the same column can be connected to the one column line CL. The n light-emitting elements ED(1) to ED(n) connected to the one column line CL can be disposed in one of the first sub-driving area SDA1 and the second sub-driving area SDA2 that are included in the unit driving area UDA.

The n light-emitting elements ED(1) to ED(n) connected to the one column line CL can be light-emitting elements that emit light of the same color. The n light-emitting elements ED(1) to ED(n) arranged in the same column can be light-emitting elements that emit light of the same color.

The n light-emitting elements ED(1) to ED(n) arranged in the same column can include the first electrodes Ecl(1) to Ecl(n) and the second electrodes Erl(1) to Erl(n).

All of the first electrodes Ecl(1) to Ecl(n) of the n light-emitting elements ED(1) to ED(n) arranged in the same column can be connected to one column line CL. The second electrodes Erl(1) to Erl(n) of the n light-emitting elements ED(1) to ED(n) arranged in the same column can be connected to the n row lines RL(1) to RL(n), respectively.

A circuit for driving the n light-emitting elements ED(1) to ED(n) arranged in the same column can include the column driver C-DRV and the row driver R-DRV.

The column driver C-DRV can include the first to fourth nodes N1 to N4 and include the driving transistor DRT, the first light-emitting control transistor EMT1, and the second light-emitting control transistor EMT2.

The first node N1 can be a node to which the voltage Vg for controlling the on-off of the driving transistor DRT is applied. The second node N2 can be a node to which the second light-emitting control transistor EMT2 and the driving transistor DRT are connected. The third node N3 can be a node to which the driving transistor DRT and the first light-emitting control transistor EMT1 are connected. The fourth node N4 can be a node to which the first light-emitting control transistor EMT1 and the n light-emitting elements ED(1) to ED(n) are electrically connected and a node to which the column line CL is electrically connected. Here, the source electrode or drain electrode of the first light-emitting control transistor EMT1 and the first electrodes Ecl(1) to Ecl(n) of the n light-emitting elements ED(1) to ED(n) can be connected in common to the column line CL.

The driving transistor DRT can serve to supply a driving current for allowing the n light-emitting elements ED1 to ED(n) to emit light, can be connected between the second node N2 and the third node N3, and can control the connection between the second node N2 and the third node N3 according to the voltage of the first node N1.

The gate electrode of the driving transistor DRT can be electrically connected to the first node N1, and the gate voltage Vg can be applied. The drain electrode or source electrode of the driving transistor DRT can be electrically connected to the second node N2. The source electrode or drain electrode of the driving transistor DRT can be electrically connected to the third node N3.

The first light-emitting control transistor EMT1 and the second light-emitting control transistor EMT2 can serve control whether to connect a path along which the driving current flows and control whether to allow the light-emitting element ED to emit light.

The first light-emitting control transistor EMT1 can be connected between the third node N3 and the fourth node N4 and can control the connection between the third node N3 and the fourth node N4 according to the first light-emitting control signal EM1. The first light-emitting control signal EM1 can be applied to a gate electrode of the first light-emitting control transistor EMT1. The drain electrode or source electrode of the first light-emitting control transistor EMT1 can be electrically connected to the third node N3. The source electrode or drain electrode of the first light-emitting control transistor EMT1 can be electrically connected to the fourth node N4.

The first light-emitting control signal EM1 can be a pulse width modulation (PWM) signal that varies every predefined time (e.g., each frame or each sub-frame included in one frame), but the aspects and implementations of the present disclosure are not limited thereto. The first light-emitting control signal EM1 can be generated by the driver DRV or supplied to the driver DRV from a driving-related circuit, such as a timing controller.

The second light-emitting control transistor EMT2 can be connected between the high-potential voltage node NVDD and the second node N2 and can control the connection between the high-potential voltage node NVDD and the second node N2 according to the second light-emitting control signal EM2. The second light-emitting control signal EM2 can be applied to a gate electrode of the first light-emitting control transistor EMT2. The drain electrode or source electrode of the second light-emitting control transistor EMT2 can be electrically connected to the high-potential voltage node NVDD. The source electrode or drain electrode of the second light-emitting control transistor EMT2 can be electrically connected to the second node N2.

Here, the first light-emitting control signal EM1 can be the same as the second light-emitting control signal EM2, and the third light-emitting control signal EM3 can differ from the first and second light-emitting control signals EM1 and EM2.

During the driving of micro LEDs, when driving orders of odd/right columns are the same, horizontal flicker can be recognized due to the time-division driving characteristics, and thus the odd/right columns are driven differently. In this way, during the differential driving of the odd/right columns, gate voltages of driving transistors in the odd/right columns can fluctuate differently due to parasitic capacitance, thereby causing a vertical line based on a driving driver.

In this way, to improve the vertical line based on a driving driver, which is caused by an internal circuit structure (capacitance, etc.) between the differentially driven micro LED driving drivers, the vertical line is caused by mainly the gate voltage fluctuated by coupling between the gate voltage of the driving transistor and the voltage of the reset node, and by reducing the change amount of the voltage of the reset node (the anode) to reduce the coupling, it is possible to improve the vertical line.

To improve the vertical line based on a driving driver, which is caused by the internal circuit structure (capacitance, etc.) between the driving drivers during the differential driving of the micro LEDs, by delaying the third light-emitting control signal EM3 by Δt compared to the first light-emitting control signal EM1 without the first light-emitting control signal EM1 being the same as the third light-emitting control signal EM3, increasing the voltage of the reset node to a predetermined voltage, and then emitting light in order to avoid a section in which a voltage fluctuates due to the coupling between a gate terminal of the driving transistor and the reset node terminal, which is the main cause of the vertical line, it is possible to exclude the coupling effect between the driving circuits, thereby solving the recognized vertical line problem.

The column driver DRV can further include a first transistor T1 that is controlled to be turned on/off according to a first scan signal SC1 to control connection between the first node N1 and the initialization voltage node NINT. Here, the initialization voltage VINT can be applied to the initialization voltage node NINT.

The column driver DRV can further include a second transistor T2 that is controlled to be turned on/off according to a second scan signal SC2 to control connection between the second node N2 and the initialization voltage node NREF. Here, the reference voltage VREF can be applied to the reference voltage node NREF.

The column driver DRV can further include a third transistor T3 that is controlled to be turned on/off according to a third scan signal SC3 to control connection between the third node N3 and the pre-charge voltage node NPRC. Here, the pre-charge voltage VPRC can be applied to the pre-charge voltage node NPRC.

The column driver DRV can further include a fourth transistor T4 that is controlled to be turned on and off according to a fourth scan signal SC4 and controls the connection between the fourth node N4 and the reset voltage node NRST. Here, the reset voltage VRST can be applied to the reset voltage node NRST.

The column driver DRV can further include a fifth transistor T5 that is controlled to be turned on and off according to a fifth scan signal SC5 and controls the connection between the first node N1 and the third node N3. When the fifth transistor T5 is turned on, the first node N1 and the third node N3 can be electrically connected so that the driving transistor DRT can be diode-connected. Here, for example, the fifth scan signal SC5 can be different from or the same as the second scan signal SC2.

The row driver R-DRV can be configured to drive the n row lines RL(1) to RL(n) respectively connected to the second electrodes Erl(1) to Erl(n) of the n light-emitting elements ED(1) to ED(n) arranged in the same column.

The row driver R-DRV can include n display-on transistors TR_ON(1) to TR_ON(n) that electrically connect the n row lines RL(1) to RL(n) to the first low-potential voltage node NVSS1, respectively. The first low-potential voltage VSS1 can be applied to the first low-potential voltage node NVSS1. The n display-on transistors TR_ON(1) to TR_ON(n) can be turned on and off by n display-on control signals CS1(1) to CS1(*n*).

A turn-on timing of each of the n display-on transistors TR_ON(1) to TR_ON(n) can be different. Accordingly, the display-on driving can be performed sequentially on the n row lines RL(1) to RL(n).

The row driver R-DRV can include n display-off transistors TR_OFF(1) to TR_OFF(n) that electrically connect the n row lines RL(1) to RL(n) to the second low-potential voltage node NVSS2 to which the second low-potential voltage VSS2 is applied. The second low-potential voltage VSS2 can be higher than the first low-potential voltage VSS1. The n display-off transistors TR_OFF(1) to TR_OFF(n) can be controlled to be turned on and off by n display-off control signals CS2(1) to CS2(*n*).

A turn-on timing of each of the n display-off transistors TR_OFF(1) to TR_OFF(n) can be different. Accordingly, the display-off driving can be performed on the n display-off transistors TR_OFF(1) to TR_OFF(n) at different timings.

For example, one of the n display-on transistors TR_ON (1) to TR_ON(n) and one of the n display-off transistors TR_OFF(1) to TR_OFF(n) can be connected to each of the n row lines RL(1) to RL(n).

Only one of the display-on transistor and the display-off transistor connected to each of the n row lines RL(1) to RL(n) can be selectively turned on.

For example, when the display-on driving is performed on the first row line RL(1) among the n row lines RL(1) to RL(n), among the first display-on transistor TR_ON(1) and the first display-off transistor TR_OFF(1) that are connected to the first row line RL(1), the first display-on transistor TR_ON(1) can be turned on, and the first display-off transistor TR_OFF(1) can be turned off. At this time, when the display-on driving is performed on the second to $n^{th}$ row lines RL(2) to RL(n), among the display-on transistor and the display-off transistor that are connected to each of the second to $n^{th}$ row lines (RL(2) to RL(n)), the display-on transistor can be turned off, and the display-off transistor can be turned on. Accordingly, among the n row lines RL(1) to RL(n), the first low-potential voltage VSS1, which is a low-potential voltage for display-on driving, can be applied to only the first row line RL(1), and the second low-potential voltage VSS2, which is a low-potential voltage for display-off driving, can be applied to the remaining second to $n^{th}$ row lines RL(2) to RL(n).

Figure 9B:
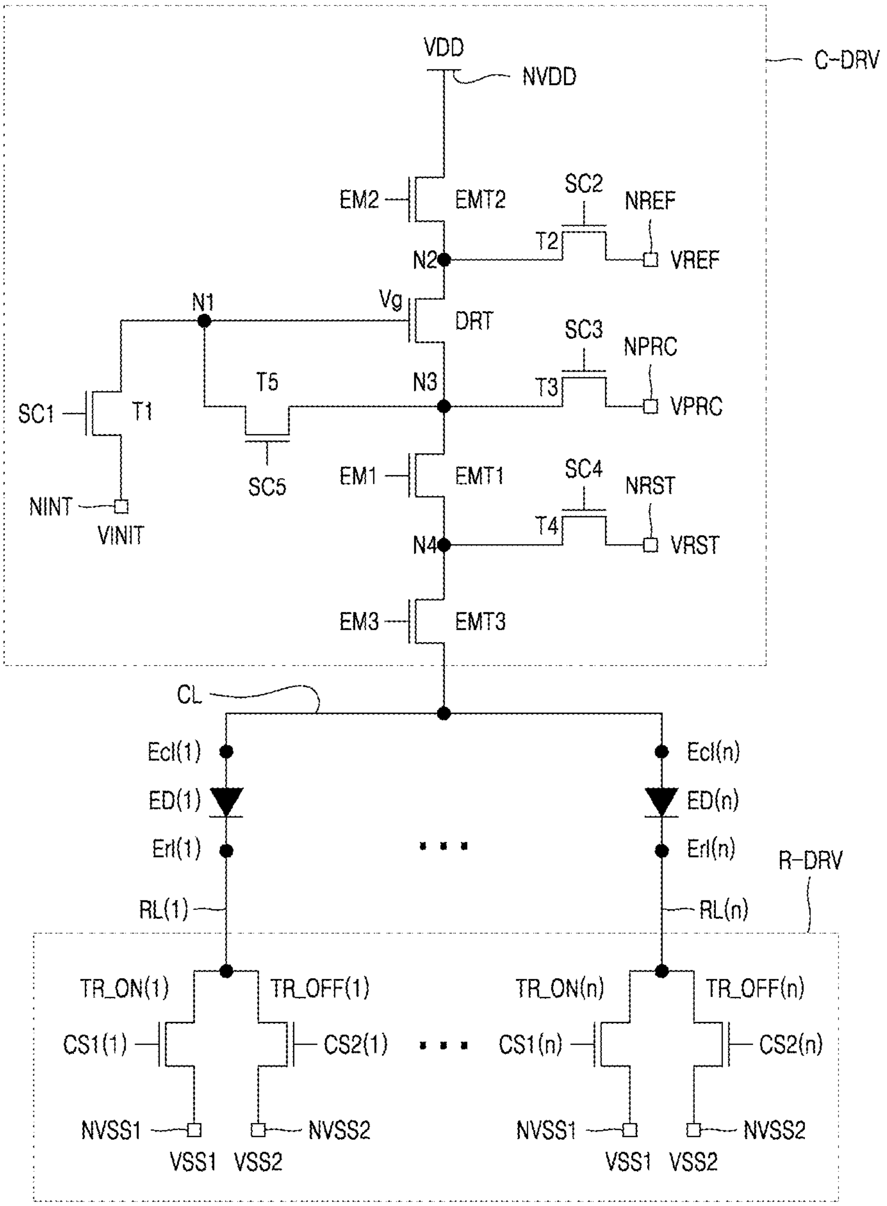
FIG. 9B illustrates a circuit for driving n light-emitting elements connected to one column line included in a first sub-driving area of a display panel according to still another implementation of the present disclosure.

FIG. 9B illustrates still another circuit for driving the n light-emitting elements ED(1) to ED(n) connected to one column line CL included in the first sub-driving area SDA1 of the display panel 110 according to another implementation of the present disclosure. Particularly, FIG. 9B is a circuit having the same structure as the circuit of FIG. 9A except that a third light-emitting control transistor is added.

Referring to FIG. 9B, a third light-emitting control transistor EMT3 can be connected between the fourth node and the column line CL and can apply a driving signal to the column line CL according to the third light-emitting control signal EM3 that is delayed by Δt compared to the first light-emitting control signal EM1.

In this way, by delaying the third light-emitting control signal EM3 by Δt compared to the first light-emitting control signal EM1, increasing the voltage of the reset node to a predetermined voltage, and then emitting light in order to avoid a section in which a voltage fluctuates due to the coupling between the gate terminal of the driving transistor and the reset node terminal, which is the main cause of the vertical line, it is possible to exclude the coupling effect between the driving circuits, thereby solving the recognized vertical line problem.

Figure 10:
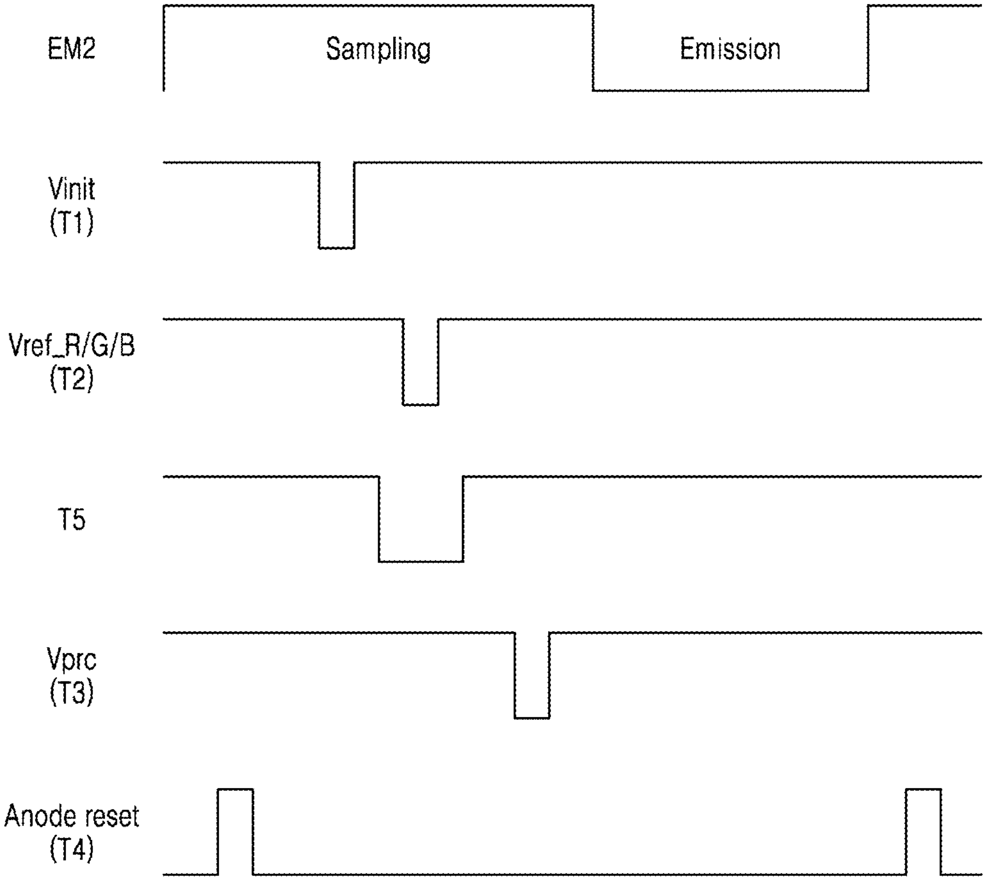
FIG. 10 illustrates a driving timing diagram for driving the circuits of FIGS. 9A and 9B.

FIG. 10 illustrates a driving timing diagram for driving the circuits of FIGS. 9A and 9B. Referring to FIGS. 9A, 9B, and 10, a driving timing of the sub-pixel SP is as follows.

During the initialization period, the first transistor T1 among the first to fifth transistors T1 to T5 is turned on, and the initialization voltage VINT can be applied to the first node N1. The driving transistor DRT can be turned on by the initialization voltage VINT applied to the first node N1.

Thereafter, during a reference voltage driving period, the second transistor T2 can be turned on, and the reference voltage VREF can be applied to the second node N2. At this time, the fifth transistor T5 can also be turned on.

Thereafter, during the pre-charge period, the third transistor T3 can be turned on, and the pre-charge voltage VPRC can be applied to the third node N3.

Thereafter, during a light-emitting driving period, one of the n light-emitting elements ED(1) to ED(n) can emit light During the light-emitting driving period, among the n row lines RL(1) to RL(n), the light-emitting elements in a light-emitting state can be in a state in which the first low-potential voltage VSS1, which is a low-potential voltage for display-on driving, has been applied, and the light-emitting elements in a non-light-emitting state can be in a state in which the second low-potential voltage VSS2, which is a low-potential voltage for display-off driving, has been applied.

To this end, among the n row lines RL(1) to RL(n), the row line on which the display-on driving is performed can receive the first low-potential voltage VSS1, and the remaining row lines on which the display-off driving is performed can receive the second low-potential voltage VSS2.

Accordingly, among the display-on transistor and the display-off transistor that are connected to the row line on which the display-on driving is performed, the display-on transistor can be turned on, and the display-off transistor can be turned off.

Among the display-on transistor and the display-off transistor that are connected to the row line on which the display-off driving is performed, the display-on transistor can be turned off, and the display-off transistor can be turned on.

Thereafter, during the reset period, the fourth transistor T4 can be turned on so that the reset voltage VRST can be applied to the fourth node N4. Accordingly, the column line CL can be reset to the reset voltage VRST. In addition, all of the first electrodes Ecl(1) to Ecl(n) of the n light-emitting elements ED(1) to ED(n) connected to the column line CL can be reset to the reset voltage VRST.

The first to fourth scan signals SC1 to SC4 and the first to third light-emitting control signals EM1, EM2, and EM3 can be generated by the corresponding driver DRV or supplied from a driving-related circuit, such as a timing controller, to the corresponding driver DRV.

During the driving of micro LEDs, when driving orders of odd/right columns are the same, horizontal flicker can be recognized due to the time-division driving characteristics, and thus the odd/right columns are driven differently. In this way, during the differential driving of the odd/right columns, gate voltages of driving transistors in the odd/right columns can fluctuate differently due to parasitic capacitance, thereby causing a vertical line based on a driving driver.

In this way, to improve the vertical line based on a driving driver, which is caused by an internal circuit structure (capacitance, etc.) between the differentially driven micro LED driving drivers, the vertical line is caused by mainly the gate voltage fluctuated by coupling between the gate voltage of the driving transistor and the voltage of the reset node, and by reducing the change amount of the voltage of the reset node (the anode) to reduce the coupling, it is possible to improve the vertical line.

Figure 11:
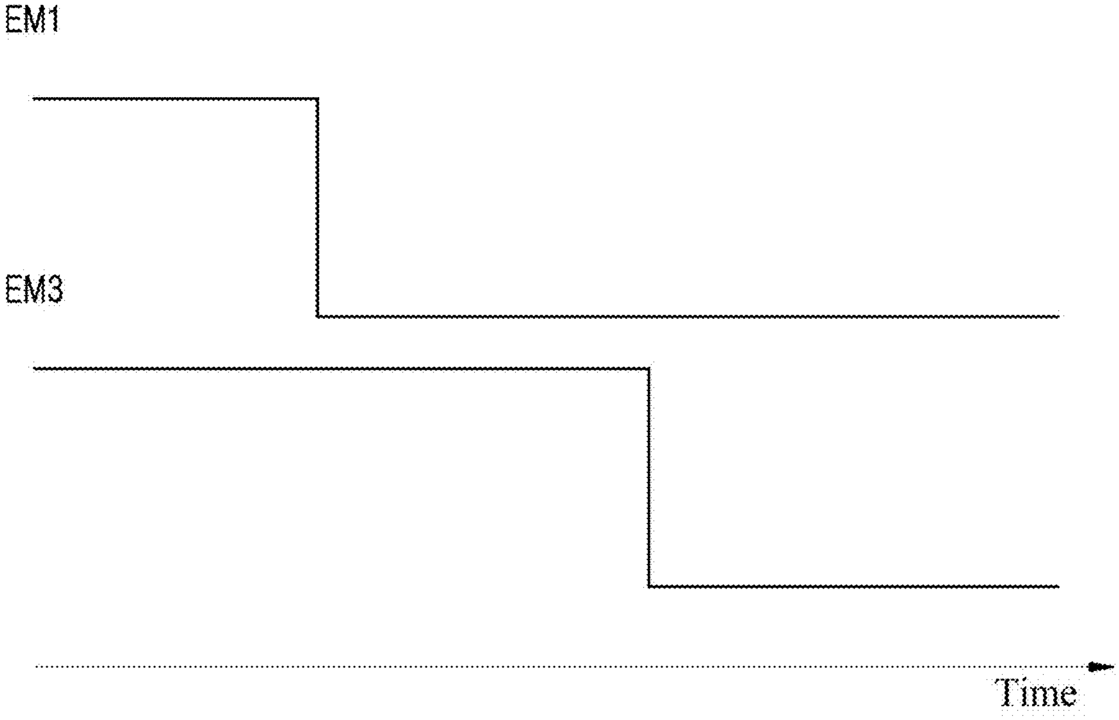
FIG. 11 illustrates first and second light-emitting control signals applied to the circuit of FIG. 9B.
Figure 12:
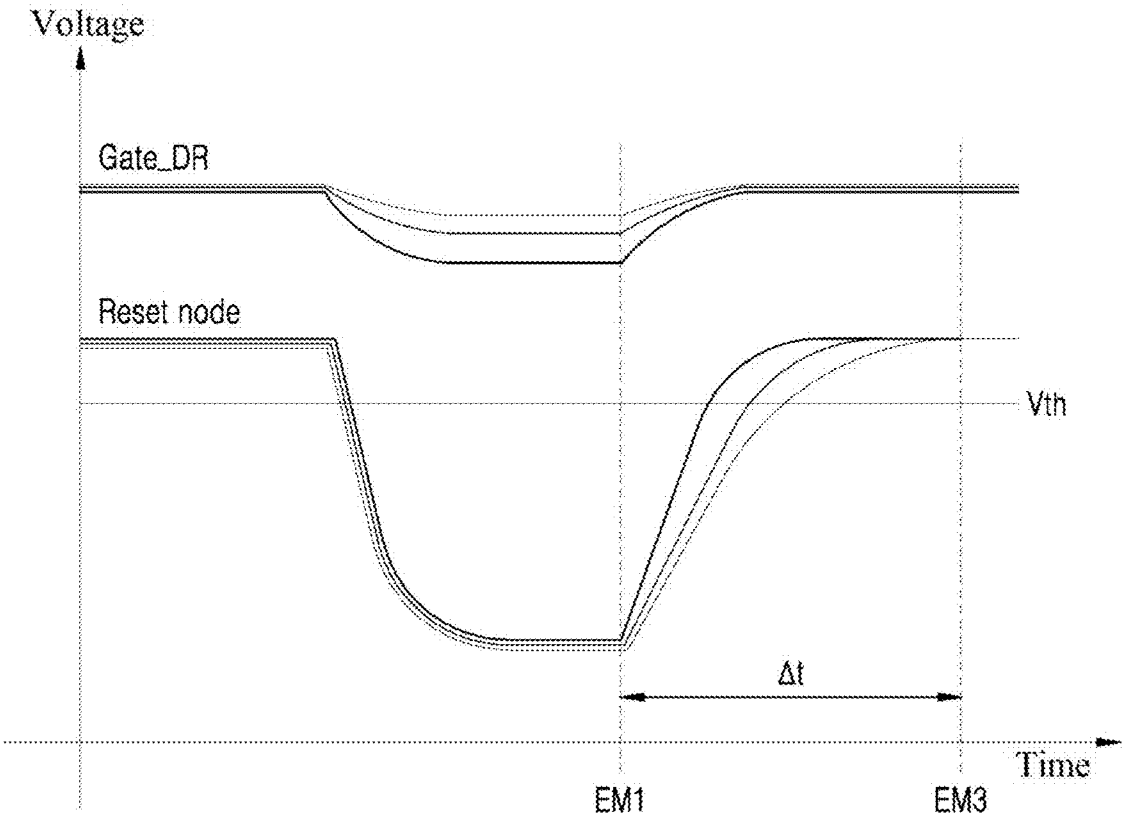
FIG. 12 illustrates a voltage of a reset node according to the first and second light-emitting control signals applied to the circuit of FIG. 9B.

FIGS. 11 and 12 are views illustrating that, to improve the vertical line based on a driving driver, which is caused by the internal circuit structure (capacitance, etc.) between the driving drivers during the differential driving of the micro LEDs, since the first light-emitting control signal and the third light-emitting control signal are not the same and have a delay difference of Δt, light is emitted after the voltage of the reset node is increased to a predetermined voltage, and by delaying the third light-emitting control signal EM3 by Δt compared to the first light-emitting control signal EM1, increasing the voltage of the reset node to the predetermined voltage, and then emitting light in order to avoid a section in which a voltage fluctuates due to the coupling between the gate terminal of the driving transistor and the reset node terminal, which is the main cause of the vertical line, it is possible to exclude the coupling effect between the driving circuits, thereby solving the recognized vertical line problem.

Referring to FIGS. 9A and 9B, each of all of the transistors DRT (T1 to T5) included in the column driver C-DRV can be an n-type transistor or a p-type transistor. Each of all of the transistors TR_ON(1) to TR_ON(n) and TR_OFF(1) to TR_OFF(n) included in the row driver R-DRV can be an n-type transistor or a p-type transistor. The column driver C-DRV can further include at least one capacitor.

As described above, the column driver C-DRV and the row driver R-DRV can be included in the driver DRV. The driver DRV according to the implementation of the present disclosure can control the light-emitting driving of the plurality of light-emitting elements according to a PWM method.

Figure 13:
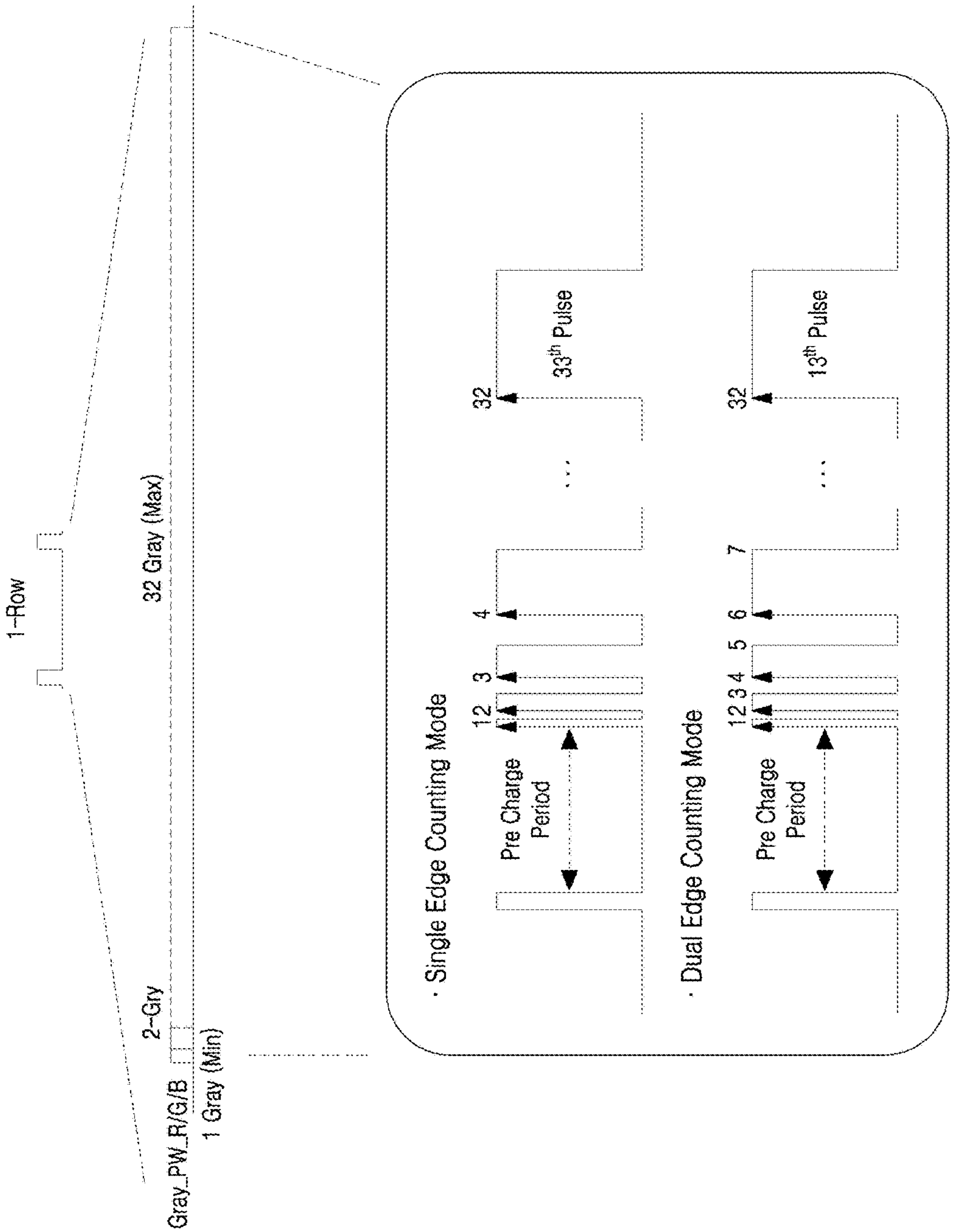
FIGS. 13 and 14 illustrate an example in which a driving driver according to the aspects and implementations of the present disclosure controls a light-emitting operation of a light-emitting element in a pulse width modulation (PWM) manner.
Figure 14:
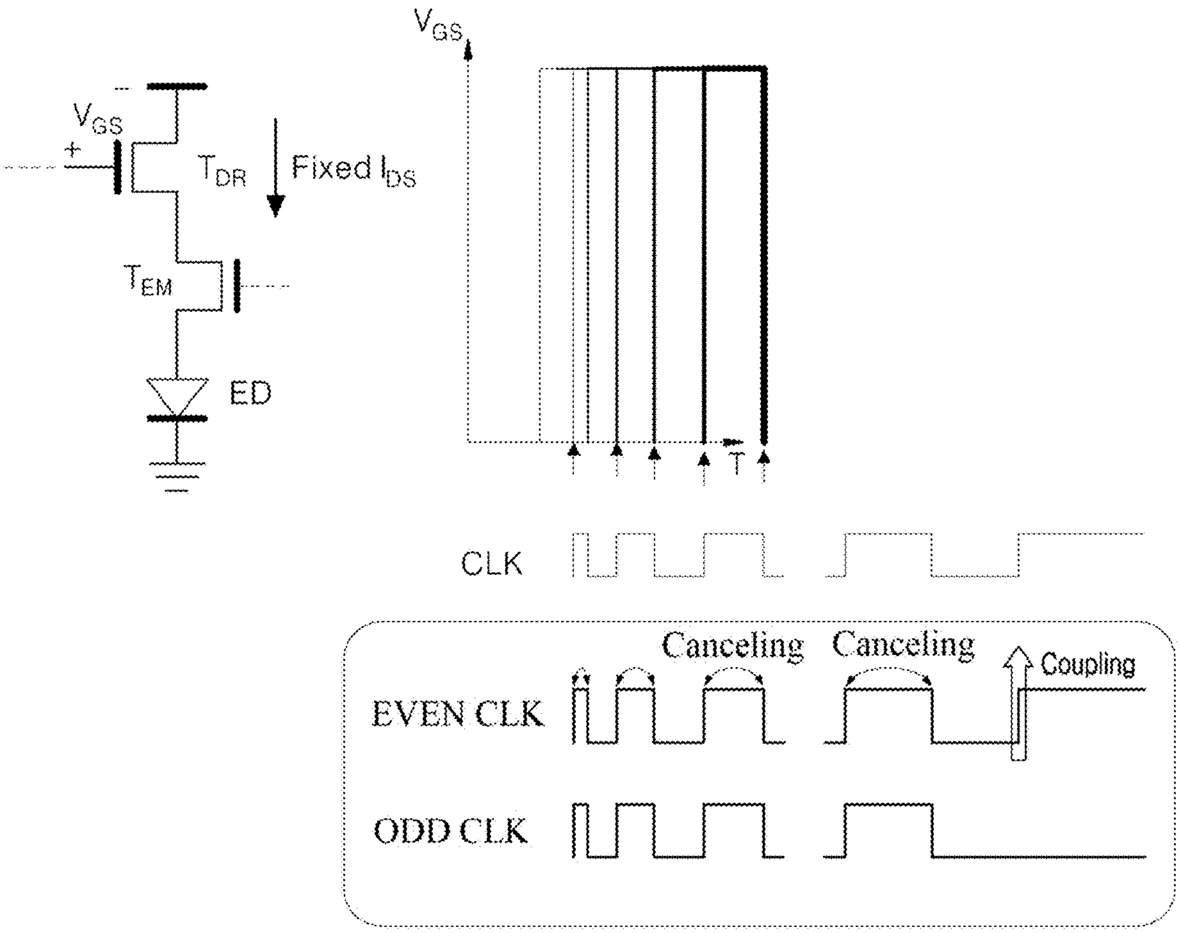

As illustrated in FIGS. 13 and 14, the driver DRV can control an application time of a light-emitting signal to one light-emitting element with a pulse width W.

FIGS. 13 and 14 are views illustrating an example in which the driver according to the implementation of the present disclosure controls the light-emitting operation of the light-emitting element using a PWM method.

Referring to FIG. 13, the driver DRV can adjust the pulse width PW, for example, from a minimum of 1 Gray to a maximum of 32 Gray with respect to one pulse signal.

Referring to FIG. 14, the driver DRV can apply a PWM signal adjusted in this way to a gate electrode of a light-emitting transistor TEM.

Accordingly, a fixed light-emitting current Fixed $I_{DS}$ is applied to the light-emitting element ED via the light-emitting transistor TEM so that the light-emitting element ED can emit light.

For example, when eight light-emitting elements are connected to one anode line, all eight light-emitting elements emit light with the constant current Fixed $I_{DS}$ having the same current value. In an OLED display device, since a voltage applied to a gate electrode of a light-emitting transistor is different for each light-emitting element, the amount of a current is different, and the time for the current to flow to each light-emitting element is the same. However, in the display device according to the implementation of the present disclosure, since the voltage applied to the gate electrode of the light-emitting transistor is the same for each light-emitting element, the amount of a current flowing to each light-emitting element is the same, and the time for the current to flow to each light-emitting element is different. For example, the time for the current to flow to each light-emitting element is controlled by a pulse width of the PWM signal.

Referring to FIG. 13, the PWM signal can be provided in each of a single edge counting mode Single Edge Counting Mode and a dual edge counting mode Dual Edge Counting Mode.

In each operation mode, a PWM signal with an adjusted pulse width can be applied to the gate electrode of the light-emitting transistor TEM after the pre-charge period.

When one light-emitting element is driven, for example, 33 pulse signals can be applied in the single edge counting mode, and 13 pulse signals can be applied in the dual edge counting mode.

A plurality of light-emitting elements are connected to anode lines of an upper side of the driver DRV and anode lines of a lower side of the driver DRV and emit light according to the PWM signal applied under the control of the driver DRV.

Referring to FIG. 14, the driver DRV can apply an even clock signal CLK according to the PWM method to the anode lines of the lower side and apply an odd clock signal CLK to the anode lines of the upper side.

FIG. 14 is a view illustrating an example in which the driving driver according to the implementation of the present disclosure supplies a clock signal according to the PWM method. Accordingly, the plurality of light-emitting elements connected to the anode lines of the lower side of the driver DRV can be operated by the even clock signal CLK, and the plurality of light-emitting elements connected to the anode lines of the upper side of the driver DRV can be operated by the odd clock signal.

In this case, since the anode lines of the lower side of the driver DRV overlap metal lines of neighboring curved layers, a first capacitor C1 can be formed in each of the overlapping portions.

The anode lines of the lower side of the driver DRV can receive the even clock signal CLK from the driver DRV, but an anode voltage can rise due to coupling at a rising edge of the clock signal, thereby preventing a difference in luminance of the light-emitting elements connected to the anode lines of the lower side. Accordingly, it is possible to compensate for a coupling difference between the anode lines, thereby preventing spots from being recognized.

Figure 15:
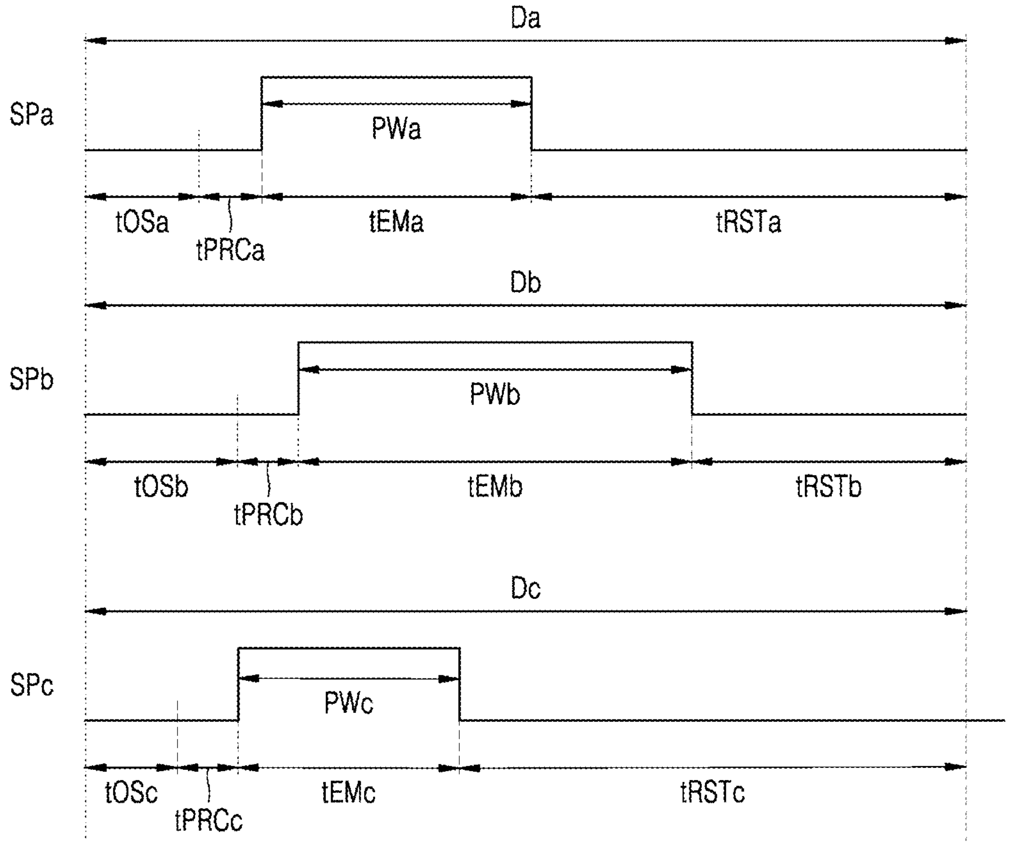
FIG. 15 is a display driving timing diagram for three sub-pixels of the display device according to the aspects and implementations of the present disclosure.

FIG. 15 is a timing diagram of display driving of three sub-pixels SPa, SPb, and SPc of the display device 100 according to the aspects and implementations of the present disclosure.

Referring to FIG. 15, the plurality of pixels P disposed in the display device 100 according to the aspects and implementations of the present disclosure can be divided into k sub-pixels. k can be a natural number greater than or equal to 2. For example, k can be 3. In this case, the k sub-pixels can be three sub-pixels SPa, SPb, and SPc.

Referring to FIG. 15, when k is 3, each of the plurality of pixels P disposed in the display device 100 according to the aspects and implementations of the present disclosure can include the three sub-pixels SPa, SPb, and SPc. For example, the three sub-pixels SPa, SPb, and SPc can include the first sub-pixel SPa including the first light-emitting element EDa that emits the light of the first color, the second sub-pixel SPb including the second light-emitting element EDb that emits the light of the second color, and the third sub-pixel SPc including the third light-emitting element EDc that emits the light of the third color.

The display driving period D can include a first display driving period Da, a second display driving period Db, and a third display driving period Dc. The first display driving period Da can include a first pre-charge period tPRCa, a first light-emitting period tEMa, and a first reset period tRSTa for the first sub-pixel SPa. The second display driving period Db can include a second pre-charge period tPRCb, a second light-emitting period tEMb, and a second reset period tRSTb for the second sub-pixel SPb. The third display driving period Dc can include a third pre-charge period tPRCc, a third light-emitting period tEMc, and a third reset period tRSTc for the third sub-pixel SPc.

According to the display device 100 according to the aspects and implementations of the present disclosure, a timing of the first light-emitting period tEMa, a timing of the second light-emitting period tEMb, and the timing of the third light-emitting period tEMc can be different.

According to the display device 100 according to the aspects and implementations of the present disclosure, a first length PWa of the first light light-emitting period tEMa, a second length PWb of the second light light-emitting period tEMb, and a third length PWc of the third light light-emitting period tEMc can be different.

For example, according to the display device 100 according to the aspects and implementations of the present disclosure, each of the first length PWa of the first light light-emitting period tEMa, the second length PWb of the second light light-emitting period tEMb, and the third length PWc of the third light light-emitting period tEMc can correspond to brightness to be exhibited in the corresponding sub-pixel, correspond to an image signal (image data) corresponding to the corresponding sub-pixel, or correspond to a length of a turn-on level voltage section of the light-emitting control signal in the column driver C-DRV. For example, the light light-emitting control signal in the column driver C-DRV is a display driving control signal supplied from a controller (e.g., a timing controller) to the column driver C-DRV, can include the first light-emitting control signal EM1 of FIGS. 5, 8, and 9A, and further include the second light-emitting control signal EM2 of FIG. 9A. For example, the turn-on level voltage section of the light-emitting control signal can be a high-level voltage section or a low-level voltage section.

Referring to FIG. 15, according to the display device 100 according to the aspects and implementations of the present disclosure, the first display driving period Da can further include a first offset period tOSa before the first pre-charge period tPRCa, the second display driving period Db can further include a second offset period tOSb before the second pre-charge period tPRCb, and the third display driving period Dc can further include a third offset period tOSc before the third pre-charge period tPRCc.

According to the display device 100 according to the aspects and implementations of the present disclosure, a length of the first offset period tOSa, a length of the second offset period tOSb, and a length of the third offset period tOSc can be different.

Hereinafter, driving for the row line RL and the column line CL during the display driving period D will be described in more detail with reference to FIG. 16.

Figure 16:
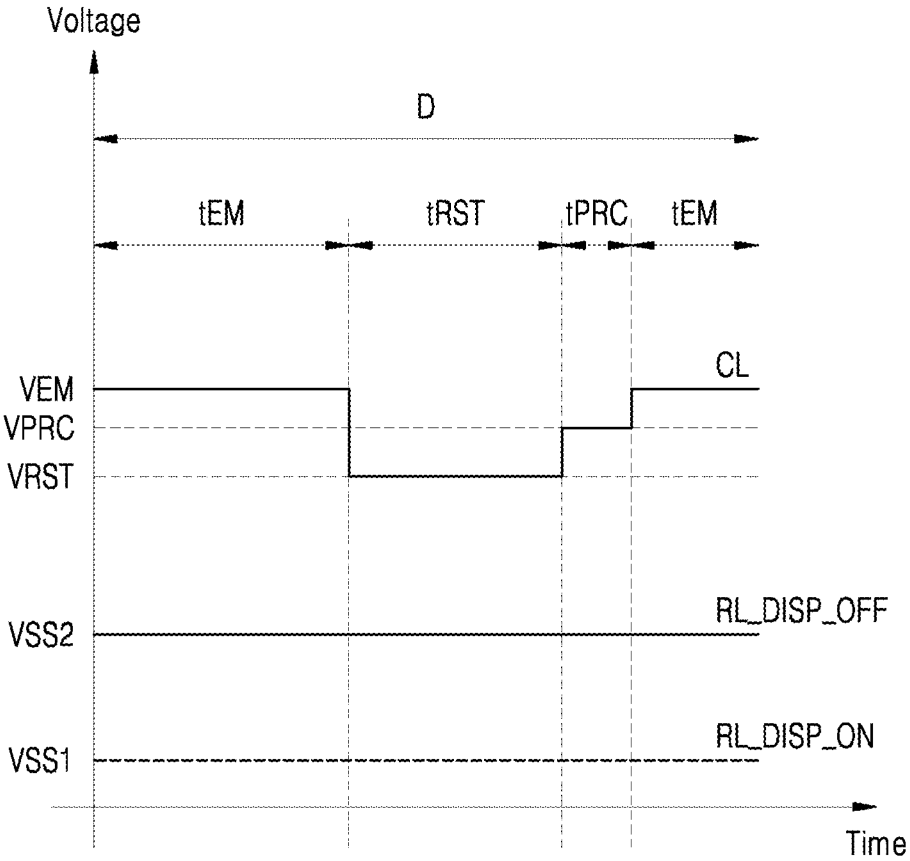
FIG. 16 is a driving timing diagram for a row line and a column line during a display driving period of the display device according to the aspects and implementations of the present disclosure.

FIG. 16 is a driving timing diagram for the row line RL and the column line CL during the display driving period D of the display device 100 according to the aspects and implementations of the present disclosure.

Referring to FIG. 16, according to the display device 100 according to the aspects and implementations of the present disclosure, during the display driving period D, the first low-potential voltage VSS1 can be applied to at least one first row line RL_DISP_ON among the plurality of row lines RL, and the second low-potential voltage VSS2 higher than the first low-potential voltage VSS1 can be applied to at least one second row line RL_DISP_OFF that differs from the at least one first row line RL_DISP_ON among the plurality of row lines RL.

For example, the at least one first row line RL_DISP_ON and the at least one second row line RL_DISP_OFF can be disposed in one unit driving area UDA. In this case, the at least one first row line RL_DISP_ON and the at least one second row line RL_DISP_OFF can be electrically connected to the same driver DRV. The at least one first row line RL_DISP_ON and the at least one second row line RL_DISP_OFF can be driven by the same driver DRV.

As another example, the at least one first row line RL_DISP_ON and the at least one second row line RL_DISP_OFF can be disposed in different unit driving areas UDA. In this case, the at least one first row line RL_DISP_ON and the at least one second row line RL_DISP_OFF can be electrically connected to different drivers DRV. The at least one first row line RL_DISP_ON and the at least one second row line RL_DISP_OFF can be driven by different drivers DRV.

During the display driving period D, the light-emitting elements ED overlapping at least a part of the at least one first row line RL_DISP_ON can emit light, and the light-emitting elements ED overlapping at least a part of the at least one second row line RL_DISP_OFF may not emit light.

The display driving period D can include a pre-charge period tPRC, a light-emitting period tEM, and a reset period tRST.

During the pre-charge period tPRC, the light-emitting period tEM, and the reset period tRST, the first low-potential voltage VSS1 can be applied to the at least one first row line RL_DISP_ON, and the second low-potential voltage VSS2 can be applied to the at least one second row line RL_DISP_OFF.

During the pre-charge period tPRC, the display driving pre-charge voltage VPRC can be applied to the at least one of the plurality of column lines CL as a column line voltage. Here, the pre-charge voltage VPRC for display driving can be a constant voltage or a variable voltage.

During the light-emitting period tEM, the light-emitting driving voltage VEM can be applied to at least one column line CL. Here, the light-emitting driving voltage VEM can be a display voltage for displaying an image.

During the reset period tRST, the reset voltage VRST for display driving can be applied to the at least one column line CL. Here, the reset voltage VRST for display driving can be a constant voltage or a variable voltage.

The voltage applied to the column line CL is referred to as a column line voltage and can also be referred to as an anode voltage or a cathode voltage. The pre-charge voltage VPRC for display driving, the light-emitting driving voltage VEM, and the reset voltage VRST for display driving can be column line voltages having different purposes according to a driving timing.

For example, among the pre-charge voltage VPRC for display driving, the light-emitting driving voltage VEM, and the reset voltage VRST for display driving, the reset voltage VRST for display driving can be the lowest voltage, and the light-emitting driving voltage VEM can be the highest voltage value.

For example, the above at least one column line CL can intersect the at least one first row line RL_DISP_ON and the at least one second row line RL_DISP_OFF. In this case, the at least one column line CL, the at least one first row line RL_DISP_ON, and the at least one second row line RL_DISP_OFF can be disposed in the same unit driving area UDA. The at least one column line CL, the at least one first row line RL_DISP_ON, and the at least one second row line RL_DISP_OFF can be electrically connected to the same driver DRV. The at least one column line CL, the at least one first row line RL_DISP_ON, and the at least one second row line RL_DISP_OFF can be driven by the same driver DRV.

As another example, the above at least one column line CL may not intersect the at least one first row line RL_DISP_ON and the at least one second row line RL_DISP_OFF. In this case, the at least one column line CL can be disposed in a different unit driving area UDA from the at least one first row line RL_DISP_ON and the at least one second row line RL_DISP_OFF. The at least one column line CL can be electrically connected to a different driver DRV from the at least one driver DRV electrically connected to the at least one first row line RL_DISP_ON and the at least one second row line RL_DISP_OFF. The at least one column line CL can be driven by a different driver DRV from the driver DRV for driving the at least one first row line RL_DISP_ON and the at least one second row line RL_DISP_OFF.

As another example, the above at least one column line CL can intersect one of the at least one first row line RL_DISP_ON and the at least one second row line RL_DISP_OFF. In this case, the at least one column line CL can be disposed in the same unit drive area UDA as one of the at least one first row line RL_DISP_ON and the at least one second row line RL_DISP_OFF. The at least one column line CL can be electrically connected to at least one driver DRV that is electrically connected to one of the at least one first row line RL_DISP_ON and the at least one second row line RL_DISP_OFF. The at least one column line CL can be driven by a driver DRV for driving one of the at least one first row line RL_DISP_ON and the at least one second row line RL_DISP_OFF.

In order for the plurality of drivers DRV included in the display device 100 according to the aspects and implementations of the present disclosure to perform a driving operation, the plurality of drivers DRV need to receive power required for the driving operation. Hereinafter, a power supply structure for supplying the power required for the driving operation to the plurality of drivers DRV will be described with reference to FIG. 17.

Figure 17:
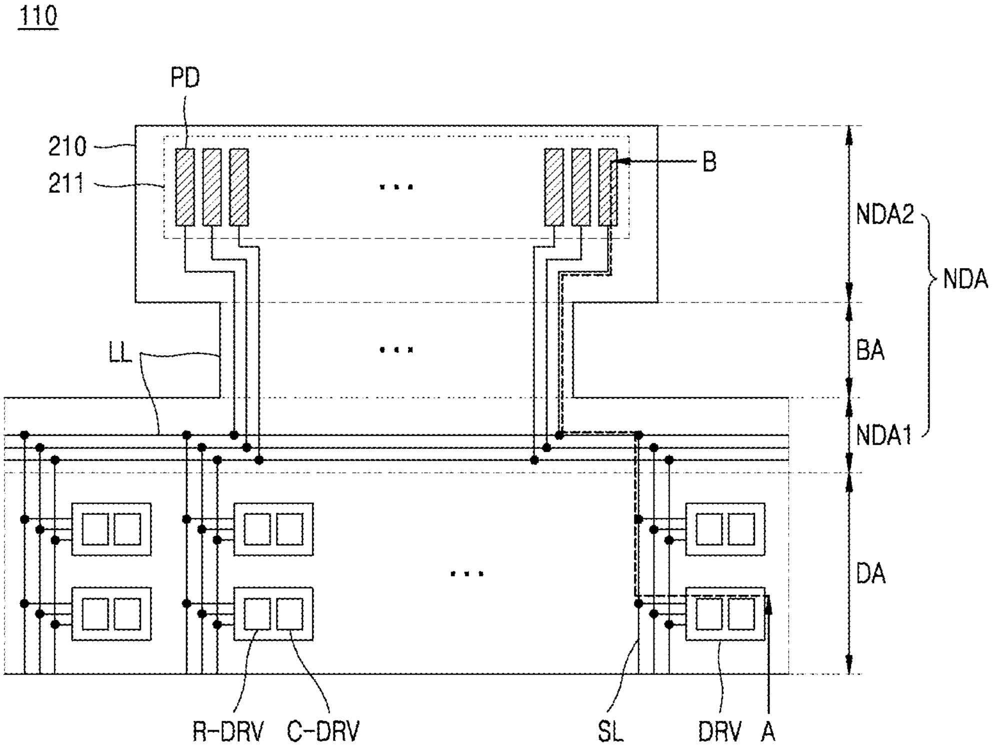
FIG. 17 is a plan view of the display panel according to the aspects and implementations of the present disclosure.

FIG. 17 is a plan view of the display panel 110 according to the aspects and implementations of the present disclosure.

Referring to FIG. 17, a substrate 210 of the display panel 110 according to the aspects and implementations of the present disclosure can include the display area DA and the non-display area NDA, and the non-display area NDA can include the first non-display area NDA1, the bending area BA, and the second non-display area NDA2.

A plurality of drivers DRV can be disposed in the display area DA. Each of the plurality of drivers DRV can be a circuit for driving light-emitting elements of a plurality of sub-pixels included in the corresponding unit driving area UDA (see FIGS. 4 and 6). Each of the plurality of drivers DRV can include the row driver R-DRV for driving a plurality of row lines and the column driver C-DRV for driving a plurality of column lines in order to drive a plurality of light-emitting elements ED included in a corresponding unit driving area UDA (see FIGS. 4 and 6).

The pad part 211 including a plurality of pads PD can be disposed in the second non-display area NDA2.

A plurality of signal lines SL and a plurality of link lines LL for signal transmission between the plurality of drivers DRV disposed in the display area DA and the pad part 211 can be disposed on the substrate 210. The plurality of signal lines SL can be electrically connected between the plurality of link lines LL and the plurality of drivers DRV. The plurality of link lines LL can electrically connect the plurality of pads PD to the plurality of signal lines SL.

The plurality of link lines LL can be disposed in the non-display area NDA, and the entirety or a part of each of the plurality of signal lines SL can be disposed in the display area DA.

Each of the plurality of drivers DRV can receive various signals to perform the driving operation through the plurality of link lines LL and the plurality of signal lines SL. Here, various signals can include various power voltages and various signals required for the driving operation of each of the plurality of drivers DRV.

As the bending area BA is bent, parts of the plurality of link lines LL can also be bent. Since stress is concentrated on a part of the bent link line LL, cracks can occur in the link line LL. Accordingly, the plurality of link lines LL can be formed of an excellent flexible conductive material to reduce cracks when the bending area BA is bent. For example, the plurality of link lines LL can be formed of an excellent flexible conductive material, such as gold (Au), silver (Ag), aluminum (Al), etc., but the aspects and implementations of the present disclosure are not limited thereto. In addition, the plurality of link lines LL can be formed of one of various conductive materials used in the display area DA. For example, the plurality of link lines LL can be formed of molybdenum (Mo), chromium (Cr), titanium (Ti), nickel (Ni), neodymium (Nd), copper (Cu), and an alloy of silver (Ag) and magnesium (Mg), or an alloy thereof, but the aspects and implementations of the present disclosure are not limited thereto. The plurality of link lines LL can be formed of a multilayered structure including various conductive materials. For example, the plurality of link lines LL can be formed of a triple layer structure of titanium (Ti)/aluminum (Al)/titanium (Ti), but the aspects and implementations of the present disclosure are not limited thereto.

The plurality of link lines LLs can be formed in various shapes to reduce stress. At least some of the plurality of link lines LL disposed on the bending area BA can extend in the same direction as an extension direction of the bending area BA or extend in a different direction from the extension direction of the bending area BA to reduce stress. For example, when the bending area BA extends in one direction from the first non-display area NDA1 to the second non-display area NDA2, at least some of the link lines LL disposed on the bending area BA can extend in a direction oblique to the one direction. For another example, the at least some of the plurality of link lines LL can be formed as patterns of various shapes. For example, the at least some of the plurality of link lines LL disposed on the bending area BA can have a shape in which a conductive pattern having at least one of a diamond shape, a rhombus shape, a trapezoidal wave shape, a triangular wave shape, a sawtooth wave shape, a sine wave shape, a circular shape, and an omega (Ω) shape is repeatedly disposed, but the aspects and implementations of the present disclosure are not limited thereto. Accordingly, to minimize the stress concentrated on the plurality of link lines LL and cracks caused by the stress, the shapes of the plurality of link lines LL can be formed in various shapes including the above shapes, but the aspects and implementations of the present disclosure are not limited thereto.

Figure 18:
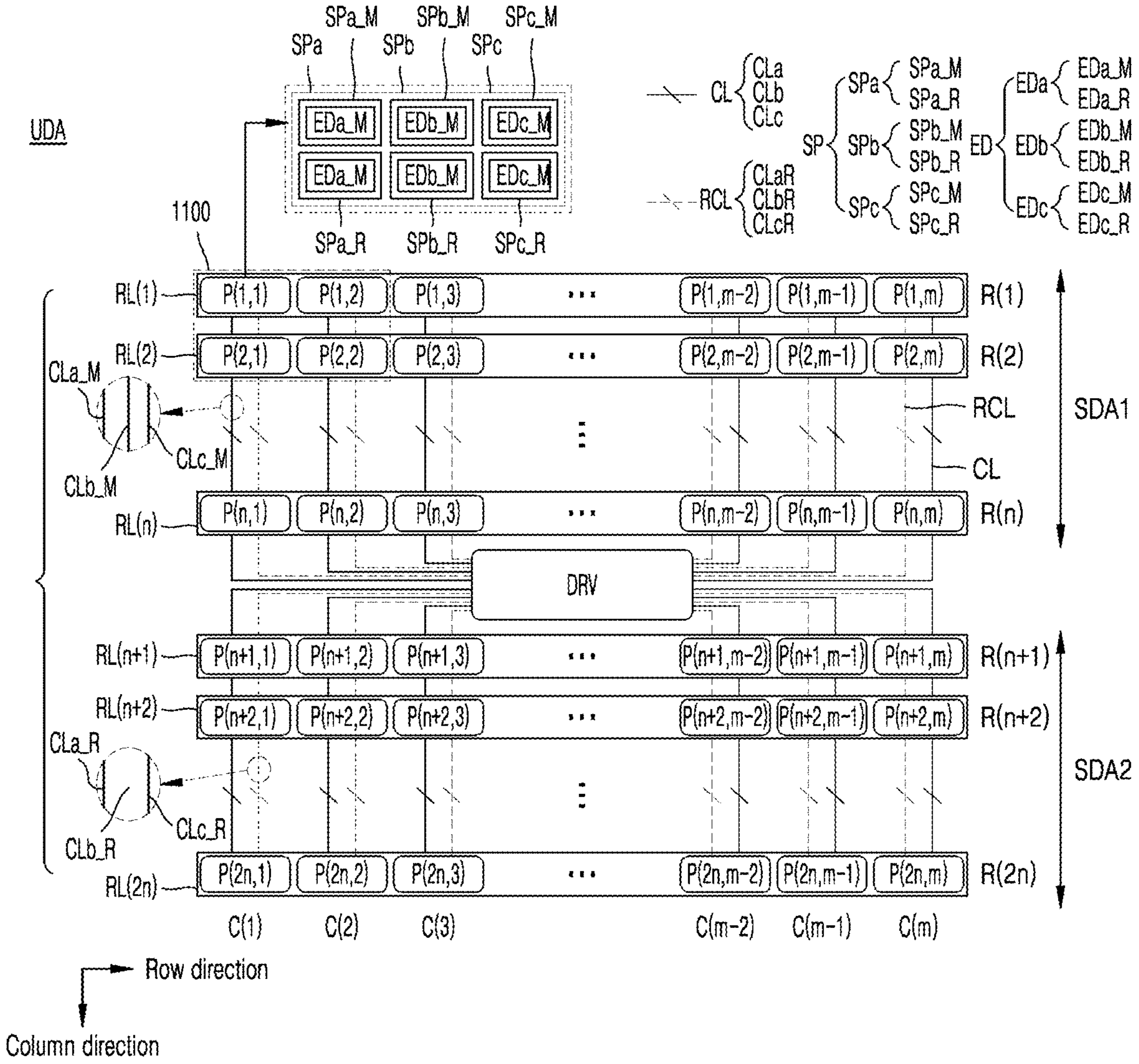
FIG. 18 illustrates the unit driving area of the display panel according to the aspects and implementations of the present disclosure.

FIG. 18 illustrates the unit driving area UDA of the display panel 110 according to the aspects and implementations of the present disclosure. The following description will be given with reference to FIGS. 3 and 4 together, and the same contents described with reference to FIG. 3 and can be omitted.

Referring to FIG. 18, the display panel 110 according to the aspects and implementations of the present disclosure can include the plurality of pixels P, the plurality of row lines RL, and the plurality of column lines CL.

According to the example of FIG. 18, the plurality of pixels P can include the (2n×m) pixels P(1, 1), . . . , P(1, m), P(2, 1), . . . , P(2, m), . . . , P(2n, 1), . . . , and P(2n, m) disposed in the unit driving area UDA. The plurality of row lines RL can include the 2n row lines RL(1) to Rl(2n) disposed in the unit driving area UDA.

The display panel 110 according to the aspects and implementations of the present disclosure can include a redundancy structure.

According to the redundancy structure, each of the plurality of pixels P can include k main sub-pixels and k redundancy sub-pixels. Each of the k main sub-pixels can include a main light-emitting element, and each of the k redundancy sub-pixels can include a redundancy light-emitting element. For example, each of the plurality of pixels P can include k main light-emitting elements EDa_M, EDb_M, and EDc_M and k redundancy light-emitting elements EDa_R, EDb_R, and EDc_R.

Each of the plurality of pixels P(1, 1), . . . , P(1, m), P(2, 1), . . . , P(2, m), . . . , P(2n, 1), . . . , and P(2n, m) can include the first sub-pixel SPa, the second sub-pixel SPb, and the third sub-pixel SPc.

The first sub-pixel SPa can include a first main sub-pixel SPa_M and a first redundancy sub-pixel SPa_R. The first main sub-pixel SPa_M can include a first main light-emitting element EDa_M, and the first redundancy sub-pixel SPa_R can include a first redundancy light-emitting element EDa_R.

The first sub-pixel SPa can include the first light-emitting element EDa that emits the light of the first color, and the first light-emitting element EDa can include the first main light-emitting element EDa_M and the first redundancy light-emitting element EDa_R.

The second sub-pixel SPb can include a second main sub-pixel SPb_M and a second redundancy sub-pixel SPb_R. The second main sub-pixel SPb_M can include a second main light-emitting element EDb_M, and the second redundancy sub-pixel SPb_R can include a second redundancy light emitting element EDb_R.

The second sub-pixel SPb can include the second light-emitting element EDb that emits the light of the second color, and the second light-emitting element EDb can include the second main light-emitting element EDb_M and the second redundancy light-emitting element EDb_R.

The third sub-pixel SPc can include a third main sub-pixel SPc_M and a third redundancy sub-pixel SPc_R. The third main sub-pixel SPc_M can include a third main light-emitting element EDc_M, and the third redundancy sub-pixel SPc_R can include a third redundancy light-emitting element EDc_R.

The third sub-pixel SPc can include the third light-emitting element EDc that emits the light of the third color, and the third light-emitting element EDc can include the third main light-emitting element EDc_M and the third redundancy light-emitting element EDc_R.

The plurality of column lines CL can include a plurality of main column lines CLa_M, CLb_M, and CLc_M and a plurality of redundancy column lines CLa_R, CLb_R, and CLc_R.

In each of the plurality of columns (the plurality of pixel columns) included in each of the first sub-driving area SDA1 and the second sub-driving area SDA2, the k main column lines CLa_M, CLb_M, and CLc_M and the k redundancy column lines CLa_R, CLb_R, and CLc_R can be disposed.

In each column (each pixel column), the k main column lines CLa_M, CLb_M, and CLc_M can be connected to the first electrodes Ecl of the k main light-emitting elements EDa_M, EDb_M, and EDc_M.

In each column (each pixel column), the k redundancy column lines CLa_R, CLb_R, and CLc_R can be connected to the first electrodes Ecl of the k redundancy light-emitting elements EDa_R, EDb_R, and EDc_R.

Hereinafter, to describe the flat surface structure of the display panel 110 according to the aspects and implementations of the present disclosure in more detail, the flat surface structure of a part 1100 of the plan view of FIG. 18 will be described in more detail as an example.

Figure 19:
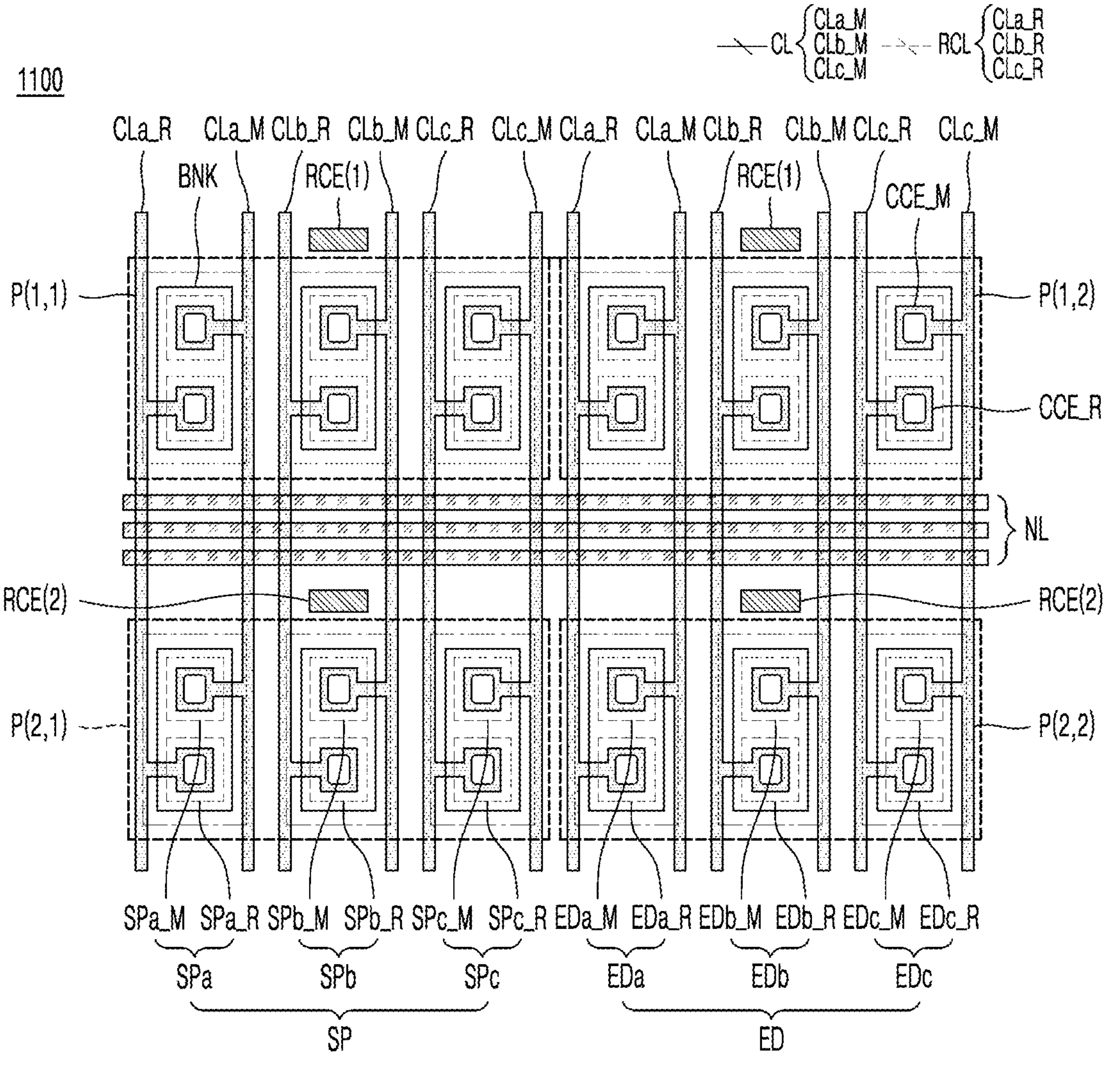
FIGS. 19 and 20 are plan views for some areas of the display panel according to the aspects and implementations of the present disclosure.
Figure 20:
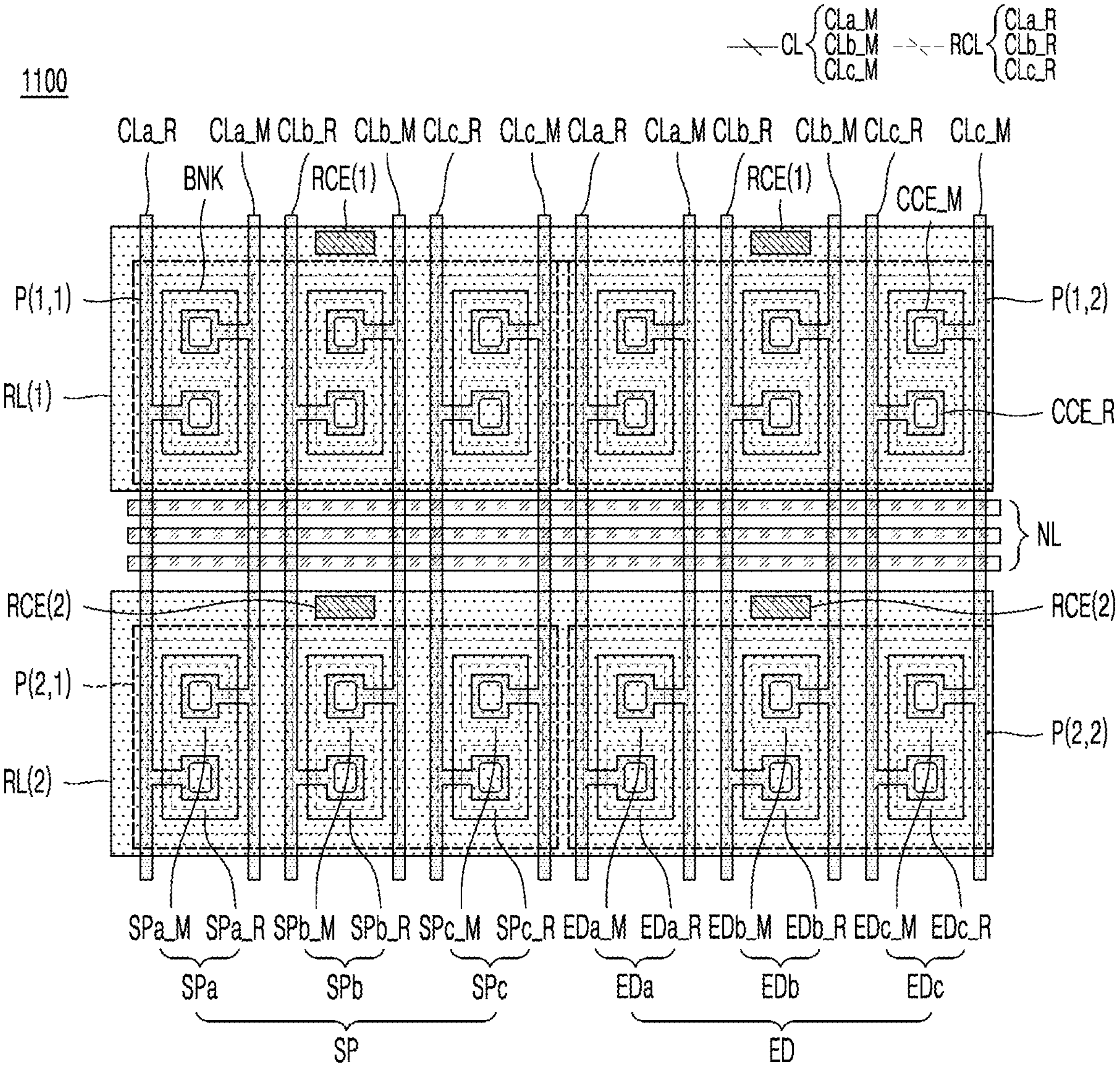

FIGS. 19 and 20 are enlarged plan views of the part 1100 of the plan view of FIG. 18 and enlarged plan views of a 2-row and 2-column area 1100 according to the aspects and implementations of the present disclosure.

Particularly, FIG. 19 is a plan view not illustrating two row lines RL(1) and RL(2) disposed in the 2-row and 2-column area 1100, and FIG. 20 is a plan view in which the two row lines RL(1) and RL(2) disposed in the 2-row and 2-column area 1100 are added to the plan view of FIG. 19.

Referring to FIGS. 19 and 20, in the 2-row and 2-column area 1100, four pixels P(1,1), P(1,2), P(2,1), and P(2,2) can be arranged in 2 rows and 2 columns. For example, in the 2-row and 2-column area 1100, the two pixels P(1,1) and P(1,2) can be arranged in the first row (the first pixel row), and the two pixels P(2,1) and P(2,2) can be arranged in the second row (the second pixel row). In addition, the two pixels P(1,1) and P(2,1) can be arranged in the first column (the first pixel column), and the two pixels P(1,2) and P(2,2) can be arranged in a second column (a second pixel column).

In the 2-row and 2-column area 1100, each of the four pixels P(1,1), P(1,2), P(2,1), and P(2,2) arranged in 2 rows and 2 columns can include k sub-pixels. Here, k denotes the number of sub-pixels included in one pixel.

FIGS. 19 and 20 illustrate a case in which k is 3 as an example. Accordingly, in the 2-row and 2-column area 1100, each of the four pixels P(1,1), P(1,2), P(2,1), and P(2,2) arranged in 2 rows and 2 columns can include 3 sub-pixels SPa, SPb, and SPc. The following description will be given assuming that k is 3.

The three sub-pixels SPa, SPb, and SPc can include the first sub-pixel SPa including the first light-emitting element EDa that emits the light of the first color, the second sub-pixel SPb including the second light-emitting element EDb that emits the light of the second color, and the third sub-pixel SPc including the third light-emitting element EDc that emits the light of the third color.

When the display panel 110 according to the aspects and implementations of the present disclosure has a redundancy structure, the redundancy structure of the sub-pixel is as follows.

The first sub-pixel SPa can include the first main sub-pixel SPa_M including the first main light-emitting element EDa_M and the first redundancy sub-pixel SPa_R including the first redundancy light-emitting element EDa_R, the second sub-pixel SPb can include the second main sub-pixel SPb_M including the second main light-emitting element EDb_M and the second redundancy sub-pixel SPb_R including the second redundancy light-emitting element EDb_R, and the third sub-pixel SPc can include the third main sub-pixel SPc_M including the third main light-emitting element EDc_M and the third redundancy sub-pixel SPc_R including the third redundancy light-emitting element EDc_R.

When the display panel 110 according to the aspects and implementations of the present disclosure has a redundancy structure, the redundancy structure of the light-emitting element is as follows.

The first light-emitting element EDa can include the first main light-emitting element EDa_M that emits the light of the first color and the first redundancy light-emitting element EDa_R that emits the light of the first color, the second light-emitting element EDb can include the second main light-emitting element EDb_M that emits the light of the second color and the second redundancy light-emitting element EDb_R that emits the light of the second color, and the third light-emitting element EDb can include the third main light-emitting element EDc_M that emits the light of the third color and the third redundancy light-emitting element EDc_R that emits the light of the third color.

Referring to FIGS. 19 and 20, in the 2-row and 2-column area 1100, the first row line RL(1), and the second row line RL(2) can be disposed. The first row line RL(1) can be disposed in the first row (the first pixel row), and the second row line RL(2) can be disposed in the second row (the second pixel row).

The first row line RL(1) can correspond to two pixels P(1,1) and P(1,2) arranged in the first row (the first pixel row) and correspond to the three sub-pixels SPa, SPb, and SPc included in each of the two pixels P(1,1) and P(1,2) arranged in the first row (the first pixel row).

In terms of the redundancy structure of the sub-pixel, the first row line RL(1) can be connected to the first main sub-pixel SPa_M, the first redundancy sub-pixel SPa_R, the second main sub-pixel SPb_M, the second redundancy sub-pixel SPb_R, the third main sub-pixel SPc_M, and the third redundancy sub-pixel SPc_R that are arranged in the first row (the first pixel row).

At least a part of the first row line RL(1) can overlap the first main sub-pixel SPa_M, the first redundancy sub-pixel SPa_R, the second main sub-pixel SPb_M, the second redundancy sub-pixel SPb_R, the third main sub-pixel SPc_M, and the third redundancy sub-pixel SPc_R that are arranged in the first row (the first pixel row).

In terms of the redundancy structure of light-emitting element, the first row line RL(1) can be connected to the second electrode Erl of each of the first main light-emitting element EDa_M, the first redundancy light-emitting element EDa_R, the second main light-emitting element EDb_M, the second redundancy light-emitting element EDb_R, the third main light-emitting element EDc_M, and the third redundancy light-emitting element EDc_R that are arranged in the first row (the first pixel row).

At least a part of the first row line RL(1) can overlap the first main light-emitting element EDa_M, the first redundancy light-emitting element EDa_R, the second main light-emitting element EDb_M, the second redundancy light-emitting element EDb_R, the third main light-emitting element EDc_M, and the third redundancy light-emitting element EDc_R that are arranged in the first row (the first pixel row).

The second row line RL(2) can correspond to the two pixels P(2,1) and P(2,2) arranged in the second row (the second pixel row) and correspond to the three sub-pixels SPa, SPb, and SPc included in each of the two pixels P(2,1) and P(2,2) arranged in the second row (the second pixel row).

In terms of the redundancy structure of the sub-pixel, the second row line RL(2) can be connected to the first main sub-pixel SPa_M, the first redundancy sub-pixel SPa_R, the second main sub-pixel SPb_M, the second redundancy sub-pixel SPb_R, the third main sub-pixel SPc_M, and the third redundancy sub-pixel SPc_R that are arranged in the second row (the second pixel row).

At least a part of the second row line RL(2) can overlap the first main sub-pixel SPa_M, the first redundancy sub-pixel SPa_R, the second main sub-pixel SPb_M, the second redundancy sub-pixel SPb_R, the third main sub-pixel SPc_M, and the third redundancy sub-pixel SPc_R that are arranged in the second row (the second pixel row).

In terms of the redundancy structure of light-emitting element, the second row line RL(2) can be connected to the second electrode Erl of each of the first main light-emitting element EDa_M, the first redundancy light-emitting element EDa_R, the second main light-emitting element EDb_M, the second redundancy light-emitting element EDb_R, the third main light-emitting element EDc_M, and the third redundancy light-emitting element EDc_R that are arranged in the second row (the second pixel row).

At least a part of the second row line RL(2) can overlap the first main light-emitting element EDa_M, the first redundancy light-emitting element EDa_R, the second main light-emitting element EDb_M, the second redundancy light-emitting element EDb_R, the third main light-emitting element EDc_M, and the third redundancy light-emitting element EDc_R that are arranged in the second row (the second pixel row).

A plurality of column lines CL can be disposed in the 2-row and 2-column area 1100. The plurality of column lines CL disposed in the 2-row and 2-column area 1100 can include a plurality of first column lines CL connected to the two pixels P(1,1) and P(2,1) arranged in the first column (the first pixel column), and a plurality of second column lines CL connected to the two pixels P(1,2) and P(2,2) arranged in the second column (the second pixel column).

In terms of the redundancy of the sub-pixel, the plurality of first column lines CL disposed in the first column (the first pixel column) can include a first main column line CLa_M connected in common to the first main sub-pixel SPa_M included in each of the two pixels P(1,1) and P(2,1) arranged in the first column (the first pixel column), and a first redundancy column line CLa_R connected in common to the first redundancy sub-pixel SPa_R included in each of the two pixels P(1,1) and P(2,1) arranged in the first column (the first pixel column).

The first main sub-pixel SPa_M included in each of the two pixels P(1,1) and P(2,1) arranged in the first column (the first pixel column) can include the first main light-emitting element EDa_M, and the first redundancy sub-pixel SPa_R included in each of the two pixels P(1,1) and P(2,1) arranged in the first column (the first pixel column) can include the first redundancy light-emitting element EDa_R.

The first main column line CLa_M disposed in the first column (the first pixel column) can be connected in common to the first electrodes Ecl of the two first main light-emitting elements EDa_M arranged in the first column (the first pixel column).

The first redundancy column line CLa_R disposed in the first column (the first pixel column) can be connected in common to the first electrodes Ecl of the two first redundancy light-emitting elements EDa_R arranged in the first column (the first pixel column).

In addition, the plurality of first column lines CL disposed in the first column (the first pixel column) can further include a second main column line CLb_M connected in common to the second main sub-pixel SPb_M included in each of the two pixels P(1,1) and P(2,1) arranged in the first column (the first pixel column), and a second redundancy column line CLb_R connected in common to the second redundancy sub-pixel SPb_R included in each of the two pixels P(1,1) and P(2,1) arranged in the first column (the first pixel column).

The second main sub-pixel SPb_M included in each of the two pixels P(1,1) and P(2,1) arranged in the first column (the first pixel column) can include the second main light-emitting element EDb_M, and the second redundancy sub-pixel SPb_R included in each of the two pixels P(1,1) and P(2,1) arranged in the first column (the first pixel column) can include the second redundancy light-emitting element EDb_R.

The second main column line CLb_M disposed in the first column (the first pixel column) can be connected in common to the first electrodes Ecl of the two second main light-emitting elements EDb_M arranged in the first column (the first pixel column).

The second redundancy column line CLb_R disposed in the first column (the first pixel column) can be connected in common to the first electrodes Ecl of the two second redundancy light-emitting elements EDb_R arranged in the first column (the first pixel column).

In addition, the plurality of first column lines CL disposed in the first column (the first pixel column) can further include a third main column line CLc_M connected in common to the third main sub-pixel SPc_M included in each of the two pixels P(1,1) and P(2,1) arranged in the first column (the first pixel column), and a third redundancy column line CLc_R connected in common to the third redundancy sub-pixel SPc_R included in each of the two pixels P(1,1) and P(2,1) arranged in the first column (the first pixel column).

The third main sub-pixel SPc_M included in each of the two pixels P(1,1) and P(2,1) arranged in the first column (the first pixel column) can include the third main light-emitting element EDc_M, and the third redundancy sub-pixel SPc_R included in each of the two pixels P(1,1) and P(2,1) arranged in the first column (the first pixel column) can include the third redundancy light-emitting element EDc_R.

The third main column line CLc_M disposed in the first column (the first pixel column) can be connected in common to the first electrodes Ecl of the two third main light-emitting elements EDc_M arranged in the first column (the first pixel column).

The third redundancy column line CLc_R disposed in the first column (the first pixel column) can be connected in common to the first electrodes Ecl of the two third redundancy light-emitting elements EDc_R arranged in the first column (the first pixel column).

In terms of the redundancy of the sub-pixel, the plurality of first column lines CL disposed in the second column (the second pixel column) can include the first main column line CLa_M connected in common to the first main sub-pixel SPa_M included in each of the two pixels P(1,2) and P(2,2) arranged in the second column (the first pixel column), and the first redundancy column line CLa_R connected in common to the first redundancy sub-pixel SPa_R included in each of the two pixels P(1,2) and P(2,2) arranged in the second column (the second pixel column).

The first main sub-pixel SPa_M included in each of the two pixels P(1,2) and P(2,2) arranged in the second column (the second pixel column) can include the first main light-emitting element EDa_M, and the first redundancy sub-pixel SPa_R included in each of the two pixels P(1,2) and P(2,2) arranged in the second column (the second pixel column) can include the first redundancy light-emitting element EDa_R.

The first main column line CLa_M disposed in the second column (the second pixel column) can be connected in common to the first electrodes Ecl of the two first main light-emitting elements EDa_M arranged in the second column (the second pixel column).

The first redundancy column line CLa_R disposed in the second column (the second pixel column) can be connected in common to the first electrodes Ecl of the two first redundancy light-emitting elements EDa_R arranged in the second column (the second pixel column).

In addition, the plurality of second column lines CL disposed in the second column (the second pixel column) can further include the second main column line CLb_M connected in common to the second main sub-pixel SPb_M included in each of the two pixels P(1,2) and P(2,2) arranged in the second column (the second pixel column), and the second redundancy column line CLb_R connected in common to the second redundancy sub-pixel SPb_R included in each of the two pixels P(1,2) and P(2,2) arranged in the second column (the second pixel column).

The second main sub-pixel SPb_M included in each of the two pixels P(1,2) and P(2,2) arranged in the second column (the second pixel column) can include the second main light-emitting element EDb_M, and the second redundancy sub-pixel SPb_R included in each of the two pixels P(1,2) and P(2,2) arranged in the second column (the second pixel column) can include the second redundancy light-emitting element EDb_R.

The second main column line CLb_M disposed in the second column (the second pixel column) can be connected in common to the first electrodes Ecl of the two second main light-emitting elements EDb_M arranged in the second column (the second pixel column).

The second redundancy column line CLb_R disposed in the second column (the second pixel column) can be connected in common to the first electrodes Ecl of the two second redundancy light-emitting elements EDb_R arranged in the second column (the second pixel column).

In addition, the plurality of first column lines CL disposed in the second column (the second pixel column) can further include the third main column line CLc_M connected in common to the third main sub-pixel SPc_M included in each of the two pixels P(1,2) and P(2,2) arranged in the second column (the second pixel column), and the third redundancy column line CLc_R connected in common to the third redundancy sub-pixel SPc_R included in each of the two pixels P(1,2) and P(2,2) arranged in the second column (the second pixel column).

The third main sub-pixel SPc_M included in each of the two pixels P(1,2) and P(2,2) arranged in the second column (the second pixel column) can include the third main light-emitting element EDc_M, and the third redundancy sub-pixel SPc_R included in each of the two pixels P(1,2) and P(2,2) arranged in the second column (the second pixel column) can include the third redundancy light-emitting element EDc_R.

The third main column line CLc_M disposed in the second column (the second pixel column) can be connected in common to the first electrodes Ecl of the two third main light-emitting elements EDc_M arranged in the second column (the second pixel column).

The third redundancy column line CLc_R disposed in the second column (the second pixel column) can be connected in common to the first electrodes Ecl of the two third redundancy light-emitting elements EDc_R arranged in the second column (the second pixel column).

Referring to FIGS. 19 and 20, in each of the first column (the first pixel column) and the second column (the second pixel column), each of the plurality of column lines CL can include at least one column connection electrode having a shape that protrudes upward from a bank BNK. For example, the at least one column connection electrode can be an electrode electrically connected to each of the plurality of column lines CL or a portion protruding from each of the plurality of column lines CL.

Each of the first main column line CLa_M, the second main column line CLb_M, and the third main column line CLc_M can include a main column connection electrode CCE_M protruding upward from the bank BNK and disposed to extend upward from the bank BNK.

On the main column connection electrodes CCE_M disposed to extend upward from the bank BNK, the first main light-emitting elements EDa_M, the second main light-emitting elements EDb_M, and the third main light-emitting elements EDc_M can be disposed.

In each of the first column (the first pixel column) and the second column (the second pixel column), each of the first redundancy column line CLa_R, the second redundancy column line CLb_R, and the third redundancy column line CLc_R can include a redundancy column connection electrode CCE_R protruding toward the bank BNK and disposed to extend upward from the bank BNK.

On the redundancy column connection electrodes CCE_R disposed to extend upward from the bank BNK, the first redundancy light-emitting elements EDa_R, the second redundancy light-emitting elements EDb_R, and the third redundancy light-emitting elements EDc_R can be disposed.

The main column connection electrodes CCE_M and the redundancy column connection electrodes CCE_R that are arranged in the first column (the first pixel column) can be disposed between the first main column line CLa_M and the first redundancy column line CLa_R.

The main column connection electrodes CCE_M and the redundancy column connection electrodes CCE_R that are arranged in the second column (the second pixel column) can be disposed between the second main column line CLb_M and the second redundancy column line CLb_R.

The main column connection electrodes CCE_M and the redundancy column connection electrodes CCE_R that are arranged in the third column (the third pixel column) can be disposed between the third main column line CLc_M and the third redundancy column line CLc_R.

The display panel 110 according to the aspects and implementations of the present disclosure can further include at least one row connection electrode for electrically connecting each of the plurality of row lines RL to the driver DRV.

The display panel 110 according to the aspects and implementations of the present disclosure can further include at least one first row connection electrode RCE(1) connected to the first row line RL(1) disposed in the first row (the first pixel row), and at least one second row connection electrode RCE(2) connected to the second row line RL(2) disposed in the second row (the second pixel row).

The first row line RL(1) can vertically overlap the at least one first row connection electrode RCE(1), and the second row line RL(2) can vertically overlap the at least one second row connection electrode RCE(2).

The first row line RL(1) can be electrically connected to the row driver R-DRV of the corresponding driver DRV through the at least one first row connection electrode RCE(1). The second row line RL(2) can be electrically connected to the row driver R-DRV of the corresponding driver DRV through the at least one second row connection electrode RCE(2).

According to the aspects and implementations of the present disclosure, the bank BNK can be disposed in each of a plurality of sub-pixels SP. The plurality of banks BNK can be structures on which the plurality of light-emitting elements ED are seated. When manufacturing a panel, in a transfer process for transferring a plurality of light-emitting elements ED onto the display device 100, the plurality of banks BNK can guide locations of the plurality of light-emitting elements ED. For example, when manufacturing a panel, the plurality of light-emitting elements ED can be transferred onto the plurality of banks BNK in the transfer process of the plurality of light-emitting elements ED. The plurality of banks BNK can be an organic insulating layer, a bank pattern, a structure, etc., but the aspects and implementations of the present disclosure are not limited thereto.

The banks BNK of the plurality of sub-pixels SP can be disposed to be spaced apart from each other. The banks BNK of the plurality of sub-pixels SP can be separately formed. Accordingly, the banks BNK of the first sub-pixel SPa, the second sub-pixel SPb, and the third sub-pixel SPc onto which different types of light-emitting elements ED are transferred can be easily identified.

The bank BNK of the first main sub-pixel SPa_M and the bank BNK of the first redundancy sub-pixel SPa_R can be connected, formed to be spaced apart from each other, or formed separately. For example, in consideration of the design of the transfer process requirements, etc., the bank BNK of the first main sub-pixel SPa_M and the bank BNK of the first redundancy sub-pixel SPa_R in which the light-emitting elements EDa_M and EDa_R of the same type (e.g., types that emit light of the same color) are disposed can be connected, formed to be spaced apart from each other, or formed separately. In addition, the bank BNK of the second main sub-pixel SPb_M and the bank BNK of the second redundancy sub-pixel SPb_R can be connected, formed to be spaced apart from each other, or formed separately. The bank BNK of the third main sub-pixel SPc_M and the bank BNK of the third redundancy sub-pixel SPc_R can be connected, formed to be spaced apart from each other, or formed separately.

The banks BNK of the first main sub-pixel SPa_M and the first redundancy sub-pixel SPa_R, the banks BNK of the second main sub-pixel SPb_M and the second redundancy sub-pixel SPb_R, and the banks BNK of the third main sub-pixel SPc_M and the third redundancy sub-pixel SPc_R can be formed in any of various ways, and the aspects and implementations of the present disclosure are not limited thereto.

For example, the plurality of banks BNK can be formed of an organic insulation material. The plurality of banks BNK can be formed of a single layer or multiple layers of an organic insulation material. For example, the plurality of banks BNK can be formed of a photoresist, polyimide (PI), or acrylic-based material, but the aspects and implementations of the present disclosure are not limited thereto.

The plurality of row lines RL can be formed of a transparent conductive material, but the aspects and implementations of the present disclosure are not limited thereto. The plurality of row lines RL can be formed of a transparent conductive material so that light emitted from the light-emitting elements ED can travel upward from the row lines RL. For example, the plurality of row lines RL can be formed of a transparent conductive material, such as indium tin oxide (ITO), indium zinc oxide (IZO), indium gallium zinc oxide (IGZO), etc., but the aspects and implementations of the present disclosure are not limited thereto.

The plurality of column lines CL can be formed of a conductive material. For example, the plurality of column lines CL can be formed of a conductive material, such as titanium (Ti), aluminum (Al), copper (Cu), molybdenum (Mo), nickel (Ni), chromium (Cr), indium tin oxide (ITO), indium zinc oxide (IZO), indium gallium zinc oxide (IGZO), etc., but the aspects and implementations of the present disclosure are not limited thereto. As another example, the plurality of column lines CL can be formed of a conductive multilayered structure. For example, the plurality of column lines CL can be formed of a multilayered structure of titanium (Ti)/aluminum (Al)/titanium (Ti)/indium tin oxide (ITO), but the aspects and implementations of the present disclosure are not limited thereto.

For example, when the light-emitting element ED is an element manufactured through a semiconductor process, such as a micro LED, the display panel 110 can be manufactured by forming a plurality of light-emitting elements ED on a wafer and transferring the light-emitting elements ED onto the substrate 210 of the display panel 110. During the process of transferring the plurality of light-emitting elements ED having a micro size from the wafer onto the substrate 210, various defects can occur. For example, a non-transfer defect in which the light-emitting element ED is not transferred can occur in some sub-pixels SP, and a misalignment defect in which the light-emitting element ED is transferred out of a correct location due to an alignment error can occur in other sub-pixels SP. In addition, the transfer process can be normally performed, but the transferred light-emitting element ED can be defective. Accordingly, in consideration of the defect (the non-transfer defect) that occurs during the transfer process of the plurality of light-emitting elements ED, the main light-emitting element and the redundancy light-emitting element, which are light-emitting elements of the same type (e.g., light-emitting elements that emit light of the same color), can be transferred onto one sub-pixel SP. A turn-on test can be performed on the main light-emitting element and the redundancy light-emitting element of the same type, and only one of the main light-emitting elements and the redundancy light-emitting element, which is ultimately determined to be normal, can be used.

For example, the first main light-emitting element EDa_M and the first redundancy light-emitting element EDa_R can be transferred onto one first sub-pixel SPa together, and whether the first main light-emitting element EDa_M and the first redundancy light-emitting element EDa_R are defective can be tested. As the result of the test, when it is determined that both the first main light-emitting element EDa_M and the first redundancy light-emitting element EDa_R are normal, only the first main light-emitting element EDa_M can be used, and the first redundancy light-emitting element EDa_R may not be used. As the result of the test, when it is determined that only the first redundancy light-emitting element EDa_R among the first main light-emitting element EDa_M and the first redundancy light-emitting element EDa_R is normal, the first main light-emitting element EDa_M may not be used, and only the first redundancy light-emitting element EDa_R can be used. Accordingly, even when the first main light-emitting element EDa_M and the first redundancy light-emitting element EDa_R of the same type are transferred onto one first sub-pixel SPa, only one of the first main light-emitting element EDa_M and the first redundancy light-emitting element EDa_R can be ultimately used.

Accordingly, the redundancy light-emitting element among the main light-emitting element and the redundancy light-emitting element that are disposed in one sub-pixel SP can be a spare light-emitting element transferred in preparation of a defect of the main light-emitting element. In the event of the defect of the main light-emitting element, the redundancy light-emitting element can be used as a replacement. Accordingly, by transferring the main light-emitting element and the redundancy light-emitting element together to one sub-pixel SP, it is possible to minimize the degradation of display quality due to the defect of one of the main light-emitting element and the redundancy light-emitting element.

In accordance with the aspects and implementations of the present disclosure, the first main sub-pixel SPa_M and the first redundancy sub-pixel SPa_R can also be referred to as a 1-1 sub-pixel and a 1-2 sub-pixel, the second main sub-pixel SPb_M and the second redundancy sub-pixel SPb_R can also be referred to as a 2-1 sub-pixel and a 2-2 sub-pixel, and the third main sub-pixel SPc_M and the third redundancy sub-pixel SPc_R can also be referred to as a 3-1 sub-pixel and a 3-2 sub-pixel.

In accordance with the aspects and implementations of the present disclosure, the first main light-emitting element EDa_M and the first redundancy light-emitting element EDa_R can also be referred to as a 1-1 light-emitting element and a 1-2 light-emitting element, the second main light-emitting element EDb_M and the second redundancy light-emitting element EDb_R can also be referred to as a 2-1 light-emitting element and a 2-2 light-emitting element, and the third main light-emitting element EDc_M and the third redundancy light-emitting element EDc_R can also be referred to as a 3-1 light-emitting element and a 3-2 light-emitting element.

The display panel 110 according to the aspects and implementations of the present disclosure can further include a plurality of communication lines NL. The plurality of communication lines NL can be disposed not to vertically overlap the metal layer. For example, the plurality of communication lines NL can be disposed between the first row line RL(1) and the second row line RL(2).

For example, the plurality of communication lines NL can be lines for short-range communication, such as near field communication (NFC), Bluetooth, etc. The plurality of communication lines NL can serve as signal transmission lines and/or antennas, but the aspects and implementations of the present disclosure are not limited thereto.

Referring to FIG. 20, the first row line RL(1) can be disposed above the plurality of light-emitting elements disposed in the first row (the first pixel row) and disposed in a bar shape that overlaps all of the plurality of light-emitting elements arranged in the first row (the first pixel row).

The second row line RL(2) can be disposed above the plurality of light-emitting elements arranged in the second row (the second pixel row) and disposed in a bar shape that overlaps all of the plurality of light-emitting elements arranged in the second row (the second pixel row).

Figure 21:
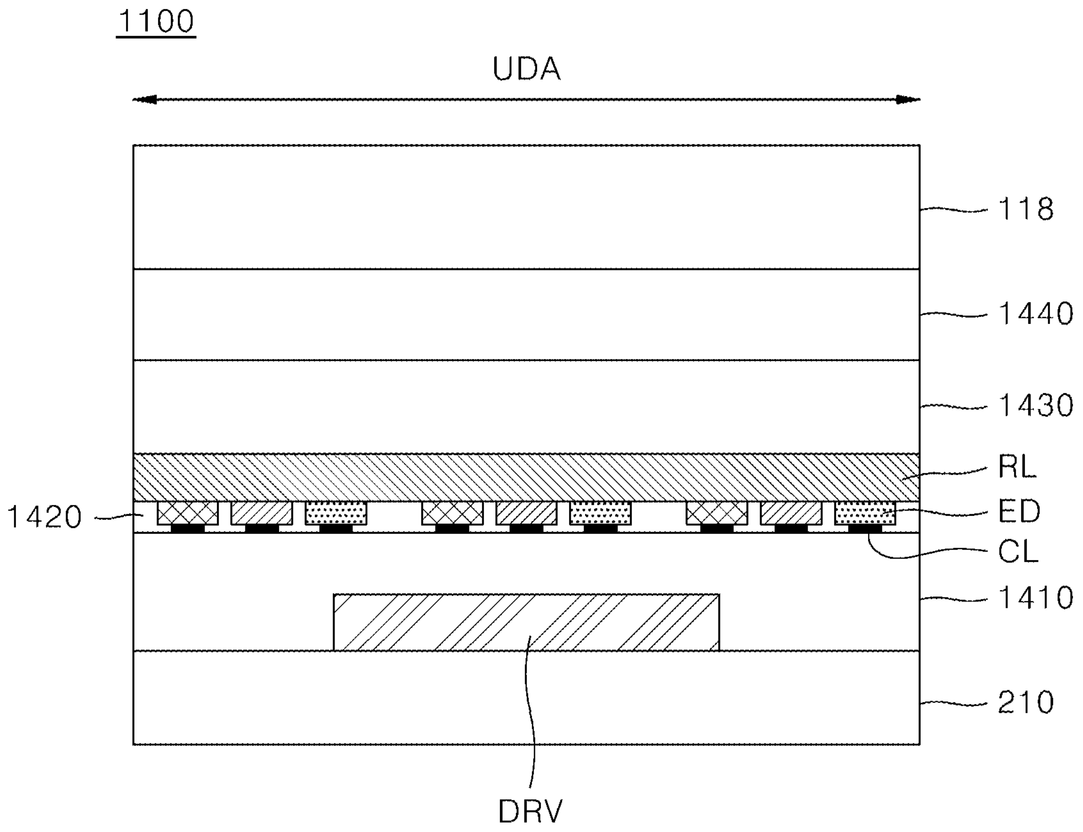
FIG. 21 is a cross-sectional view of the display panel according to the aspects and implementations of the present disclosure.

FIG. 21 is a plan view of the display panel 110 according to the aspects and implementations of the present disclosure. However, FIG. 21 is a cross-sectional view of a part of the unit driving area UDA in which one driver DRV is disposed.

Referring to FIG. 21, the display panel 110 according to the aspects and implementations of the present disclosure can include the substrate 210, a driver DRV on the substrate 210, a layer stack 1410 on the driver DRV, the plurality of light-emitting elements ED disposed on the layer stack 1410, an optical layer 1420 disposed on the layer stack 1410 and between the plurality of light-emitting elements ED, an overcoat layer 1430 disposed on the plurality of light-emitting elements ED and the optical layer 1420, an adhesive layer 1440 disposed on the overcoat layer 1430, and a cover member 118 disposed on the adhesive layer 1440.

The plurality of column lines CL can be disposed on the layer stack 1410. Each of the plurality of column lines CL can be disposed between the layer stack 1410 and the light-emitting element ED. The plurality of row lines RL can be disposed on the plurality of light-emitting elements ED and the optical layer 1420.

The display panel 110 according to the aspects and implementations of the present disclosure can include the substrate 210 including the display area DA, the plurality of light-emitting elements ED disposed in the display area DA, the plurality of column lines CL electrically connected to the first electrodes Ecl of each of the plurality of light-emitting elements ED, the plurality of row lines RL electrically connected to the second electrodes Erl of each of the plurality of light-emitting elements ED, and the plurality of drivers DRV configured to drive the plurality of light-emitting elements ED, the plurality of column lines CL, and the plurality of row lines RL.

The plurality of drivers DRV can be disposed in the display area DA and located closer to the substrate 210 than the plurality of light-emitting elements ED.

The layer stack 1410 can include a plurality of insulating layers. The plurality of insulating layers can include a plurality of organic layers. At least one of the plurality of organic layers can be disposed one side surfaces of the driver DRV. For example, two or more organic layers can be disposed on the side surfaces of the driver DRV.

The layer stack 1410 can further include at least one metal layer connecting the driver DRV to the column line CL and at least one metal layer connecting the driver DRV to the row line RL.

Figure 22:
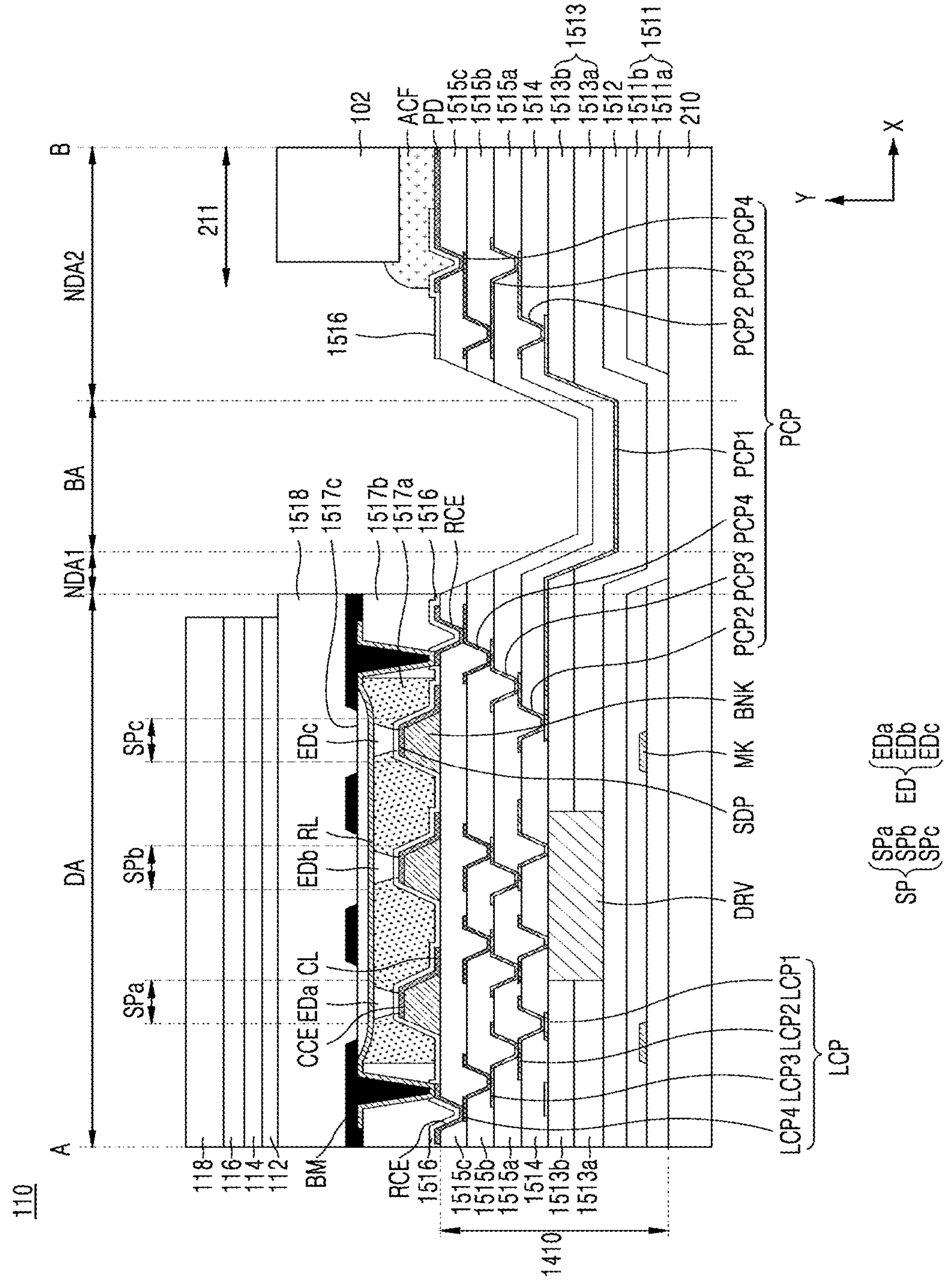
FIG. 22 is a specific cross-sectional view of the display panel according to the aspects and implementations of the present disclosure and a cross-sectional view along line A-B in FIG. 17.
Figure 23:
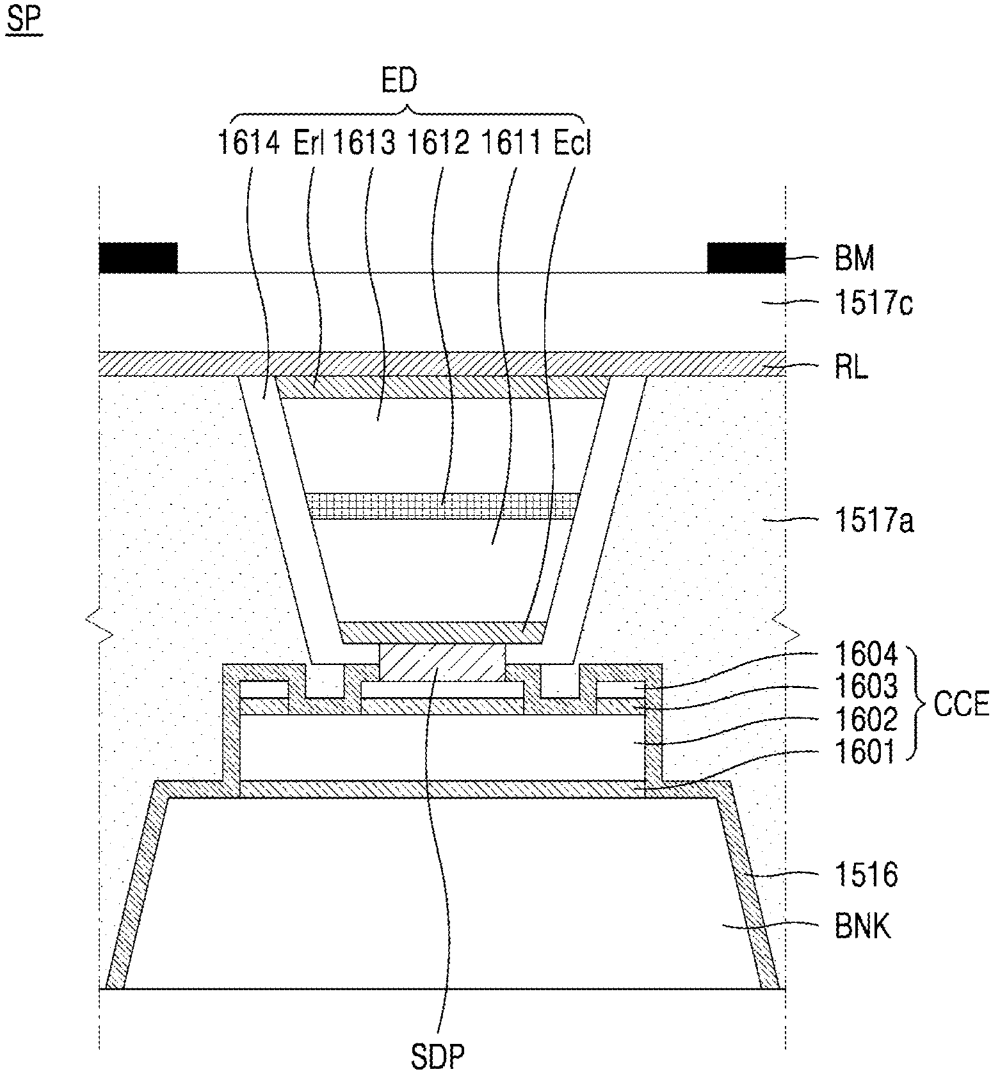
FIG. 23 is an enlarged cross-sectional view of a first sub-pixel of the display panel according to the aspects and implementations of the present disclosure.

FIG. 22 is a specific cross-sectional view of the display panel 110 according to the aspects and implementations of the present disclosure and a cross-sectional view along line A-B in FIG. 17, and FIG. 23 is an enlarged cross-sectional view of the sub-pixel SP of the display panel 110 according to the aspects and implementations of the present disclosure. However, FIG. 22 is a cross-sectional view of the display area DA, the first non-display area NDA, the bending area BA, and the second non-display area NDA2.

Referring to FIG. 22, a buffer layer 1511 can be disposed on the substrate 210. The buffer layer 1511 can include a first buffer layer 1511*a* and a second buffer layer 1511*b*. The first buffer layer 1511*a* and the second buffer layer 1511*b* can be disposed in the display area DA, the first non-display area NDA1, and the second non-display area NDA2 and may not be disposed in the entirety or part of the bending area BA. However, the aspects and implementations of the present disclosure are not limited thereto.

The first buffer layer 1511*a* and the second buffer layer 1511*b* can reduce the penetration of moisture or impurities into the substrate 210. The first buffer layer 1511*a* and the second buffer layer 1511*b* can be formed of an inorganic insulation material. For example, the first buffer layer 1511*a* and the second buffer layer 1511*b* can be formed of a single layer or multiple layers of silicon oxide ($SiO_x$) or silicon nitride ($SiN_x$), but the aspects and implementations of the present disclosure are not limited thereto.

For example, parts of the first buffer layer 1511*a* and the second buffer layer 1511*b* on the bending area BA can be removed. An upper surface of the substrate 210 located in the bending area BA can be exposed with respect to an area (an opening) in which the first buffer layer 1511*a* and the second buffer layer 1511*b* are removed.

By removing the first buffer layer 1511*a* and the second buffer layer 1511*b* from the bending area BA, it is possible to minimize cracks in the first buffer layer 1511*a* and the second buffer layer 1511*b*, which can occur during bending.

A plurality of alignment keys MK can be disposed between the first buffer layer 1511*a* and the second buffer layer 1511*b*. The plurality of alignment keys MK can be formed to identify the location of the driver DRV during the manufacturing process of the display panel 110. For example, the plurality of alignment keys MK can be formed to align the location of the driver DRV transferred onto the adhesive layer 1512. As another example, the plurality of alignment keys MK can be omitted.

The adhesive layer 1512 can be disposed on the second buffer layer 1511*b*. The adhesive layer 1512 can be disposed in the display area DA, the first non-display area NDA1, the bending area BA, and the second non-display area NDA2. As another example, at least a part of the adhesive layer 1512 can be removed in the non-display area NDA including the bending area BA. For example, the adhesive layer 1512 can be formed of one of an adhesive polymer, an epoxy resin, a UV-curable resin, a polyimide-based material, an acrylate-based material, a urethane-based material, and a polydimethylsiloxane (PDMS), but the aspects and implementations of the present disclosure are not limited thereto.

The driver DRV can be disposed on the adhesive layer 1512 in the display area DA. When the driver DRV is implemented as a driving driver (a driving integrated circuit), the driving driver can be mounted on the adhesive layer 1512 by a transfer process, but the aspects and implementations of the present disclosure are not limited thereto.

The display panel 110 can further include a side protective layer 1513 disposed on side surfaces of the plurality of drivers DRV, and an upper protective layer 1514 disposed on the plurality of drivers DRV and the side protective layer 1513. For example, the side protective layer 1513 can include at least one of a first protective layer 1513*a* and a second protective layer 1513*b* that are disposed on the side surfaces of the plurality of drivers DRV, and in some cases, can further include at least one additional protective layer. The first protective layer 1513*a* and the second protective layer 1513*b* can be disposed on the adhesive layer 1512. The first protective layer 1513*a* and the second protective layer 1513*b* can be disposed to surround the side surfaces of the driver DRV, but the aspects and implementations of the present disclosure are not limited thereto. For example, the second protective layer 1513*b* can be disposed to cover at least a part of an upper surface of the driver DRV. For example, at least one of the first protective layer 1513*a* and the second protective layer 1513*b* that are disposed on the bending area BA can be omitted. For example, the first protective layer 1513*a* can be disposed across the display area DA and the non-display area NDA, and the second protective layer 1513*b* can be disposed partially in the display area DA, the first non-display area NDA1, and the second non-display area NDA2. For example, at least a part of the second protective layer 1513*b* can be removed in the entirety or part of the bending area BA. However, the aspects and implementations of the present disclosure are not limited thereto.

For example, the side protective layer 1513 including at least one of the first protective layer 1513*a* and the second protective layer 1513*b* can be formed of an organic insulation material (an organic layer), but the aspects and implementations of the present disclosure are not limited thereto. For example, the first protective layer 1513*a* and the second protective layer 1513*b* can be formed of a photoresist, polyimide (PI), or a photo acryl-based material, but the aspects and implementations of the present disclosure are not limited thereto. For example, the first protective layer 1513*a* and the second protective layer 1513*b* can be an overcoating layer or an insulating layer, but the aspects and implementations of the present disclosure are not limited thereto.

According to the aspects and implementations of the present disclosure, in the display area DA, a plurality of line connection patterns LCP can be disposed on the second protective layer 1513*b*. The plurality of line connection patterns LCP can be lines for electrically connecting the driver DRV to other components. For example, the driver DRV can be electrically connected to the plurality of column lines CL, the plurality of row lines RL, and a plurality of row connection electrodes RCE through the plurality of line connection patterns LCP.

For example, the plurality of line connection patterns LCP can include a first line connection pattern LCP1, a second line connection pattern LCP2, a third line connection pattern LCP3, and a fourth line connection pattern LCP4, but the aspects and implementations of the present disclosure are not limited thereto. For example, the first line connection pattern LCP1, the second line connection pattern LCP2, the third line connection pattern LCP3, and the fourth line connection pattern LCP4 can be disposed in different metal layers.

For example, the plurality of first line connection patterns LCP1 can be disposed on the second protective layer 1513*b*. The plurality of first line connection patterns LCP1 can be electrically connected to the driver DRV. The plurality of first line connection patterns LCP1 can transfer a voltage output from the driver DRV to the column line CL or the row line RL.

The display panel 110 can further include the side protective layer 1513 including at least one of the first protective layer 1513*a* and the second protective layer 1513*b* and the upper protective layer 1514 disposed on the plurality of drivers DRV. For example, the upper protective layer 1514 can include the third protective layer 1514, and in some cases, can further include at least one additional protective layer. The third protective layer 1514 can be disposed on the second protective layer 1513*b* and the plurality of first line connection patterns LCP1. The third protective layer 1514 can be disposed entirely in the display area DA and the non-display area NDA. In the bending area BA, the third protective layer 1514 can cover side surfaces of the second protective layer 1513*b* and an upper surface of the first protective layer 1513*a*.

For example, the third protective layer 1514 can be formed of an organic insulation material. For example, the third protective layer 1514 can be formed of a photoresist, polyimide (PI), or a photo acryl-based material, but the aspects and implementations of the present disclosure are not limited thereto. For example, the first protective layer 1513*a*, the second protective layer 1513*b*, and the third protective layer 1514 can be formed of the same insulation material, or at least one of the first protective layer 1513*a*, the second protective layer 1513*b*, and the third protective layer 1514 can be formed of a different insulation material from the remaining ones. The aspects and implementations of the present disclosure are not limited thereto.

For example, the plurality of second line connection patterns LCP2 can be disposed on the third protective layer 1514. The plurality of second line connection patterns LCP2 can be electrically or directly connected to the driver DRV. For example, some of the second line connection patterns LCP2 can be directly or indirectly connected to the driver DRV through a contact hole of the third protective layer 1514. The others of the second line connection patterns LCP2 can be electrically connected to the first line connection pattern LCP1 through the contact hole of the third protective layer 1514. However, the aspects and implementations of the present disclosure are not limited thereto. The voltage output from the driver DRV can be transmitted to the column line CL or the row line RL through a different connection pattern from the plurality of second line connection patterns LCP2.

A first insulating layer 1515*a* can be disposed on the plurality of second line connection patterns LCP2. The first insulating layer 1515*a* can be disposed entirely in the display area DA and the non-display area NDA, but the aspects and implementations of the present disclosure are not limited thereto. The first insulating layer 1515*a* can be formed of an organic insulation material, but the aspects and implementations of the present disclosure are not limited thereto. For example, the first insulating layer 1515*a* can be formed of a photoresist, polyimide (PI), or photo acryl-based material, but the aspects and implementations of the present disclosure are not limited thereto.

A plurality of third line connection patterns LCP3 can be disposed on the first protective layer 1515*a*. The plurality of third line connection patterns LCP3 can be electrically connected to the plurality of second line connection patterns LCP2. For example, the third line connection patterns LCP3 can be electrically connected to the second line connection patterns LCP2 through contact holes of the first insulating layer 1515*a*.

A second insulating layer 1515*b* can be disposed on the plurality of third line connection patterns LCP3. The second insulating layer 1515*b* can be disposed in the display area DA, the first non-display area NDA1, and the second non-display area NDA2 and may not be disposed in the entirety or part of the bending area BA, but the aspects and implementations of the present disclosure are not limited thereto. For example, the second insulating layer 1515*b* can be removed in the entirety or part of the bending area BA. The second insulating layer 1515*b* can be formed of an organic insulation material, but the aspects and implementations of the present disclosure are not limited thereto. For example, the second insulating layer 1515*b* can be formed of a photoresist, polyimide (PI), or photo acryl-based material, but the aspects and implementations of the present disclosure are not limited thereto.

A plurality of fourth line connection patterns LCP4 can be disposed on the second insulating layer 1515*b*. The plurality of fourth line connection patterns LCP4 can be electrically connected to the plurality of third line connection patterns LCP3. For example, the fourth line connection patterns LCP4 can be electrically connected to the third line connection patterns LCP3 through contact holes of the second insulating layer 1515*b*.

According to the aspects and implementations of the present disclosure, a plurality of pad connection patterns PCP can be disposed on the second protective layer 1513*b* in the non-display area NDA. The plurality of pad connection patterns PCP can be lines for transmitting signals transmitted from the flexible printed circuit 102 to the pad part 211 to the driver DRV of the display area DA. For example, the plurality of pad connection patterns PCP can be electrically connected to the plurality of pads PD and can receive the signals from the flexible printed circuit 102 through the plurality of pads PD. The flexible printed circuit 102 can be connected to the printed circuit board 104 (see FIGS. 1 and 2).

For example, the plurality of pad connection patterns PCP can extend from the pad part 211 toward the display area DA to transmit the signals to the lines of the display area DA. In this case, the plurality of pad connection patterns PCP can serve as the link lines LL (see FIG. 10). The plurality of pad connection patterns PCP can include a first pad connection pattern PCP1, a second pad connection pattern PCP2, a third pad connection pattern PCP3, and a fourth pad connection pattern PCP4.

A plurality of first pad connection patterns PCP1 can be disposed on the second protective layer 1513*b*. Each of the plurality of first pad connection patterns PCP1 can be disposed across the second non-display area NDA2, the bending area BA, and the first non-display area NDA1. Each of the plurality of first pad connection patterns PCP1 can include a first portion disposed in the bending area BA, a second portion extending from the first portion to the first non-display area NDA1, and a third portion extending from the first portion to the second non-display area NDA2. Each of the plurality of first pad connection patterns PCP1 can further extend from the first non-display area NDA1 to a part of the display area DA. The plurality of first pad connection patterns PCP1 can transmit the signals transmitted from the flexible printed circuit 102 to the pad part 211 to the driver DRV of the display area DA.

Each of the plurality of first pad connection patterns PCP1 can be electrically connected to the pad PD of the pad part 211 through connection patterns disposed in the second non-display area NDA2. Here, the connection patterns electrically connecting each of the plurality of first pad connection patterns PCP1 to the pad PD can include at least one of the second pad connection pattern PCP2, the third pad connection pattern PCP3, and the fourth pad connection pattern PCP4 that are disposed in the second non-display area NDA2.

Each of the plurality of first pad connection patterns PCP1 can be electrically connected to the driver DRV through the connection patterns disposed in the display area DA. Here, the connection patterns electrically connecting each of the plurality of first pad connection patterns PCP1 to the pad DRV can include at least one of the second pad connection pattern PCP2, the third pad connection pattern PCP3, and the fourth pad connection pattern PCP4 that are disposed in the display area DA.

For example, the plurality of second pad connection patterns PCP2 can be disposed on the third protective layer 1514. The plurality of second pad connection patterns PCP2 can be disposed in the second non-display area NDA2. The second pad connection pattern PCP2 can be electrically connected to the first pad connection pattern PCP1 through the contact hole of the third protective layer 1514. Accordingly, the signal supplied from the flexible printed circuit 102 can be transmitted to the first pad connection pattern PCP1 through the second pad connection pattern PCP2.

The third pad connection pattern PCP3 can be disposed on the first insulating layer 1515*a*. The third pad connection pattern PCP3 can be disposed in the second non-display area NDA2. The third pad connection pattern PCP3 can be electrically connected to the second pad connection pattern PCP2 through the contact hole of the first insulating layer 1515*a*. Accordingly, the signal supplied from the flexible printed circuit 102 can be transmitted to the second pad connection pattern PCP2 through the third pad connection pattern PCP3, and the signal transmitted to the second pad connection pattern PCP2 can be transmitted back to the first pad connection pattern PCP1.

The fourth pad connection pattern PCP4 can be disposed on the second insulating layer 1515*b*. The fourth pad connection pattern PCP4 can be disposed in the second non-display area NDA2. The fourth pad connection pattern PCP4 can be electrically connected to the third pad connection pattern PCP3 through the contact hole of the second insulating layer 1515*b*. The pad PD of the pad part 211 can be electrically connected to the fourth pad connection pattern PCP4 through a contact hole of a third insulating layer 1515*c*.

The signal supplied from the flexible printed circuit 102 can be input to the pad PD of the pad part 211, the signal input to the pad PD can be transmitted to the third pad connection pattern PCP3 through the fourth pad connection pattern PCP4, and the signal transmitted to the third pad connection pattern PCP3 can be transmitted back to the first pad connection pattern PCP1 through the second pad connection pattern PCP2. The signal transmitted to the first pad connection pattern PCP1 can be transmitted to the driver DRV through the connection patterns disposed in the display area DA.

The plurality of line connection patterns LCP and the plurality of pad connection patterns PCP can be disposed in various metal layers. The plurality of line connection patterns LCP and the plurality of pad connection patterns PCP can be formed of an excellent flexible conductive material or one of various conductive materials used in the display area DA.

For example, a metal pattern, such as the first pad connection pattern PCP1 of which at least a part is disposed in the bending area BA, can be formed of an excellent flexible conductive material, such as gold (Au), silver (Ag), aluminum (Al), etc., but the aspects and implementations of the present disclosure are not limited thereto. As another example, the plurality of line connection patterns LCP and the plurality of pad connection patterns PCP can be formed of an alloy of molybdenum (Mo), chromium (Cr), titanium (Ti), nickel (Ni), neodymium (Nd), copper (Cu), and an alloy of silver (Ag) and magnesium (Mg), or an alloy thereof, but the aspects and implementations of the present disclosure are not limited thereto.

The third insulating layer 1515*c* can be disposed on the plurality of line connection patterns LCP and the plurality of pad connection patterns PCP. The third insulating layer 1515*c* can be disposed in the display area DA, the first non-display area NDA1, and the second non-display area NDA2 and disposed in the entirety or part of the bending area BA, but the aspects and implementations of the present disclosure are not limited thereto. A part of the third insulating layer 1515*c* can be removed in the bending area BA. The third insulating layer 1515*c* can be formed of an organic insulation material, but the aspects and implementations of the present disclosure are not limited thereto. For example, the third insulating layer 1515*c* can be formed of a photoresist, polyimide (PI), or photo acryl-based material, but the aspects and implementations of the present disclosure are not limited thereto.

A plurality of banks BNK can be disposed on the third insulating layer 1515*c* in the display area DA. The plurality of banks BNK can be disposed to overlap at least a part of each of the plurality of sub-pixels SPa, SPb, and SPc. For example, the first sub-pixel SPa can include a first light-emitting element that emits light of a first color, the second sub-pixel SPb can include a second light-emitting element that emits light of a second color, and the third sub-pixel SPc can include a third light-emitting element that emits light of a third color.

For example, one light-emitting element ED can be disposed above each of the plurality of banks BNK. As another example, two or more light-emitting elements ED can be disposed above each of the plurality of banks BNK. The two or more light-emitting elements ED disposed above each of the plurality of banks BNK can be light-emitting elements of the same kind. For example, the light-emitting elements of the same kind can be light-emitting elements that emit light of the same color. For example, the two or more light-emitting elements ED disposed above each of the plurality of banks BNK can include a main light-emitting element and a redundancy light-emitting element.

In the display area DA, the plurality of row connection electrodes RCE can be disposed on the third insulating layer 1515*c*. The plurality of row connection electrodes RCE can transfer the low-potential voltage VSS output from the driver DRV to the row line RL.

In the display area DA, the plurality of column lines CL can be disposed on the third insulating layer 1515*c*. The plurality of column lines CL can be disposed in an area between the plurality of banks BNK. For example, the plurality of column lines CL can be disposed adjacent to one of the plurality of banks BNK.

Each of the plurality of column lines CL can include a line portion and the column connection electrode CCE protruding from the line portion. The line portion and the column connection electrode CCE that are included in each of the plurality of column lines CL can be different metals that are formed integrally or electrically connected.

For example, each of the plurality of column lines CL can include the column connection electrode CCE that is a portion protruding upward from an adjacent bank BNK among the plurality of banks BNK. The column connection electrode CCE of each of the plurality of column lines CL can be disposed to extend to the side surfaces and upper surface of the bank BNK. The column connection electrode CCE can be an electrode electrically connected to each of the plurality of column lines CL or a portion protruding from each of the plurality of column lines CL.

Referring to FIG. 23, the column connection electrode CCE of the column line CL can be formed of one conductive layer or a plurality of conductive layers. For example, the column connection electrode CCE electrically connected to the column line CL or protruding from the column line CL can include a first conductive layer 1601, a second conductive layer 1602, a third conductive layer 1603, and a fourth conductive layer 1604, but the aspects and implementations of the present disclosure are not limited thereto.

The first conductive layer 1601 can be disposed on the bank BNK. The second conductive layer 1602 can be disposed on the first conductive layer 1601. The third conductive layer 1603 can be disposed on the second conductive layer 1602, and the fourth conductive layer 1604 can be disposed on the third conductive layer 1603. For example, each of the first conductive layer 1601, the second conductive layer 1602, the third conductive layer 1603, and the fourth conductive layer 1604 can be formed of titanium (Ti), molybdenum (Mo), aluminum (Al), or titanium (Ti) and indium tin oxide (ITO), but the aspects and implementations of the present disclosure are not limited thereto.

According to the aspects and implementations of the present disclosure, some of the plurality of conductive layers forming the column connection electrode CCE, which have good reflection efficiency, can be formed as an alignment key for aligning the light-emitting element ED and/or a reflector. For example, the second conductive layer 1602 among the plurality of conductive layers forming the column connection electrode CCE can include a reflective material. For example, the second conductive layer 1602 can include aluminum (Al), but the aspects and implementations of the present disclosure are not limited thereto. Accordingly, the second conductive layer 1602 can be formed as a reflector. In addition, due to the high reflection efficiency of the second conductive layer 1602, the second conductive layer 1602 can be easily identified during the manufacturing process, and thus the location or transfer location of the light-emitting element ED can be aligned with respect to the second conductive layer 1602.

For example, to form the second conductive layer 1602 as a reflector, the third conductive layer 1603 and the fourth conductive layer 1604 that are disposed on the second conductive layer 1602 can be disposed to be partially removed or etched. For example, parts of the third conductive layer 1603 and the fourth conductive layer 1604 that are disposed on the bank BNK can be removed or etched to expose an upper surface of the second conductive layer 1602. For example, openings of the third conductive layer 1603 and the fourth conductive layer 1604 can overlap a part of the upper surface of the second conductive layer 1602. For example, in the third conductive layer 1603 and the fourth conductive layer 1604, central portions and edge portions at which a solder pattern SDP is disposed can remain, and the remaining portions excluding these portions (the central portions and the edge portions) can be removed. For example, the edge portion of each of the third conductive layer 1603 formed of titanium (Ti) and the fourth conductive layer 1604 formed of indium tin oxide (ITO) may not be etched. Accordingly, it is possible to prevent other conductive layers of the column connection electrode CCE of the column line CL from being corroded by a tetramethylammonium hydroxide (TMAH) solution used in the mask process of the column connection electrode CCE.

According to the aspects and implementations of the present disclosure, the first conductive layer 1601 and the third conductive layer 1603 can include titanium (Ti) or molybdenum (Mo). The second conductive layer 1602 can include aluminum (Al). The fourth conductive layer 1604 can include a transparent conductive oxide layer, such as indium tin oxide (ITO) or indium zinc oxide (IZO), which has high adhesion to the solder pattern SDP, corrosion resistance, and acid resistance. However, the aspects and implementations of the present disclosure are not limited thereto.

The first conductive layer 1601, the second conductive layer 1602, the third conductive layer 1603, and the fourth conductive layer 1604 can be sequentially deposited and then patterned by performing a photolithography process and an etching process, but the aspects and implementations of the present disclosure are not limited thereto.

According to the aspects and implementations of the present disclosure, two or more of the column connection electrode CCE, the column line CL, the row connection electrode RCE, and the pad PD can be disposed on the same layer. The column connection electrode CCE, the column line CL, the row connection electrode RCE, and the pad PD can be formed of a single layer or multiple layers of a conductive material, but the aspects and implementations of the present disclosure are not limited thereto. For example, two or more of the column connection electrode CCE, the column line CL, the row connection electrode RCE, and the pad PD can be formed of multiple layers of indium tin oxide (ITO)/titanium (Ti)/aluminum (Al)/titanium (Ti), but the aspects and implementations of the present disclosure are not limited thereto.

According to the aspects and implementations of the present disclosure, the solder pattern SDP can be disposed on the column connection electrode CCE in each of the plurality of sub-pixels. The solder pattern SDP can bond the light-emitting element ED to the column connection electrode CCE. The column connection electrode CCE and the light-emitting element ED can be electrically connected through eutectic bonding using the solder pattern SDP, but the aspects and implementations of the present disclosure are not limited thereto. For example, when the solder pattern SDP is formed of indium (In) and the first electrode Ecl of the light-emitting element ED is formed of gold (Au), the solder pattern SDP and the first electrode Ecl of the light-emitting element ED can be bonded by applying heat and pressure during the transfer process of the light-emitting element ED. The light-emitting element ED can be bonded to the solder pattern SDP and the column connection electrode CCE through eutectic bonding without a separate adhesive. For example, the solder pattern SDP can be formed of indium (In), tin (Sn), or an alloy thereof, but the aspects and implementations of the present disclosure are not limited thereto. For example, the solder pattern SDP can be a bonding pad, etc., but the aspects and implementations of the present disclosure are not limited thereto.

According to the present disclosure, a passivation layer 1516 can be disposed on the plurality of signal lines CL, the plurality of column connection electrodes CCE, the plurality of row connection electrodes RCE, and the third insulating layer 1515*c*.

For example, the passivation layer 1516 can be disposed in the display area DA, the first non-display area NDA1, and the second non-display area NDA2. At least a part of the passivation layer 1516 can be removed in the entirety or part of the bending area BA. A part of the passivation layer 1516 covering the plurality of pads PD can be removed in the second non-display area NDA2. In addition, as illustrated in FIG. 23, the passivation layer 1516 can be removed in an area in which the solder pattern SDP is disposed.

Figure 24:
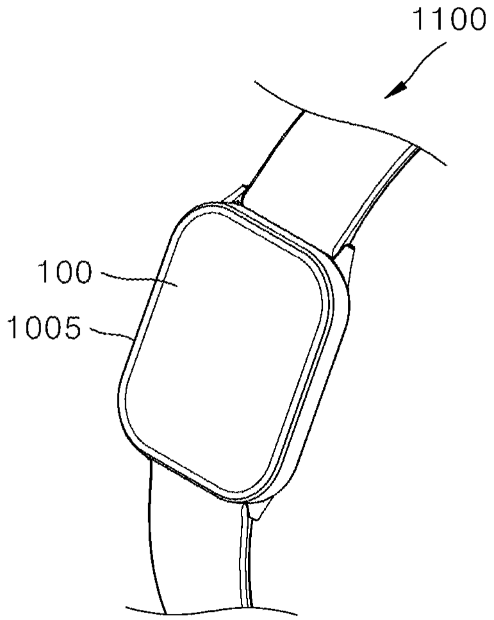
FIGS. 24 to 27 are views illustrating a device to which the display device according to the aspects and implementations of the present disclosure is applied.
Figure 25:
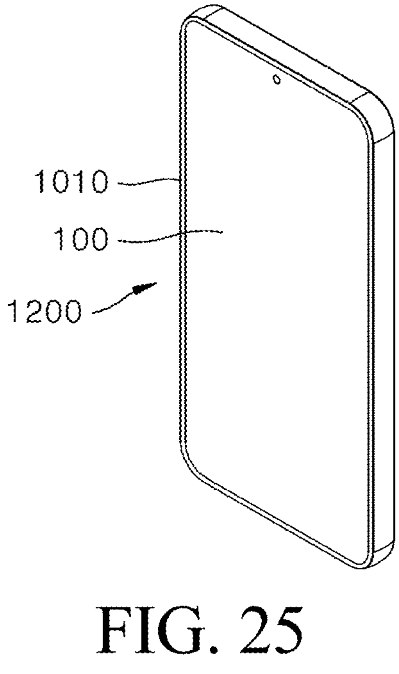
Figure 26:
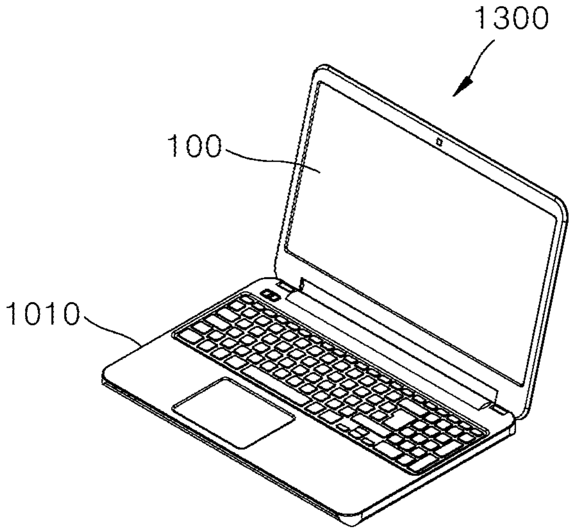
Figure 27:
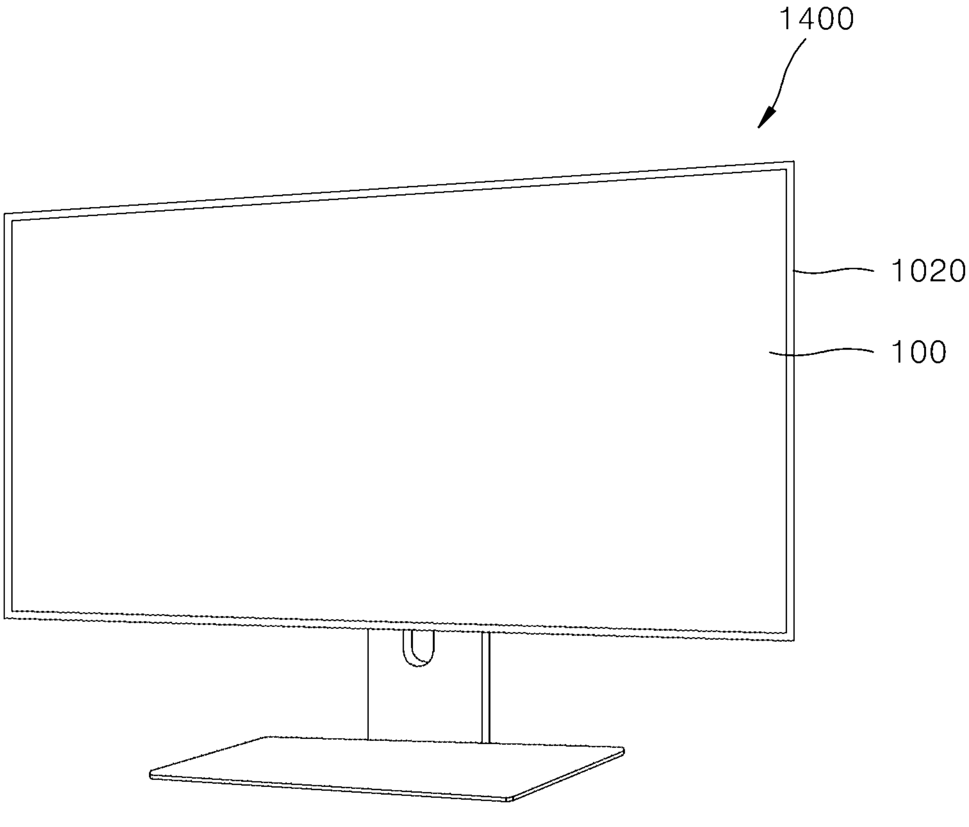

Since the passivation layer 1516 is disposed to cover the remaining areas not including the bending area BA, the plurality of pads PD, and the area in which the solder pattern SDP are disposed, it is possible to reduce the penetration of moisture or impurities into the light-emitting element ED. For example, the passivation layer 1516 can be formed of a single layer or multiple layers of silicon oxide ($SiO_x$) or silicon nitride ($SiN_x$), but the aspects and implementations of the present disclosure are not limited thereto. For example, the passivation layer 1516 can be a protective layer, an insulating layer, etc., but the aspects and implementations of the present disclosure are not limited thereto. For example, as illustrated in FIG. 24, the passivation layer 1516 can include a hole that exposes the solder pattern SDP. For example, the hole of the passivation layer 1516 can overlap the solder pattern SDP.

The light-emitting element ED can be disposed on the solder pattern SDP in each of the plurality of sub-pixels SP. The light-emitting element ED can be formed on a silicon wafer by a method of metal organic chemical vapor deposition (MOCVD), CVD, plasma-enhanced CVD (PDCVD), molecular beam epitaxy (MBE), hydride vapor phase epitaxy (HVPD), sputtering, etc., but the aspects and implementations of the present disclosure are not limited thereto.

The light emitting element ED can include a first electrode Ecl, a first semiconductor layer 1611, an active layer 1612, a second semiconductor layer 1613, a second electrode Erl, and an encapsulation film 1614, but the aspects and implementations of the present disclosure are not limited thereto. For example, the encapsulation film 1614 may not be included in the light-emitting element ED.

The first semiconductor layer 1611 can be disposed on the solder pattern SDP. The second semiconductor layer 1613 can be disposed on the first semiconductor layer 1611.

For example, one of the first semiconductor layer 1611 and the second semiconductor layer 1613 can be formed of a compound semiconductor of group III-V, group II-VI, etc. and can be doped with an impurity (or a dopant). For example, one of the first semiconductor layer 1611 and the second semiconductor layer 1613 can be a semiconductor layer doped with an n-type impurity, and the other can be a semiconductor layer doped with a p-type impurity, but the aspects and implementations of the present disclosure are not limited thereto. For example, one or more of the first semiconductor layer 1611 and the second semiconductor layer 1613 can be a layer formed of a material, such as gallium nitride (GaN), gallium phosphide (GaP), gallium arsenide phosphide (GaAsP), aluminum gallium indium phosphide (AlGaInP), indium aluminum phosphide (InAlP), aluminum gallium nitride (AlGaN), aluminum indium nitride (AlInN), aluminum indium gallium nitride (AlInGaN), aluminum gallium arsenide (AlGaAs), gallium arsenide (GaAs), etc., doped with an n-type or p-type impurity, but the aspects and implementations of the present disclosure are not limited thereto. For example, the n-type impurity can be silicon (Si), germanium (Ge), selenium (Se), carbon (C), tellurium (Te), tin (Sn), etc., but the aspects and implementations of the present disclosure are not limited thereto. For example, the p-type impurity can be magnesium (Mg), zinc (Zn), calcium (Ca), strontium (Sr), barium (Ba), beryllium (Be), or the like, but the aspects and implementations of the present disclosure are not limited thereto.

For example, the first semiconductor layer 1611 and the second semiconductor layer 1613 can be a nitride semiconductor including an n-type impurity and a nitride semiconductor including a p-type impurity, respectively, but the aspects and implementations of the present disclosure are not limited thereto. For example, the first semiconductor layer 1611 can be a nitride semiconductor including a p-type impurity, and the second semiconductor layer 1613 can be a nitride semiconductor including an n-type impurity, but the aspects and implementations of the present disclosure are not limited thereto.

The active layer 1612 can be disposed between the first semiconductor layer 1611 and the second semiconductor layer 1613. The active layer 1612 can receive holes and electrons from the first semiconductor layer 1611 and the second semiconductor layer 1613 and emit light. For example, the active layer 1612 can be formed in one of a single well structure, a multi-well structure, a single quantum well structure, a multi-quantum well (MQW) structure, a quantum dot structure, and a quantum wire structure, but the aspects and implementations of the present disclosure are not limited thereto. For example, the active layer 1612 can be formed of indium gallium nitride (InGaN), gallium nitride (GaN), etc., but the aspects and implementations of the present disclosure are not limited thereto.

As another example, the active layer 1612 can include a MQW structure having a well layer and a barrier layer having a greater band gap than the well layer. For example, the active layer 1612 can have an InGaN layer as the well layer and an AlGaN layer as the barrier layer, but the aspects and implementations of the present disclosure are not limited thereto.

The first electrode Ecl of the light-emitting element ED can be disposed between the first semiconductor layer 1611 and the solder pattern SDP. For example, the first electrode Ecl of the light-emitting element ED can electrically connect the first semiconductor layer 1611 to the column connection electrode CCE. A column line voltage (e.g., an anode voltage) output from the driver DRV can be applied to the first semiconductor layer 1611 through the column line CL, the column connection electrode CCE, and the first electrode Ecl. For example, the first electrode Ecl can be formed of a conductive material capable of eutectic bonding with the solder pattern SDP, but the aspects and implementations of the present disclosure are not limited thereto. For example, the first electrode Ecl of the light-emitting element can be formed of gold (Au), tin (Sn), tungsten (W), silicon (Si), silver (Ag), titanium (Ti), iridium (Ir), chromium (Cr), indium (In), zinc (Zn), lead (Pb), nickel (Ni), platinum (Pt), and copper (Cu), an alloy thereof, etc., but the aspects and implementations of the present disclosure are not limited thereto.

The second electrode Erl of the light-emitting element ED can be disposed on the second semiconductor layer 1613. For example, the second electrode Erl of the light-emitting element ED can electrically connect the second semiconductor layer 1613 to the row line RL. A row line voltage (e.g., referred to as a low-potential voltage VSS as a cathode voltage) output from the driver DRV can be applied to the second semiconductor layer 1613 through the row connection electrode RCE, the row line RL, and the second electrode Erl. The second electrode Erl of the light-emitting element ED can be formed of a transparent conductive material so that light emitted from the light-emitting element ED can travel upward from the light-emitting element ED, but the aspects and implementations of the present disclosure are not limited thereto. For example, the second electrode Erl can be formed of a material, such as indium tin oxide (ITO), indium zinc oxide (IZO), indium gallium zinc oxide (IGZO), etc., but the aspects and implementations of the present disclosure are not limited thereto.

The encapsulation film 1614 can be disposed on at least parts of the first semiconductor layer 1611, the active layer 1612, the second semiconductor layer 1613, the first electrode Ecl, and the second electrode Erl. For example, the encapsulation film 1614 can surround at least parts of the first semiconductor layer 1611, the active layer 1612, the second semiconductor layer 1613, the first electrode Ecl, and the second electrode Erl.

For example, the encapsulation film 1614 can protect the first semiconductor layer 1611, the active layer 1612, and the second semiconductor layer 1613. For example, the encapsulation film 1614 can be disposed on side surfaces of the first semiconductor layer 1611, side surfaces of the active layer 1612, and side surfaces of the second semiconductor layer 1613.

For example, the encapsulation film 1614 can be disposed on at least parts of the first electrode Ecl and the second electrode Erl of the light-emitting element ED. For example, the encapsulation film 1614 can be disposed at an edge portion (or one side) of the first electrode Ecl of the light-emitting element ED and an edge portion (or one side) of the second electrode Erl of the light-emitting element ED. At least a part of the first electrode Ecl can be exposed from the encapsulation film 1614 so that the first electrode Ecl and the solder pattern SDP can be connected. For example, at least a part of the second electrode Erl can be exposed from the encapsulation film 1614 so that the second electrode Erl and the row line RL can be connected. For example, the encapsulation film 1614 can be formed of an insulation material, such as silicon nitride ($SiN_x$) or silicon oxide ($SiO_x$), but the aspects and implementations of the present disclosure are not limited thereto.

As another example, the encapsulation film 1614 can have a structure in which a reflective material is dispersed in a resin layer, but the aspects and implementations of the present disclosure are not limited thereto. For example, the encapsulation film 1614 can be manufactured to be a reflector having various structures, but the aspects and implementations of the present disclosure are not limited thereto. Light emitted from the active layer 1612 can be reflected upward by the encapsulation film 1614, thereby increasing light extraction efficiency. For example, the encapsulation film 1614 can be a reflective layer, but the aspects and implementations of the present disclosure are not limited thereto.

According to the aspects and implementations of the present disclosure, the light-emitting element ED has been described as having a vertical structure, but the aspects and implementations of the present disclosure are not limited thereto. For example, the light-emitting element ED can have a lateral structure or a flip chip structure.

The structure of the light-emitting element ED illustrated in FIG. 23 can be applied to all of the first light-emitting element EDa, the second light-emitting element EDb, and the third light-emitting element EDc in the substantially the same manner. According to the aspects and implementations of the present disclosure, a first optical layer 1517*a* surrounding the plurality of light-emitting elements ED can be disposed in the display area DA. For example, the first optical layer 1517*a* can be disposed to cover the plurality of light-emitting elements ED and banks BNK in areas of the plurality of sub-pixels. For example, the first optical layer 1517*a* can cover the bank BNK, a part of the passivation layer 1516, and a space between the plurality of emission elements ED. The first optical layer 1517*a* can be disposed between the plurality of light-emitting elements ED and between the plurality of banks BNK that are included in one pixel. For example, the first optical layers 1517*a* can be disposed to extend in a first direction X and spaced apart from each other in a second direction Y. For example, the first optical layer 1517*a* can be disposed to surround the side portions of the light-emitting element ED and the bank BNK between the passivation layer 1516 and the row line RL, but the aspects and implementations of the present disclosure are not limited thereto. For example, the first optical layer 1517*a* can be a diffusion layer, a sidewall diffusion layer, etc., but the aspects and implementations of the present disclosure are not limited thereto.

The first optical layer 1517*a* can include an organic insulation material having fine particles dispersed therein, but the aspects and implementations of the present disclosure are not limited thereto. For example, the first optical layer 1517*a* can be formed of siloxane having fine metal particles, such as titanium dioxide ($TiO_2$) particles, dispersed therein, but the aspects and implementations of the present disclosure are not limited thereto. Light emitted from the plurality of light-emitting elements ED can be scattered by the fine particles dispersed in the first optical layer 1517*a* and emitted to the outside of the display device 100. Accordingly, the first optical layer 1517*a* can increase the extraction efficiency of light emitted from the plurality of light-emitting elements ED.

For example, the first optical layer 1517*a* can be disposed in each of the plurality of pixels or disposed together in some pixels disposed in the same row, but the aspects and implementations of the present disclosure are not limited thereto. For example, the first optical layer 1517*a* can be disposed in each of the plurality of pixels, or the plurality of pixels can share one first optical layer 1517*a*. As another example, each of the plurality of sub-pixels can separately include the first optical layer 1517*a*, but the aspects and implementations of the present disclosure are not limited thereto.

According to the aspects and implementations of the present disclosure, a second optical layer 1517*b* can be disposed on the passivation layer 1516 in the display area DA. For example, the second optical layer 1517*b* can be disposed to surround the first optical layer 1517*a*. For example, the second optical layer 1517*b* can come into contact with side surfaces of the first optical layer 1517*a*. For example, the second optical layer 1517*b* can be disposed in an area between the plurality of pixels. However, the aspects and implementations of the present disclosure are not limited thereto. For example, the second optical layer 1517*b* can be a diffusion layer, a diffusion layer window, a window diffusion layer, etc., but the aspects and implementations of the present disclosure are not limited thereto.

The second optical layer 1517*b* can be formed of an organic insulation material, but the aspects and implementations of the present disclosure are not limited thereto. The second optical layer 1517*b* can be formed of the same material as the first optical layer 1517*a*, but the aspects and implementations of the present disclosure are not limited thereto. For example, the first optical layer 1517*a* can include fine particles, and the second optical layer 1517*b* may not include fine particles. For example, the second optical layer 1517*b* can be formed of siloxane, but the aspects and implementations of the present disclosure are not limited thereto.

For example, a thickness of the first optical layer 1517*a* can be smaller than a thickness of the second optical layer 1517*b*, but the aspects and implementations of the present disclosure are not limited thereto. Accordingly, in a plan view, the area in which the first optical layer 1517*a* is disposed can include a concave portion that is recessed inward more than an upper surface of the second optical layer 1517*b*.

According to the aspects and implementations of the present disclosure, the row line RL can be disposed on the first optical layer 1517*a* and the second optical layer 1517*b*. For example, the row line RL can be electrically connected to the plurality of row connection electrodes RCE through contact holes of the second optical layer 1517*b*. For example, the row line RL can be disposed on the plurality of light-emitting elements ED. For example, the row line RL can include a transparent conductive oxide, such as indium tin oxide (ITO), indium zinc oxide (IZO), etc., but the aspects and implementations of the present disclosure are not limited thereto. For example, the row line RL can be disposed in contact with the second electrode Erl of the light-emitting element ED. For example, the row line RL can overlap the first optical layer 1517*a*. For example, the row line RL can cover an outer flat surface of the first optical layer 1517*a*, The row line RL can extend continuously in the first direction X of the substrate 210. Accordingly, the row line RL can be connected in common to the plurality of pixels arranged in the first direction X of the substrate 210. For example, the row line RL can be connected in common to the plurality of pixels.

According to the aspects and implementations of the present disclosure, the row line RL can extend continuously on the first optical layer 1517*a*, the second optical layer 1517*b*, and the light emitting element ED. The area in which the first optical layer 1517*a* is disposed can include a concave portion that is recessed inward more than the upper surface of the second optical layer 1517*b*. Accordingly, a first portion of the row line RL disposed on the first optical layer 1517*a* can be disposed along the concave portion, and thus disposed at a lower location than a second portion of the row line RL disposed on the second optical layer 1517*b*.

A third optical layer 1517*c* can be disposed on the row line RL. The third optical layer 1517*c* can be disposed to overlap the plurality of light-emitting elements ED and the first optical layer 1517*a*. Since the third optical layer 1517*c* is disposed above the row line RL and the plurality of light-emitting elements ED, it is possible to eliminate spots (mura) that can occur in some of the plurality of light-emitting elements ED. For example, when the plurality of light-emitting elements ED are transferred onto the substrate 210 of the display panel 110, an area in which distances between the plurality of light-emitting elements ED are not uniform can occur due to a process deviation, etc. When the distances between the plurality of light-emitting elements ED are not uniform, a light-emitting area of each of the plurality of light-emitting elements ED can be disposed non-uniformly, thereby making spots (mura) visible to a user. Accordingly, since the third optical layer 1517*c* formed to uniformly diffuse light above the plurality of light-emitting elements ED is formed, it is possible to reduce the light emitted from some light-emitting elements ED from being visible as spots. Accordingly, since the light emitted from the plurality of light-emitting elements ED is uniformly diffused by the third optical layer 1517*c* and extracted to the outside of the display device 100, it is possible to improve the luminance uniformity of the display device 100.

The third optical layer 1517*c* can include an organic insulation material having fine particles dispersed therein, but the aspects and implementations of the present disclosure are not limited thereto. For example, the third optical layer 1517*c* can be formed of siloxane having fine metal particles, such as titanium dioxide ($TiO_2$) particles, dispersed therein, but the aspects and implementations of the present disclosure are not limited thereto. For example, the third optical layer 1517*c* can be formed of the same material as the first optical layer 1517*a*, but the aspects and implementations of the present disclosure are not limited thereto. For example, the third optical layer 1517*c* can be a diffusion layer, an upper diffusion layer, etc., but the aspects and implementations of the present disclosure are not limited thereto.

According to the aspects and implementations of the present disclosure, the light emitted from the plurality of light-emitting elements ED can be scattered by the fine particles dispersed in the third optical layer 1517*c* and emitted to the outside of the display device 100. The third optical layer 1517*c* can uniformly mix the light emitted from the plurality of light-emitting elements ED, thereby further improving the luminance uniformity of the display device 100. In addition, it is possible to increase the light extraction efficiency of the display device 100 by the light scattered from the fine particles, thereby enabling the low-power driving of the display device 100.

The black matrix BM can be disposed on the row line RL, the first optical layer 1517*a*, the second optical layer 1517*b*, and the third optical layer 1517*c* in the display area DA. For example, the black matrix BM can fill the contact hole of the second optical layer 1517*b*. Since the black matrix BM is formed to cover the display area DA, it is possible to reduce color mixing of light of a plurality of sub-pixels and external light reflection. For example, since the black matrix BM is also disposed in a contact hole by which the row line RL and the row connection electrode RCE are connected, it is possible to prevent light leakage between a plurality of neighboring sub-pixels.

For example, the black matrix BM can be formed of an opaque material, but the aspects and implementations of the present disclosure are not limited thereto. For example, the black matrix BM can be an organic insulation material to which a black pigment or black dye is added, but the aspects and implementations of the present disclosure are not limited thereto.

A cover layer 1518 can be disposed on the black matrix BM in the display area DA. The cover layer 1518 can protect components under the cover layer 1518. For example, the cover layer 1518 can be formed of an organic insulation material, but the aspects and implementations of the present disclosure are not limited thereto. For example, the cover layer 1518 can be formed of a photoresist, polyimide (PI), or photo acryl-based material, but the aspects and implementations of the present disclosure are not limited thereto. For example, the cover layer 1518 can be an overcoating layer, an insulating layer, etc., but the aspects and implementations of the present disclosure are not limited thereto.

The polarizing layer 114 can be disposed on the cover layer 1518 via the first adhesive layer 112. The cover member 118 can be disposed on the polarizing layer 114 via the second adhesive layer 116. For example, the first adhesive layer 112 and the second adhesive layer 116 can include an OCA, an OCR, a PSA, etc., but the aspects and implementations of the present disclosure are not limited thereto.

According to the aspects and implementations of the present disclosure, the plurality of pads PD can be disposed on the third insulating layer 1515*c* in the second non-display area NDA2. For example, at least parts of the plurality of pad PD can be exposed with respect to the passivation layer 1516. For example, the plurality of pads PD can be electrically connected to the fourth pad connection line PCP4 through the contact hole of the third insulating layer 1515*c*.

An adhesive layer ACF can be disposed on the plurality of pads PD. The adhesive layer ACF can be an adhesive layer in which conductive balls are dispersed in an insulation material, but the aspects and implementations of the present disclosure are not limited thereto. When heat or pressure is applied to the adhesive layer ACF, the conductive balls can be electrically connected at a portion in which the heat or pressure is applied, thereby providing conductive characteristics. The adhesive layer ACF can be disposed between the plurality of pads PD and the flexible printed circuit 102 to attach or bond the flexible printed circuit 102 to the plurality of pads PD. For example, the adhesive layer ACF can be an anisotropic conductive film (ACF), but the aspects and implementations of the present disclosure are not limited thereto.

The flexible printed circuit 102 can be disposed on the adhesive layer ACF. The flexible printed circuit 102 can be electrically connected to the plurality of pads PD through the adhesive layer ACF. Accordingly, the signal supplied from the flexible printed circuit 102 can be transmitted to the driver DRV of the display area DA through the plurality of pads PD, the fourth pad connection pattern PCP4, the third pad connection pattern PCP3, the second pad connection pattern PCP2, and the first pad connection pattern PCP1.

Referring to FIG. 22, the display panel 110 according to the aspects and implementations of the present disclosure can include the substrate 210, the layer stack 1410 on the plurality of drivers DRV disposed on the substrate 210, the optical layer 1517*a* disposed between the plurality of light-emitting elements EDa, EDb, and EDc on the layer stack 1410, the adhesive layer 116 disposed on the plurality of light-emitting elements EDa, EDb, and EDc and the optical layer 1517*a*, and the cover member 118 disposed on the adhesive layer 116.

The plurality of column lines CL can be disposed between the layer stack 1410 and the plurality of light-emitting elements EDa, EDb, and EDc.

The plurality of row lines RL can be disposed on the plurality of light-emitting elements EDa, EDb, and EDc and the optical layer 1517*a*. The plurality of row lines RL can be disposed between the plurality of light-emitting elements EDa, EDb, and EDc and the optical layer 1517*a*, and the adhesive layer 116.

The layer stack 1410 can include the plurality of protective layers 1513*a*, 1513*b*, and 1514 disposed on the side surfaces and upper surface of each of the plurality of drivers DRV, the plurality of insulating layers 1515*a*, 1515*b*, and 1515*c* disposed on the plurality of protective layers 1513*a*, 1513*b*, and 1514, and the banks BNK disposed on the plurality of insulating layers.

The plurality of protective layers 1513*a*, 1513*b*, and 1514 can further include the side protective layer 1513 disposed on the side surfaces of each of the plurality of drivers DRV and the upper protective layer 1514 disposed on the upper surface of each of the plurality of drivers DRV.

The side protective layer 1513 can include the first protective layer 1513*a* disposed on the substrate 210 and the second protective layer 1513*b* disposed on the first protective layer 1513*a*.

The upper protective layer 1514 can include the second protective layer 1513*b* and the third protective layer 1514 disposed on the plurality of drivers DRV.

The plurality of insulating layers 1515*a*, 1515*b*, and 1515*c* can include the first insulating layer 1515*a* disposed on the upper protective layer 1514 and the second insulating layer 1515*b* disposed on the first insulating layer 1515*a*. The plurality of insulating layers 1515*a*, 1515*b*, and 1515*c* can further include the third insulating layer 1515*c* disposed on the second insulating layer 1515*b*.

Each of the plurality of light-emitting elements EDa, EDb, and EDc can be disposed on the bank BNK and located in the opening of the optical layer 1517*a*.

At least a part of each of the plurality of column lines CL can extend from the plurality of insulating layers 1515*a*, 1515*b*, and 1515*c* to the bank BNK. Each of the plurality of row lines RL can be disposed on the optical layer 1517*a* and the plurality of light-emitting elements EDa, EDb, and EDc.

The first electrode Ecl of each of the plurality of light-emitting elements EDa, EDb, and EDc can be electrically connected to at least a part of the column line CL extending onto the bank BNK among the plurality of column lines CL. The second electrode Erl of each of the plurality of light-emitting elements EDa, EDb, and EDc can be electrically connected to one of the plurality of row lines RL.

The display panel 110 according to the aspects and implementations of the present disclosure can include the plurality of line connection patterns LCP that connect the plurality of lines including the plurality of row lines RL and the plurality of column lines CL to the plurality of drivers DRV, respectively.

The plurality of line connection patterns LCP can include the first line connection pattern LCP1 disposed on the side protective layer 1513, the second line connection pattern LCP2 disposed on the upper protective layer 1514 and electrically connected to the first line connection pattern LCP1 through the hole of the upper protective layer 1514, the third line connection pattern LCP3 disposed on the first insulating layer 1515*a* and electrically connected to the second line connection pattern LCP2 through a hole of the first insulating layer 1515*a*, and the fourth line connection pattern LCP4 disposed on the second insulating layer 1515*b* and electrically connected to the third line connection pattern LCP3 through a hole of the second insulating layer 1515*b*.

The first line connection pattern LCP1 can be electrically connected to one of the plurality of drivers DRV. The fourth line connection pattern LCP4 can be electrically connected to the second electrode Erl of at least one of the plurality of light-emitting elements EDa, EDb, and EDc or electrically connected to the first electrode Ecl of at least one of the plurality of light-emitting elements EDa, EDb, and EDc.

The side protective layer 1513 disposed on the side surfaces of each of the plurality of drivers DRV can include two or more organic layers.

The first and second protective layers 1513*a* and 1513*b* that are the side protective layer 1513, the third protective layer 1514 that is the upper protective layer 1514, and the first to third insulating layers 1515*a*, 1515*b*, and 1515*c* can be formed of an organic layer.

FIGS. 24 to 27 are views illustrating a device to which the display device according to the aspects and implementations of the present disclosure is applied.

Referring to FIGS. 24 to 27, a display device 1000 according to aspects and implementations of the present disclosure can be included in various devices or electronic devices. For example, referring to FIGS. 24 to 27, various electronic devices can include a wearable device 1100, a mobile device 1200, a notebook PC 1300, and a monitor or TV 1400, but the aspects and implementations of the present disclosure are not limited thereto.

The wearable device 1100, the mobile device 1200, the notebook 1300, and the monitor or TV 1400 can include case units 1005, 1010, 1015, and 1020, respectively, and can each include the display panel and the display device according to the aspects and implementations of the present disclosure.

For example, the display device according to the implementation of the present disclosure can be applied to a mobile device, a video phone, a smart watch, a watch phone, a wearable device, a foldable device, a rollable device, a bendable device, a flexible device, a curved device, a sliding device, a variable device, an electronic notebook, an e-book, a portable multimedia player (PMP), a personal digital assistant (PDA), an MP3 player, a mobile medical device, a desktop PC, a laptop PC, a netbook computer, a workstation, a navigation system, a vehicle display device, a theater display device, a television, a wallpaper device, a signage device, a game device, a laptop computer, a monitor, a camera, a camcorder, a home appliances, etc.

The above aspects and implementations of the present disclosure are schematically described as follows.

According to aspects and implementations of the present disclosure, there is provided a display device including a substrate which includes a display area and in which a plurality of unit driving areas are disposed in a matrix form in the display area, a driver disposed in each of the plurality of unit driving areas, and a plurality of pixels disposed in each of the plurality of unit driving areas, in which each of the plurality of pixels includes a plurality of sub-pixels, and each of the plurality of sub-pixels includes at least one light-emitting element.

The light-emitting element can include a first electrode and a second electrode, and the driver can include a column driver for driving a column line connected to the first electrode, and a row driver for driving a row line connected to the second electrode.

In addition, according to aspects and implementations of the present disclosure, there is provided a display device including a substrate including a display area, and a unit driving area disposed in a matrix form in the display area, in which the unit driving area includes a light-emitting element including a first electrode and a second electrode, a column driver for driving a column line connected to the first electrode, and a row driver for driving a row line connected to the second electrode, the column driver is connected to a plurality of column lines and connected in common to the first electrode of each of the light-emitting elements in the same column, and the row driver is connected to a plurality of row lines and connected in common to the second electrode of each of the light-emitting elements in the same row.

The column driver can drive a column line connected to all of the first electrodes of n light-emitting elements arranged in the same column.

The row driver can drive n row lines respectively connected to the second electrodes of n light-emitting elements arranged in the same column.

The column driver can include a driving transistor including a first electrode connected to a first node, a second electrode connected to a second node to which a high-potential voltage is applied, and a third electrode connected to a third node, and a first light-emitting control transistor including a gate electrode to which a first light-emitting control signal is applied, a second electrode connected to the third node, and a third electrode connected to a fourth node.

The driving transistor can supply a driving current for allowing the n light-emitting elements to emit light and control connection between the second node and the third node according to a voltage of the first node.

The first light-emitting control transistor can be connected between the third node and the fourth node and can control light-emitting of the light-emitting element.

The column driver can further include a reference voltage node which is connected to the first node and to which a reference voltage is applied, and an initialization voltage node which is connected to the first node and to which an initialization voltage is applied through an initialization switch.

The column driver can further include a pre-charge voltage node which is connected to the third node and to which a pre-charge voltage is applied through a pre-charge switch.

The column driver can further include a reset voltage node which is connected to the fourth node and to which a reset voltage is applied through a reset switch.

The column driver can include a driving transistor including a first electrode connected to a first node, a second electrode connected to a second node to which a reference voltage is applied, and a third electrode connected to a third node, a first light-emitting control transistor including a gate electrode to which a first light-emitting control signal is applied, a second electrode connected to the third node, and a third electrode connected to a fourth node, and a second light-emitting control transistor including a gate electrode to which a second light-emitting control signal is applied, a second electrode to which a high-potential voltage is applied, and a third electrode connected to the second node.

The column driver can further include a first transistor that controls connection between the first node and an initialization voltage node to which an initialization voltage is applied according to a first scan signal.

The column driver can further include a second transistor that controls connection between the second node and a reference voltage node to which a reference voltage is applied according to a second scan signal.

The column driver can further include a third transistor that controls connection between the first node and the third node according to a third scan signal.

The column driver can further include a fourth transistor that controls connection between the third node and a pre-charge voltage node to which a pre-charge voltage is applied according to a fourth scan signal.

The column driver can further include a fifth transistor that controls connection between the fourth node and a reset voltage node to which a reset voltage is applied according to a fifth scan signal.

The first light-emitting control signal can have a delay difference from the second light-emitting control signal.

The row driver can include n display-on switches connecting each of n row lines to a first low-potential voltage node, and n display-off switches connecting each of the n row lines to a second low-potential voltage node.

A turn-on timing of each of the n display-on switches can be different.

A turn-on timing of each of the n display-off switches can be different.

The first low-potential voltage can be lower than the second low-potential voltage.

According to the aspects and implementations of the present disclosure, it is possible to improve the vertical line based on the driving driver by increasing the voltage of the reset node to a predetermined voltage regardless of differential driving of the driving drivers.

According to the aspects and implementations of the present disclosure, it is possible to improve the vertical line based on the driving driver by reducing the change amount of the voltage of the reset node due to parasitic capacitance during differential driving of the driving drivers.

According to the aspects and implementations of the present disclosure, by reducing the change amount of the voltage of the reset node, it is possible to improve the vertical line based on the driving driver, which is caused by coupling between the gate voltage of the driving transistor and the voltage of the reset node.

According to the aspects and implementations of the present disclosure, by delaying the on timing of the second light-emitting control transistor after the on timing of the first light-emitting control transistor and applying the delayed on timing of the second light-emitting control transistor to exclude the coupling effect due to the voltage of the reset node, it is possible to improve the vertical line based on the driving driver, which is caused by coupling between the gate voltage of the driving transistor and the voltage of the reset node.

The above description is merely the example description of the technical spirit of the present disclosure, and those skilled in the art to which the present disclosure pertains will be able to variously modify and change the present disclosure without departing from the essential characteristics of the present disclosure. Therefore, the aspects and implementations disclosed in the present disclosure are not intended to limit the technical spirit of the present disclosure, but are to describe the same, and the scope of the technical spirit of the present disclosure is not limited by these aspects and implementations.

DESCRIPTION OF REFERENCE NUMERALS

100: display device
102: flexible printed circuit
104: printed circuit board
106: support substrate
110: display panel
112: first adhesive layer
114: polarizing layer
116: second adhesive layer
118: cover member
210: substrate
211: pad part

What is claimed is:

1. A display device comprising:

a substrate including a display area; and a unit driving area disposed in a matrix form in the display area, wherein the unit driving area includes a light-emitting element including a first electrode and a second electrode, a column driver configured to drive a column line connected to the first electrode, and a row driver configured to drive a row line connected to the second electrode, wherein the column driver is connected to a plurality of column lines and is connected in common to the first electrode of each of light-emitting elements in a same column, wherein the row driver is connected to a plurality of row lines and is connected in common to the second electrode of each of light-emitting elements in a same row, wherein the column driver includes:

a driving transistor configured to generate a driving current to be supplied to the light-emitting element; and a first light-emitting control transistor and a third light-emitting control transistor configured to be connected directly in series between the driving transistor and the light-emitting element, and wherein a first light-emitting control signal applied to a gate electrode of the first light-emitting control transistor and a third light-emitting control signal applied to a gate electrode of the third light-emitting control transistor have a predetermined delay difference.

2. The display device of claim 1, wherein the column driver is configured to drive a column line connected to all of the first electrodes of n light-emitting elements arranged in the same column, where n is a real number.

3. The display device of claim 1, wherein the row driver is configured to drive n row lines respectively connected to the second electrodes of n light-emitting elements arranged in the same column, where n is a real number.

4. The display device of claim 2, wherein the driving transistor includes a first electrode connected to a first node, a second electrode connected to a second node to which a high-potential voltage is applied, and a third electrode connected to a third node; and the first light-emitting control transistor includes the gate electrode to which the first light-emitting control signal is applied, a second electrode connected to the third node, and a third electrode connected to a fourth node.

5. The display device of claim 4, wherein the driving transistor is configured to supply a driving current for allowing the n light-emitting elements to emit light and control connection between the second node and the third node according to a voltage of the first node.

6. The display device of claim 4, wherein the first light-emitting control transistor is connected between the third node and the fourth node and is configured to control light-emitting of the light-emitting element.

7. The display device of claim 4, wherein the column driver further includes:

a reference voltage node which is connected to the first node and to which a reference voltage is applied; and an initialization voltage node which is connected to the first node and to which an initialization voltage is applied through an initialization switch.

8. The display device of claim 7, wherein the column driver further includes a pre-charge voltage node which is connected to the third node and to which a pre-charge voltage is applied through a pre-charge switch.

9. The display device of claim 8, wherein the column driver further includes a reset voltage node which is connected to the fourth node and to which a reset voltage is applied through a reset switch.

10. The display device of claim 2, wherein the column driver includes:

the driving transistor including a first electrode connected to a first node, a second electrode connected to a second node to which a reference voltage is applied, and a third electrode connected to a third node;

the first light-emitting control transistor including the gate electrode to which the first light-emitting control signal is applied, a second electrode connected to the third node, and a third electrode connected to a fourth node; and a second light-emitting control transistor including a gate electrode to which a second light-emitting control signal is applied, a second electrode to which a high-potential voltage is applied, and a third electrode connected to the second node.

11. The display device of claim 10, wherein the third light-emitting control transistor includes a gate electrode to which the third light-emitting control signal is applied, a second electrode connected to the fourth node, and a third electrode connected to the column line.

12. The display device of claim 10, wherein the column driver further includes a first transistor configured to control connection between the first node and an initialization voltage node to which an initialization voltage is applied according to a first scan signal.

13. The display device of claim 12, wherein the column driver further includes a second transistor configured to control connection between the second node and a reference voltage node to which a reference voltage is applied according to a second scan signal.

14. The display device of claim 13, wherein the column driver further includes a third transistor configured to control connection between the first node and the third node according to a third scan signal.

15. The display device of claim 14, wherein the column driver further includes a fourth transistor configured to control connection between the third node and a pre-charge voltage node to which a pre-charge voltage is applied according to a fourth scan signal.

16. The display device of claim 15, wherein the column driver further includes a fifth transistor configured to control connection between the fourth node and a reset voltage node to which a reset voltage is applied according to a fifth scan signal.

17. The display device of claim 11, wherein the third light-emitting control signal has a delay difference from the first light-emitting control signal.

18. The display device of claim 3, wherein the row driver includes n display-on switches connecting each of n row lines to a first low-potential voltage node, and n display-off switches connecting each of the n row lines to a second low-potential voltage node.

19. The display device of claim 18, wherein a turn-on timing of each of the n display-on switches is different.

20. The display device of claim 18, wherein a voltage of the first low-potential voltage node is lower than a voltage of the second low-potential voltage node.

* * * * *